United States Patent
Bryant et al.

(10) Patent No.: US 12,172,919 B2
(45) Date of Patent: Dec. 24, 2024

(54) DECONSTRUCTION OF OILSAND MATERIALS USING IONIC LIQUIDS

(71) Applicant: ADJACENCY LABS CORP., Calgary (CA)

(72) Inventors: Steven L. Bryant, Calgary (CA); Tyler Stephenson, Bartlesville, OK (US); Robin D. Rogers, Tuscaloosa, AL (US); Paula Berton, Calgary (CA)

(73) Assignee: CHEYENNE MANAGEMENT CORP, Chilliwack (CA)

( * ) Notice: Subject to any disclaimer, the term of this patent is extended or adjusted under 35 U.S.C. 154(b) by 0 days.

(21) Appl. No.: 17/645,080

(22) Filed: Dec. 20, 2021

(65) Prior Publication Data
US 2022/0212972 A1    Jul. 7, 2022

Related U.S. Application Data

(62) Division of application No. 16/483,093, filed as application No. PCT/CA2018/050123 on Feb. 2, 2018, now Pat. No. 11,235,998.
(Continued)

(51) Int. Cl.
*C02F 9/00*    (2023.01)
*C02F 1/26*    (2023.01)
(Continued)

(52) U.S. Cl.
CPC .................. *C02F 9/00* (2013.01); *C02F 1/26* (2013.01); *C02F 1/38* (2013.01); *C02F 1/48* (2013.01);
(Continued)

(58) Field of Classification Search
None
See application file for complete search history.

(56) References Cited

U.S. PATENT DOCUMENTS 8,080,087 B2 * 12/2011 Falkiner ............... B01D 53/261
                                                              95/94
8,742,025 B2   6/2014 Jung et al.
(Continued)

FOREIGN PATENT DOCUMENTS

CA      1273888 A    10/1986
CA      2768522 A1    8/2012
(Continued)

OTHER PUBLICATIONS

Guzmán-Lucero, D., et al., Ionic Liquids as Demulsifiers of Water-in-Crude Oil Emulsions: Study of the Microwave Effect, Energy Fuels: 2010, 24, p. 3610-3615 (2010) (Year: 2010).*
(Continued)

*Primary Examiner* — Chester T Barry
(74) *Attorney, Agent, or Firm* — Heslin Rothenberg Farley & Mesiti P.C.; Victor A. Cardona, Esq.

(57) ABSTRACT

In alternative aspects, the invention provides process for the use of ionic liquids in the remediation and amelioration of oilsand materials, including treatment of tailings products including but not limited to mature fine tailings (MFT), separation of bitumen from oilsand, bitumen transportation, remediation of spilled bitumen and dilbit, treatment (breakage) of steam assisted gravity drainage (SAGD) and heavy oil emulsions solids removal from oil processing streams, in-situ bitumen recovery, in-situ extraction from mineral reservoirs, production well chemicals, CO2 sequestration and tracking fluids.

23 Claims, 52 Drawing Sheets

Related U.S. Application Data

(60) Provisional application No. 62/454,406, filed on Feb. 3, 2017.

(51) Int. Cl.
  *C02F 1/38* (2023.01)
  *C02F 1/48* (2023.01)
  *C02F 101/32* (2006.01)
  *C02F 103/10* (2006.01)
  *C02F 103/36* (2006.01)

(52) U.S. Cl.
  CPC ...... *C02F 2101/32* (2013.01); *C02F 2103/10* (2013.01); *C02F 2103/365* (2013.01)

(56) References Cited

U.S. PATENT DOCUMENTS

| | | | |
|---|---|---|---|
| 9,701,891 B2 | 7/2017 | Kurkal-Siebert et al. | |
| 10,093,862 B2* | 10/2018 | Kyllönen | C10G 1/045 |
| 11,235,998 B2* | 2/2022 | Bryant | C10G 33/04 |
| 2009/0139906 A1* | 6/2009 | Kruyer | B03B 9/02 |
| | | | 210/167.01 |
| 2010/0193403 A1* | 8/2010 | Yeggy | C10G 1/04 |
| | | | 208/390 |
| 2010/0266748 A1* | 10/2010 | Bressers | C25B 3/00 |
| | | | 204/263 |
| 2011/0042318 A1 | 2/2011 | Painter et al. | |
| 2011/0108466 A1 | 5/2011 | Petcavich | |
| 2012/0228195 A1* | 9/2012 | Cha | C10G 1/047 |
| | | | 208/391 |
| 2014/0054200 A1* | 2/2014 | Painter | C10G 1/04 |
| | | | 208/390 |
| 2015/0068260 A1* | 3/2015 | Volk | C10G 1/045 |
| | | | 71/64.01 |
| 2015/0111799 A1 | 4/2015 | Miranda Olvera et al. | |
| 2017/0320759 A1* | 11/2017 | Painter | C02F 1/5236 |
| 2019/0152823 A1* | 5/2019 | Omotoso | B65G 5/00 |
| 2021/0060455 A1* | 3/2021 | Fenderson | C08L 33/02 |

FOREIGN PATENT DOCUMENTS

| | | |
|---|---|---|
| CA | 2874093 A1 | 12/2013 |
| CA | 2876660 A1 | 6/2015 |
| CA | 2894376 A1 | 12/2015 |
| CA | 2931913 A1 | 12/2016 |
| CA | 2975484 A1 | 2/2018 |
| WO | 2013130794 A1 | 9/2013 |

OTHER PUBLICATIONS

Mikula, R.J., et al., Bitumen recovery and surfactant distribution in oil sands process streams, The world heavy oil congress: 2009 business and technical conference, Margarita Island (Venezuela), Nov. 3-5, 2009, (Jul. 1, 2009), downloaded from https://www.osti.gov/etdeweb/biblio/21248903 Jun. 12, 2023. (Year: 2009).*

"Drying Organic Solutions," Organic Chemistry at CU Boulder, https://orgchemboulder.com/Technique/Procedures/Drying/Drying.shtml (page version dated Nov. 30, 2016 per WayBackMachine Internet Archive) (downloaded Jun. 12, 2023) (Year: 2016).*

International Search Report and Written Opinion of the International Searching Authority for PCT/CA2018/050123 mailed on May 4, 2018.

\* cited by examiner

| Exp. # | Ionic Liquids | Source | Result (discoloration)[a] | |
|---|---|---|---|---|
| 1 | 1-ethyl-3-methylimidazolium acetate ([C$_2$mim][OAc]) | Commercial (IoLiTec) | + |  |
| 2 | 1-ethyl-3-methylimidazolium bis(trifluoromethylsulfonyl) imide ([C$_2$mim][NTf$_2$]) | Commercial (IoLiTec) | + |  |
| 3 | n-butylammonium acetate ([C$_4$NH$_3$][OAc]) | Synthesized[b] | + | 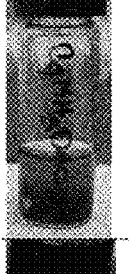 |
| 4 | n-butylammonium oleate ([C$_4$NH$_3$][Oleate]) | Synthesized[b] | +++ |  |
| 5 | n-hexylammonium oleate ([C$_6$NH$_3$][Oleate]) | Synthesized[b] | +++ |  |

FIGURE 44

| 6 | n-octylammonium oleate ([C₈NH₃][Oleate]) | Synthesized[b] | +++ |  |
| 7 | Trihexyltetradecylphosphonium chloride ([P₆₆₆₁₄]Cl) | Commercial (IoLiTec) | +++ |  |
| 8 | Trihexyltetradecylphosphonium bis(trifluoromethylsulfonyl) imide ([P₆₆₆₁₄][NTf₂]) | Commercial (IoLiTec) | +++ |  |
| 9 | [C₂mim][OAc] + [C₂mim][NTf₂] (x=0.5) | Mixture prepared in the lab | ++ |  |
| 10 | [C₂mim][OAc] + [P₆₆₆₁₄][NTf₂] (x=0.5) | Mixture prepared in the lab | +++ |  |

| 11 | Choline acetate | Synthesized[b] | +++ |  |
| 12 | Triethanolammonium oleate | Synthesized[c] | +++ |  |
| 13 | n-dodecylammonium oleate ([$C_{12}NH_3$][Oleate]) | Synthesized[b] | +++ |  |
| 14 | n-dodecylammonium butyrate ([$C_{12}NH_3$][Butyrate]) | Synthesized[b] | +++ |  |
| 15 | n-dodecylammonium octanoate ([$C_{12}NH_3$][Octanoate]) | Synthesized[b] | +++ |  |

| 16 | n-octylammonium octanoate ([C₈NH₃][Octanoate]) | Synthesized[b] | +++ |  |
| 17 | n-octylammonium butyrate ([C₈NH₃][Butyrate]) | Synthesized[b] | +++ |  |
| 18 | Triethanolammonium stearate | Synthesized[c] | +++ |  |
| 19 | Choline formiate | Synthesized[b] | ++ |  |
| 20 | Cocamidopropyl betainium oleate ([CocoBet][Oleate]) | Synthesized[c] | +++ |  |

| 21 | n-octylammonium stearate ([C₈NH₃][Stearate]) | Synthesized[b] | +++ |  |

[a] (+) Partial discoloration; (++) Liquid phase dark; (+++) Liquid phase black; [b] Synthesized following the procedure reported by McCrary et al, 2013; [c] Synthesized following the procedure reported by Berton et al, 2017

DECONSTRUCTION OF OILSAND MATERIALS USING IONIC LIQUIDS

CROSS REFERENCE TO RELATED APPLICATIONS

This application is a divisional of U.S. patent application Ser. No. 16/483,093 filed on Aug. 2, 2019, which is a 371 National Phase of PCT/CA2018/050123, filed on Feb. 2, 2018, published in English on Aug. 9, 2018, as WO2018/141067 A9 and which claims priority to U.S. Provisional Application No. 62/454,406 filed on Feb. 3, 2017, the entire disclosure of these applications being hereby incorporated herein by reference.

FIELD OF THE INVENTION

The invention is in the field of material separations, in particular separating solid material from water as in the separation of the components of tailings waste streams from oilsands mining operations. The invention also pertains to the separation of bitumen, clay and sand, for example from oilsands materials, in processes that involve the use of selected ionic liquids, for example at ambient temperatures and pressures.

BACKGROUND OF THE INVENTION

Ionic liquids are salts with melting points less than 200° C. that exhibit complex anionic-cationic interactions that yield unconventional properties, including selective solubility, purification, and miscibility. A simple example of unconventional chemical behaviour is the ionic liquid ethylmethylimidazolium bis (trifluoromethyl sulphonyl) amide which is polar, but not miscible with water. One of the unusual attributes of many ionic liquids is the property of very low vapour pressure exhibited in many cases up to very high temperatures.

In some processes for heavy oil recovery, oilsand is treated in a bitumen extraction facility in which it is mixed with hot caustic water. This effects a separation of the bitumen and sand whereby the sand sinks and the bitumen floats to the surface of the water where it is skimmed off. The tailings from this process are a mixture of sand, clay, and water, with minor amounts of bitumen and other contaminants such as heavy metals. This tailings stream is typically piped to a tailings processing facility where the coarse tailings (sand) are separated from the fine tailings (clay, bitumen, and water). The fine tailings are deposited into tailings ponds to be separated by gravity settling. With time, the fine solids become concentrated into a clay-water suspension referred to as mature fine tailings (MFT). While approximately 80% of the water used in the extraction process is typically recycled tailings water, the resultant clay-water suspension that is un-recyclable can take many years to settle out and be reclaimed.

SUMMARY OF THE INVENTION

Aspects of the present invention involve the separation of bitumen from oilsand using ionic liquids (ILs). In select embodiments, these processes may for example provide a reduction in the amount of water used to produce a unit of bitumen. In alternative aspects, it is disclosed herein that certain ILs have a high propensity for the removal of fine clay particles from aqueous suspensions. Processes are accordingly provided for the treatment of oilsand liquid waste streams which are referred to as tails, tailings or mature fine tailings.

In one aspect, the invention provides a process for the use of an IL to treat liquid waste streams in the form of slurries from industrial processes such that a solid, finely dispersed particulate phase is separated from a liquid phase, wherein said waste stream is tailings from the processing of oilsand, and said tailings are composed of an intimate mixture of water, bitumen, and fine clay particles which are dispersed to form the slurry.

In another aspect, the invention provides a process for the use of an ionic liquid as a bitumen diluent, to provide a stable IL-dilbit having low vapour pressure and a density below that of water.

In another aspect, the invention provides a process for the use of an ionic liquid to extract bitumen from an oilsand, wherein the bitumen is extracted into a phase comprising a mixture of the ionic liquid and bitumen.

In another aspect, the invention provides a process comprising use of an ionic liquid to break an oil-water emulsion.

In another aspect, the invention provides a process comprising the use of an ionic liquid to elicit a miscible displacement of oil from a porous mineral reservoir.

In another aspect, the invention provides a process comprising use of an ionic liquid as a corrosion inhibitor for steel infrastructure.

In another aspect, the invention provides a process comprising use of an ionic liquid to transport $CO_2$.

In another aspect, the invention provides a process for treating mature fine tailings (MFT) comprising mixing an ionic liquid with a MFT mixture comprising clay particles and bitumen contaminants suspended in saline MFT water, to form an IL/MFT phase; and separating the IL/MFT phase into two phases, a first phase comprising the clay particles, bitumen contaminants and the IL, and a second aqueous phase comprising more than about 30% of the MFT water.

In another aspect, the invention provides use of an ionic liquid to extract bitumen from an oilsand, wherein the bitumen is extracted into a phase comprising the IL.

In another aspect, the invention provides use of octylammonium oleate ($[C_8NH_3][Oleate]$) to break an oil-water emulsion or to transport $CO_2$.

Other aspects and features of the present invention will become apparent to those of ordinary skill in the art upon review of the following description of specific embodiments of the invention in conjunction with the accompanying claims.

BRIEF DESCRIPTION OF THE DRAWINGS

In drawings which illustrate embodiments of the invention.

DETAILED DESCRIPTION

In the context of the present application, various terms are used in accordance with what is understood to be the ordinary meaning of those terms.

The terms "ionic liquid" (IL) or "ionic salt" refer to a salt which has a melting point below 200° C. In various embodiments, the IL is insoluble in water, soluble in non-polar organic solvent, or insoluble in water and soluble in non-polar organic solvent. In various embodiments, the IL is a surface active ionic liquid. The term "surface active ionic liquid" includes ionic liquids which contain at least one ion with amphiphilic character under certain conditions. Surface active ionic liquids have surfactant-like properties. In various embodiments, both ions of the surface active ionic liquid have amphiphilic character. Examples of surface active ionic liquids include octylammonium oleate, triethylammonium oleate, hexadecylammonium oleate and octylammonium stearate.

As used herein, the terms "about" and "approximately" refer to a +/−10% variation from a given value. It is to be understood that such a variation is always included in any given value provided herein, whether or not it is specifically referred to.

Figure 6:
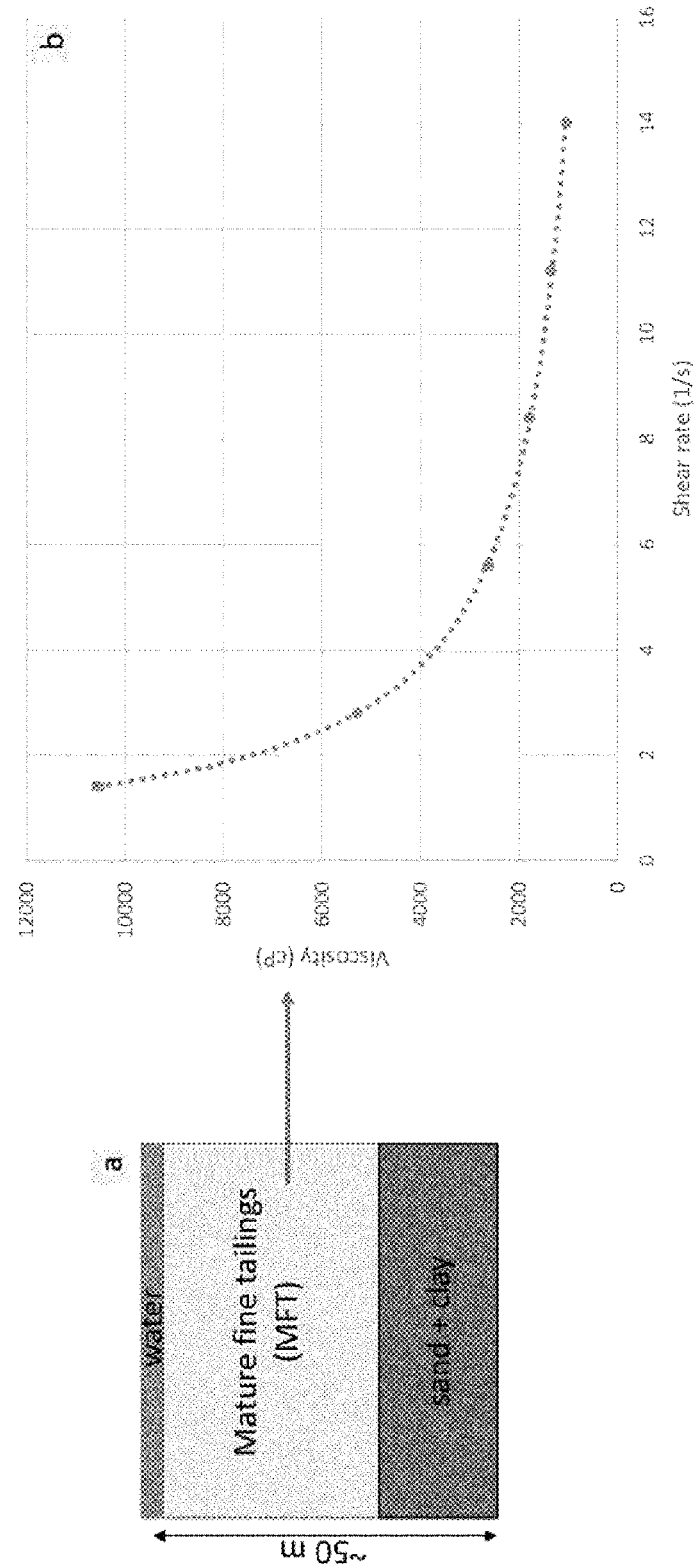
FIG. 6(a): Schematic diagram of stratification in a tailings pond after gravity settling. The MFT for this Example was sampled at a depth of approximately 25 m. (b) Graph of viscosity versus shear rate for a mature fine tailings sample showing thixotropic behaviour of the clay-water suspension. Error bars on the plot were negligible.

Oil sands tailings are typically a mixture of caustic water, clay, bitumen, and contaminants such as other hydrocarbons, and heavy metals. The clay particles, which range from micron to nanosized, eventually form a concentrated colloidal suspension in the water. The suspension forms a thick layer a few meters below the surface of a pond, and further separation of water from this layer takes many years as the rate at which clay settles out of this suspension by gravity is extremely slow. Despite considerable attention to this challenge, this method remains the industry's only approach by which to achieve this separation. This results in a long-term legacy of stratified tailings ponds with sand and coarse clay particles migrating towards the bottom, mature fine tailings in the middle (fine clay and water suspension), and a water layer on the top as seen in the schematic of FIG. 6a. Included in the following Examples are various processes for the treatment of MFT, as well as the treatment of other oilsands materials.

EXAMPLES

These examples illustrate various aspects of the invention, evidencing a variety of reservoir operating conditions. Selected examples are illustrative of advantages that may be obtained compared to alternative separation processes, and these advantages are accordingly illustrative of particular embodiments and not necessarily indicative of the characteristics of all aspects of the invention.

Unless otherwise stated, the MFT used in the following examples was purchased from InnoTech Alberta (Calgary, AB, Canada). Its analysis was determined using the method developed by Dean and Stark (Dean & Stark, Ind. Eng. Chem. 1920, 12, 486-490) to gravimetrically measure bitumen, solids, and water content of tailings after reflux with toluene. The MFT composition was determined to be 67.7 (1.4)% water, 30.6 (0.4)% solids, and 1.70 (0.04)% bitumen. The water that was separated using high speed centrifugation had a pH of 8.62. The average Cation Exchange Capacity (CEC) of the MFT, calculated using the BaCl2-MgSO4 procedure (Pansu 2007), was determined to be 5.58 cmol/kg (equivalent to 5.58 meq/100 g MFT).

Table 1 shows a summary of an ICP-MS elemental assay that was completed on the water that had been produced from untreated MFT, showing that the elemental contaminants present in the produced water are predominantly Na, K, Ca, Sr, Al, and Mg as expected. The Clark hot water extraction process was designed to use sodium hydroxide as the main source of caustic, and the majority of the water used in the process was taken from the Athabasca river which is expected to be rich in total dissolved solids. Furthermore, the exposure of the water to clay particles leads to the pervasive presence of the elements Al and Mg.

TABLE 1

ICP-MS elemental analysis of untreated MFT water.

| Species | Concentration (ppbw) | Error (+/−) (ppbw) |
|---|---|---|
| Na | 398,887.54 | 110,305.05 |
| Mg | 28,269.33 | 18,031.25 |
| Al | 1,626.16 | 1,157.40 |
| K | 33,940.05 | 11,914.98 |
| Ca | 42,266.77 | 28,623.89 |
| V | 5.50 | 5.04 |
| Cr | 1.55 | 1.44 |
| Mn | 201.66 | 166.15 |
| Fe | 222.93 | 174.84 |
| Co | 3.53 | 3.40 |
| Ni | 11.64 | 8.90 |
| Zn | 106.54 | 82.98 |
| Ga | 0.54 | 0.55 |
| As | 0.98 | 0.54 |
| Se | 0.76 | 0.79 |
| Sr | 1,257.73 | 792.38 |
| Cd | 0.02 | 0.01 |
| Ba | 188.21 | 93.09 |
| U | 1.08 | 0.06 |

The second MFT used in these Examples (hereinafter referred to as "MFT-Field") was a field sample that was collected from an approximate depth of 25 m from a tailings pond in Northern Alberta. The MFT sample was determined to be approximately 54.25 wt % water, 2 wt % bitumen, and the balance (43.75 wt %) clay. The water that was separated had a pH of 8.62. The average Cation Exchange Capacity (CEC) of the MFT, calculated using the $BaCl2\text{-}MgSO_4$ procedure (Pansu 2007), was determined to be 5.58 cmol/kg (equivalent to 5.58 meq/100 g MFT).

The viscosity of the MFT-Field prior to mixing was determined to be a function of shear rate (FIG. 6a). As MFT is a fine particle suspension, it behaves as a thixotropic liquid (FIG. 6b), with viscosities measured within the range of 1,000-10,500 cP when the shear is increased.

When mentioned, the following dilution factors were applied to the MFT-Field (Table 2).

TABLE 2

Dilution factors and corresponding solids content of MFT-Field samples

| Volumetric dilution factor (DI water) | Solids (wt %) | Solids (vol %) |
|---|---|---|
| Undiluted | 43.8 | 29.5 |
| 1.25x | 36.5 | 23.6 |
| 1.5x | 31.3 | 19.7 |
| 2.0x | 24.3 | 14.8 |
| 3.0x | 16.8 | 9.8 |

In the Examples that follow, the ILs were either synthesized or purchased as described below.

The ILs choline acetate ([Cho][OAc]), trihexyltetradecylphosphonium choride ($[P_{66614}][Cl]$), trihexyltetradecylphosphonium bis(trifluoromethylsulfonyl)amide ($[P_{66614}][NTf_2]$), 1-ethyl-3-methylimidazolium acetate bis (trifluoromethylsulfonyl) imide ($[C_2 \text{ mim}][NTf_2]$), 1-ethyl-3-methylimidazolium acetate ($[C_2 \text{ mim}][OAc]$) were purchased from IoLiTec (Tuscaloosa, AL, USA).

The IL choline formate ([Cho][Formate]) were synthesized via neutralization of the base (choline) with the acid, following a reported procedure (Yu et al., Chem.-Eur. J. 2008, 14, 11174-11182). Briefly, formic acid (0.1 mol) was added dropwise into an aqueous solution of choline hydroxide (0.1 mol). The mixture was stirred continuously using a magnetic stirrer for 12 h at room temperature (~22° C.). The obtained IL was dried for 6 h under vacuum using a rotary evaporator (R-210, Buchi, Switzerland), followed by freeze drying for 4 days. $^1$H-NMR (360 MHz, DMSO-d6) and attenuated total reflection-Fourier Transform Infrared spectroscopies were used to confirm the identity and purity of the synthesized IL.

Figure 2:
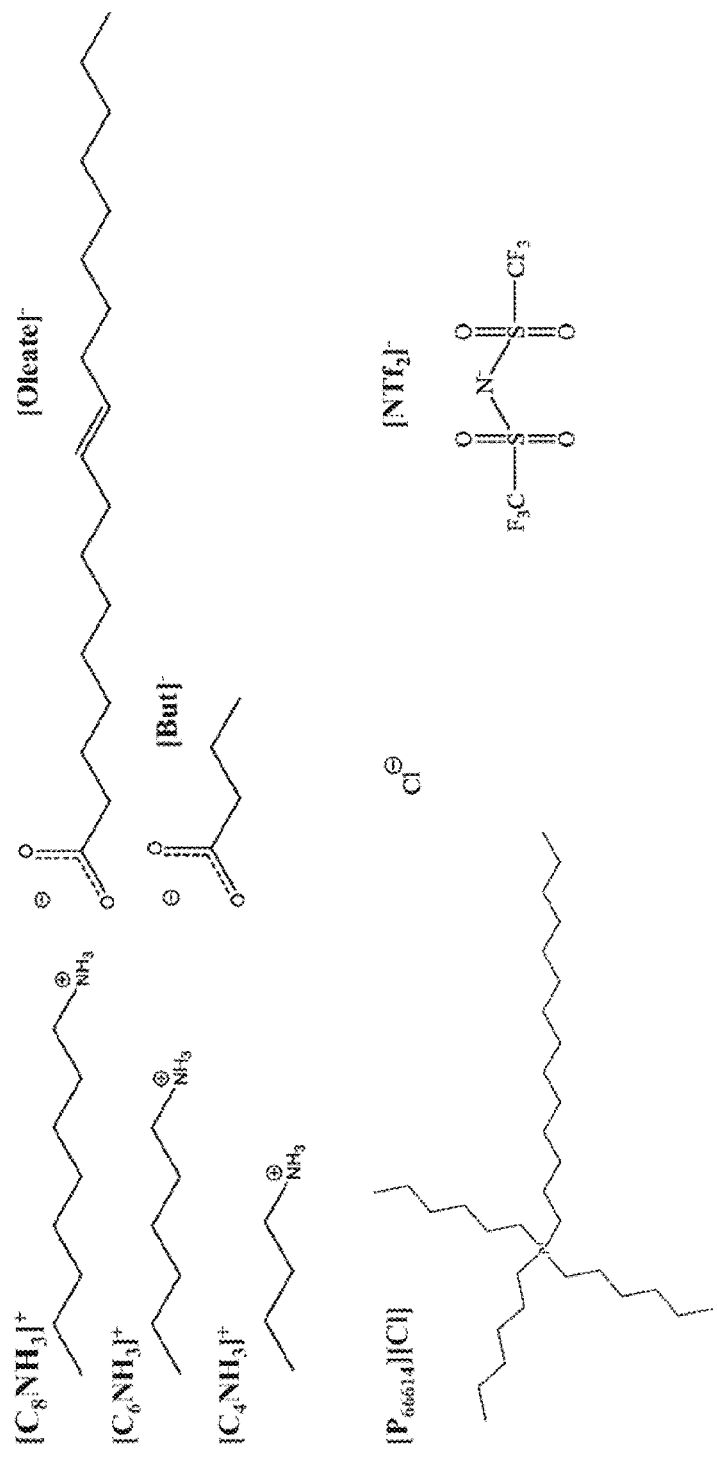
FIG. 2: Molecular structures of examples of cations and anions of ionic liquids.

The ILs n-alkylammonium acetate ($[C_n NH_3][OAc]$, with n=4, 16), n-alkylammonium butyrate ($[C_n NH_3][Butyrate]$, with n=8, 12, 16), n-alkylammonium octanoate ($[C_n NH_3][Octanoate]$, with n=8, 12, 16), n-alkylammonium oleate ($[C_n NH_3][Oleate]$, with n=4, 6, 8, 12, 16), octylammonium stearate ($[C_8 NH_3][Stearate]$), triethylammonium oleate ($[HN_{222}][Oleate]$), and cocamidopropyl betaine oleate ([CocBet][Oleate]) were synthesized and purified as previously reported (McCrary et al., New J. Chem. 2013, 37, 2196-2202). N-Butylamine, n-hexylamine, n-octylamine, n-dodecylamine, n-hexadecylamine, acetic acid, butanoic acid, octanoic acid, oleic acid, triethylamine, and stearic acid were purchased from Sigma-Aldrich (St. Louis, MO, USA) and used as received. Cocamidopropyl betaine was purified from Amphosol CG (Stepan Canada Inc., Burlington, ON, Canada) using DMSO and then cooled to −20° C. to precipitate. The n-alkylamine (10 mmol) was placed in a 500 ml two-neck round bottom flask cooled using an ice water bath to 0° C. while stirring vigorously using a magnetic stir bar. A condenser was placed on the top of the round bottom flask. The second end of the neck was covered using a rubber stopper. The carboxylic acid (acetic, butyric or oleic acid, 10 mmol) was added drop-wise while maintaining the temperature at 0° C. Each reaction was immediately exothermic and turned a light yellow shade upon finishing the addition. The reactions were stirred overnight remaining in the water bath, but the temperature was allowed to slowly rise to ambient conditions. $^1$H-NMR (360 MHz, DMSO-d6) was used to confirm the product and purity. FIG. 2 shows the molecular structures for $[P_{66614}][Cl]$, $[P_{66614}][NTf_2]$, $[C_4 NH_3][Oleate]$, $[C_6 NH_3][Oleate]$, $[C_8 NH_3][Oleate]$, and $[C_8 NH_3][Butyrate]$.

The ILs triethanolammonium oleate ($[OHN_{222}][Oleate]$) and triethanolammonium stearate ($[OHN_{222}][Stearate]$) were synthesized as previously reported (Berton et al., Fluid Phase Equilib. 2017, 450, 51-56). Triethanolamine (50 mmol) and oleic acid (50 mmol) or stearic acid (50 mmol) were mixed in a vial, sealed and heated to 40° C. (at 70° C. for $[OHN_{222}][Stearate]$) with stirring until a clear liquid was obtained. The product was cooled to room temperature to yield $[OHN_{222}][Oleate]$ (or $[OHN_{222}][Stearate]$) in quantitative yield, confirmed using $^1$H-NMR.

The oilsand used in these Examples was determined by toluene extraction to have a bitumen concentration of approximately 15.27 wt % (density 0.9311±0.02 g/cm$^3$). It was collected from a Northern Alberta oilsands processing facility.

Water samples were analyzed using an Agilent Technologies Cary 630 FTIR with a diamond attenuated total reflectance sampling accessory. An Agilent HP5975 gas chromatogram-mass spectrometer was used for all GC-MS analyses and water samples were diluted in methanol. NMR spectroscopy was completed using a Bruker DMX-300 spectrometer (360 MHz), and samples were diluted using d6-dimethylsulfoxide or deuterated water.

Clay particle analysis was completed using a Tecnai F20 transmission electron microscope at 200 kV accelerating voltage. All viscosity measurements were carried out using a Brookfield DV2T viscometer with a small sample adapter and spindle SC4-27 or LV-4. Density was measured on a Metier Toledo DM40 density meter. Optical microscopy was collected using a Zeiss Axio Vert.A1 observer.

Example 1: Tailings Remediation and Evaluation of Ionic Liquids

Figure 3:
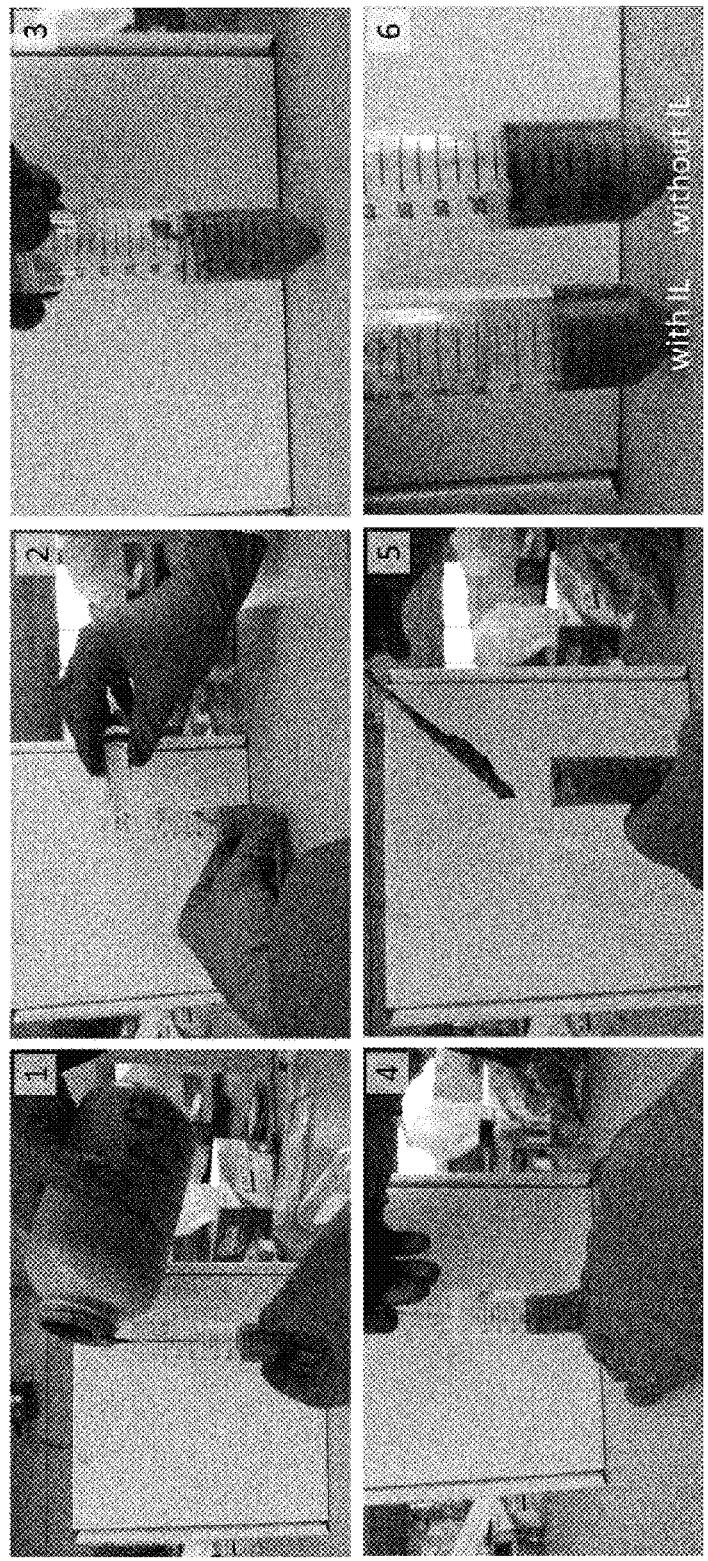
FIG. 3: Experimental procedure outlining the treatment of MFT with IL ([$C_8NH_3$][Oleate] used in the Figure). (1) 20 mL of MFT was measured out. (2 & 3) 17 vol % [$C_8NH_3$][Oleate] was added. (4) Mixture was stirred by hand with a glass stir rod for 30 s. (5) Mixture thickened to a gel-like substance. (6) After centrifuge at 2500 rpm for 5 min. Left is MFT with [$C_8NH_3$][Oleate], right is MFT without IL.
Figure 4:
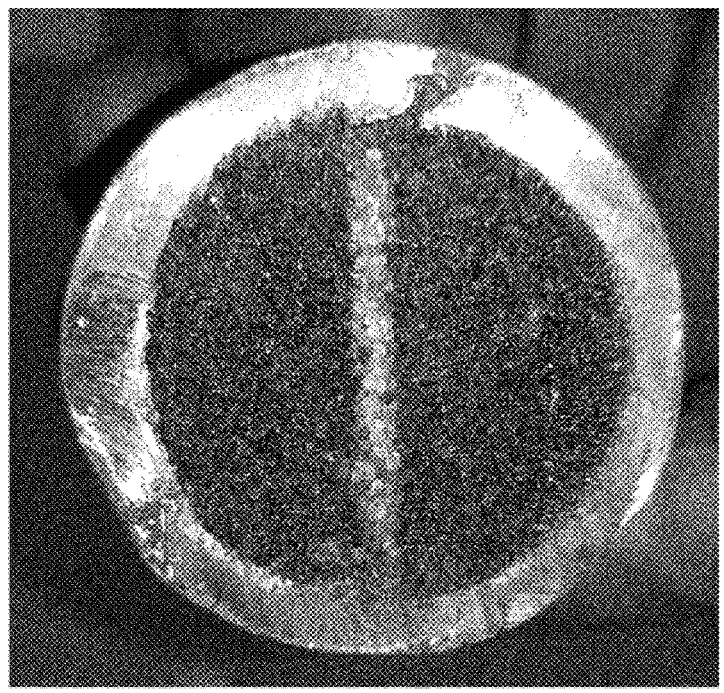
FIG. 4: Cross section of the core near the center, highlighting the morphology of the channel of clean sand that extended along the entire length of the core to create a "flow-past" scenario for the IL. The inner diameter of the core was 3.35 cm.
Figure 5:
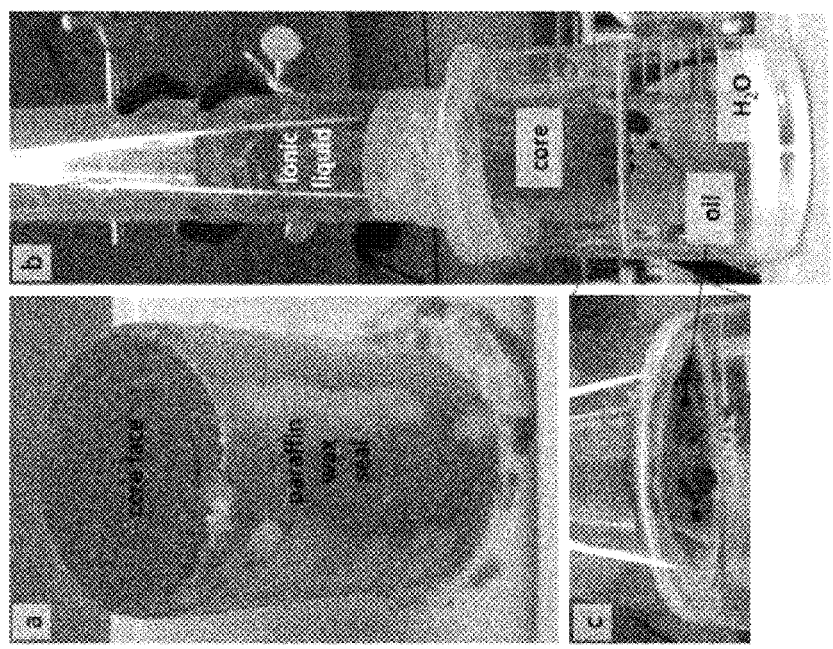
FIG. 5: Experimental setup to demonstrate oil production from a mineral reservoir via miscible displacement using a head pressure of [$C_8NH_3$][Oleate]. (a) Berea sandstone core that was imbibed with Bakken oil after paraffin wax seal was applied around outer surface, (b) Column with core installed at end and exposed to a hydrostatic pressure gradient of 794 Pa using IL. Oil is seen flowing out the bottom of the core, (c) Oil being produced from the bottom of the core as IL flows in from the top. Water level is even with the bottom face of the core.

FIG. 3 shows a summary of the procedure for this Example. In a typical demonstration, a volume of MFT was measured out and mixed with 0.1 or 0.2 mL of IL per mL of MFT (approximately 9 and 17 vol % respectively) by stirring using a glass stir rod for 30 sec. When the ILs $[C_8NH_3][Oleate]$ or $[C_8NH_3][Oleate]$ were used, the mixtures were observed to rapidly thicken into a gel-like substance during the mixing. On the other hand, with the use of the ILs $[P_{66614}][Cl]$, $[P_{66614}][NTf_2]$, $[C_4NH_3][Oleate]$, and $[C_8NH_3][Butyrate]$, the mixtures remained liquid, forming a suspension. The mixtures were then centrifuged at 2500 rpm for 15 min to effect a separation of the water from the clay and IL. Depending on the IL being evaluated, the water phase was relatively easy to differentiate from the solid phase and usually appeared as a clear layer on top of the clay phase (FIGS. 3-5).

Different ILs were evaluated to recover the water present in the MFT and they formed mixtures with varying morphologies. For example, upon addition of the ILs $[C_8NH_3][Oleate]$ or $[C_8NH_3][Oleate]$ to the MFT, the mixture was observed to thicken and solidify into a gel-like substance that became difficult to stir by hand. On the other hand, upon the addition of the ILs $[P_{66614}][Cl]$, $[P_{66614}][NTf_2]$, $[C_4NH_3][Oleate]$, and $[C_8NH_3][Butyrate]$, the mixture remained liquid, forming a suspension, which was easy to stir. These mixtures were then centrifuged at 2500 rpm for 15 min and an example of the resulting separation of phases is shown in FIG. 3 and FIG. 7.

Figure 7:
FIG. 7: Vials with MFT that were treated with different ILs, after centrifugation.

FIG. 7 shows the MFT treated with the different ILs. Due to the low density of ILs $[P_{66614}][Cl]$ and $[C_4NH_3][Oleate]$, after centrifugation an upper phase containing the IL was observed. Since the IL $[C_8NH_3][Butyrate]$ is soluble in water, an aqueous phase was obtained above the solid phase that showed a yellow tone, indicating the presence of the IL in the aqueous phase. Due to its higher density, and low affinity of the IL $[P_{66614}][NTf_2]$ to both water and bitumen, the IL formed an intermediate phase. The addition of $[C_6NH_3][Oleate]$ did not result in any water recovery, due to its partial affinity with both the liquid and solid phases present in the system.

Example 2: Centrifugation as a Separation Force

Figure 8:
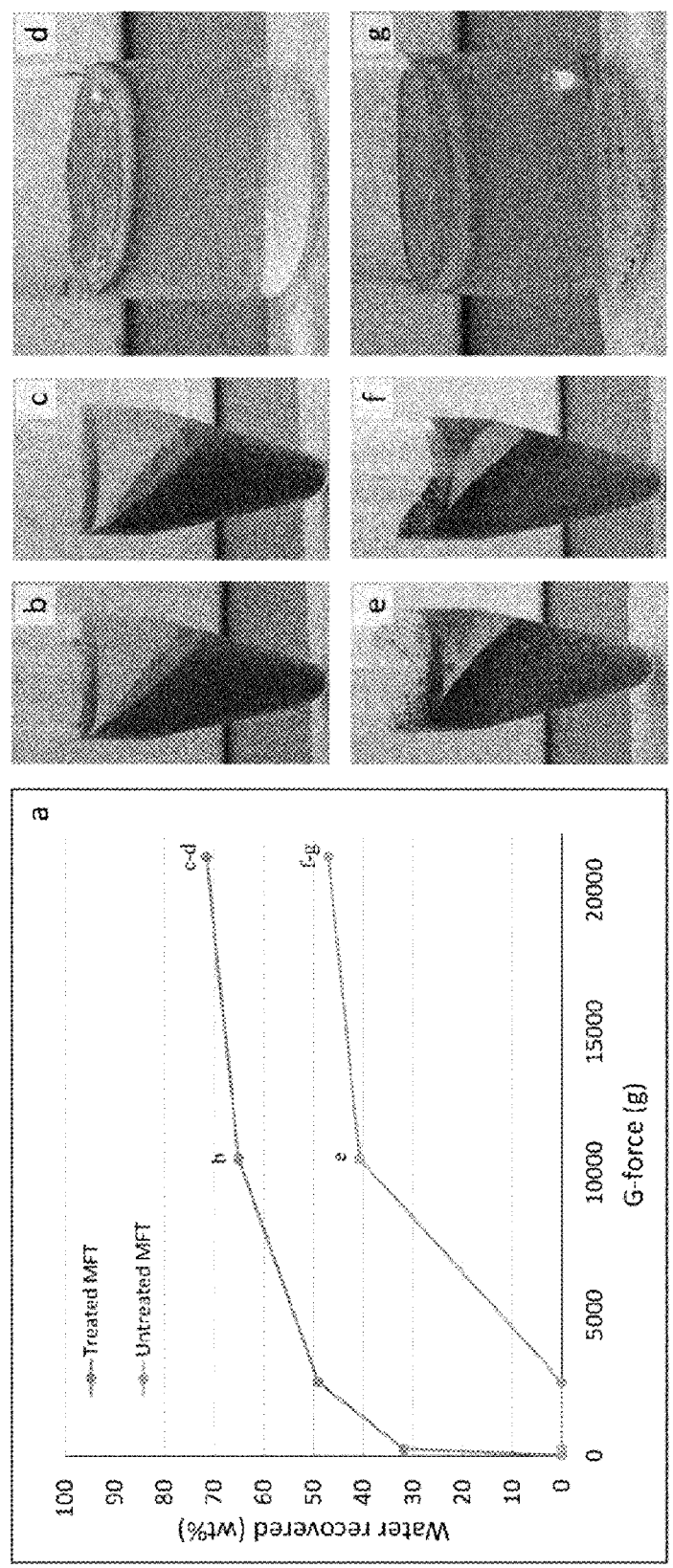
FIG. 8a: Graph of water recovered from treated and untreated MFT samples as a function of centrifuge speed, (b) Treated sample, 10,509 g. (c) Treated sample, 21,191 g. (d) Close up of water phase from (c). (e) Untreated sample, 10,509 g. (f) Untreated sample, 21,191 g. (g) Close up of water phase from (f).

In various embodiments, centrifugation may be used as a separation force. In the case of the system containing $[C_8NH_3][Oleate]$, the water recovered from the MFT sample was 60.3 wt % of the total water that resides in the MFT (this MFT was 54.25 wt % water). The recoverable water was determined to be a function of centrifuge speed for both treated and untreated samples as shown in FIG. 8. 20 mL MFT was mixed with 4 mL $[C_8NH_3][Oleate]$ in a 50 mL centrifuge tube. The mixture was stirred by hand for 30 sec, using a glass stir rod. Fractions of the resulting mixture were placed into 5 mL Eppendorf tubes, and the tubes were centrifuged at different speeds (from 500, 2500, 5000, 10000 and 14200 rpm) for 5 min. The water was decanted and weighed. The recovered water was determined to be a function of centrifuge speed for both treated and untreated samples (FIG. 8). The enhancement of water recovery using $[C_8NH_3][Oleate]$ occurred at all centrifuge speeds tested.

FIGS. 8b and 8c show treated MFT samples that were centrifuged at 10,000 rpm (10,509 g) and 14,200 rpm (21,191 g) respectively. FIG. 8d shows a close up view of the water that was separated from the sample from FIG. 8c. Both speeds were highly effective at separating water from the treated MFT and the water shows negligible turbidity. FIGS. 8e, 8f, and 8g show centrifuged samples of untreated MFT at the same speeds as FIGS. 8c and 8d. While water was still recovered from these samples, FIG. 8f shows a sample that was much more turbid compared to the treated samples. Furthermore, FIGS. 8e and 8f show evidence of bitumen clinging to the sides of the Eppendorf tubes, and this contamination is absent in the corresponding treated samples. This observation provides evidence that the contamination associated with MFT may be effectively immobilized by the IL, and stays with the phase containing the clay.

Figures 11, 12:
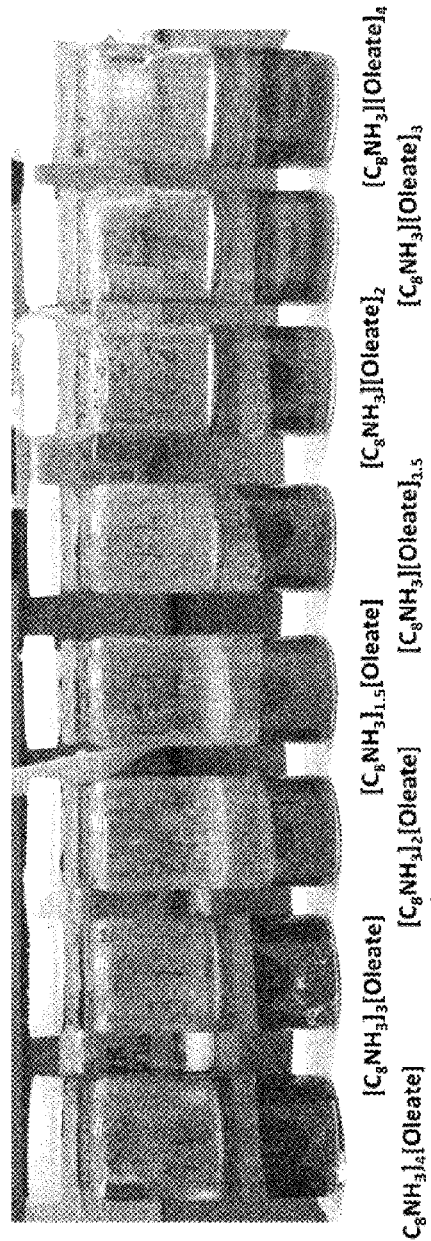
FIG. 11: Resulting phases after MFT treatment using different hydrophilic ILs.
FIG. 12: Resulting phases after MFT-Field treatment using [$C_8NH_3$]n[Oleate]m, with n:m ratios from 4:1 to 1:4.

Further experiments were conducted to evaluate different ILs using MFT-Field. 5 g MFT-Field was placed in a 20 ml vial and 1 g IL were added. The mixture was stirred by hand using a stir rod for 30 sec at room temperature. The mixtures were then centrifuged at 3000 rpm for 20 min to effect a separation of the water from the clay and IL. Depending on the IL being evaluated, the water phase was relatively easy to differentiate from the solid phase and usually appeared as a clear layer on top of the clay phase (FIGS. 9-11).

Figures 9, 10:
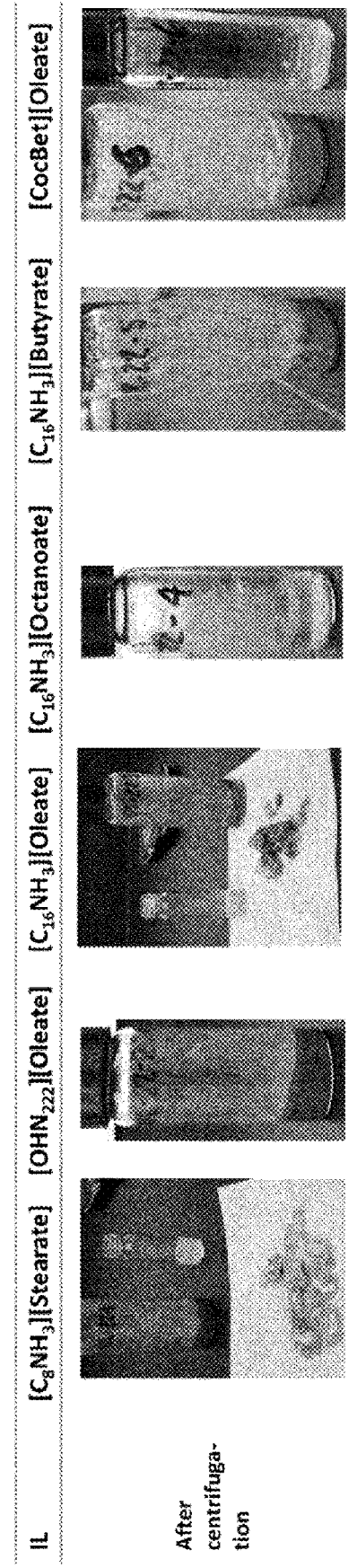
FIG. 9: Resulting phases after MFT-Field treatment using different hydrophobic ILs.
FIG. 10: Resulting phases after MFT-Field treatment using different hydrophobic ILs.

In FIG. 9, the results of MFT-Field treatment using hydrophobic ILs, which are liquids at room temperature, are shown. The ILs $[P_{66614}]Cl$, $[C_4NH_3][Oleate]$, and $[P_{66614}][NTf_2]$ were observed to be effective for water separation, although the IL, or part of it, was observed above or below the upper phase (depending on the density of the IL). The addition of $[C_6NH_3][Oleate]$ or $[HN_{222}][Oleate]$ did not result in any water recovery. In the case of the system containing $[C_8NH_3][Oleate]$, the water recovered from the MFT-Field sample was clear, and the IL remained in the MFT solids.

Ionic liquids with melting points close to or higher than room temperature were evaluated for MFT-Field treatment, following the same procedure described above. The ILs evaluated were $[C_8NH_3][Stearate]$, $[OHN_{222}][Oleate]$, $[C_{16}NH_3][Oleate]$, $[C_{16}NH_3][Octanoate]$, $[C_{16}NH_3][Butyrate]$, and $[CocBet][Oleate]$. As can be seen in FIG. 10, water was recovered with the ILs $[C_8NH_3][Stearate]$, $[C_{16}NH_3][Oleate]$, $[C_{16}NH_3][Octanoate]$, and $[CocBet][Oleate]$, although solids (most probably IL) were observed in the water phase. In the case of $[OHN_{222}][Oleate]$ or $[C_{16}NH_3][Butyrate]$, no water was separated.

Ionic liquids miscible with water were also evaluated for MFT treatment, following the same procedure described above (FIG. 11). The ILs evaluated were $[C_4NH_3][OAc]$, $[C_2mim][OAc]$, and $[C_8NH_3][Butyrate]$. In the case of the first two ILs, a paste (not sticky) was formed after stirring, while the sample containing $[C_8NH_3][Butyrate]$ remained liquid. After centrifugation, all three ILs showed a clear separation of water. In the case of the IL $[C_8NH_3][Butyrate]$, the aqueous phase showed a yellow tone, indicating the presence of the IL in the aqueous phase. In all cases, water phase was decanted, weighted, and placed in the oven for water evaporation. Approximately, 50% water was extracted (from the water initially present in the MFT), and 50% of IL was recovered from the water phase (after water evaporation).

Example 3: Parameters Affecting MFT Treatment Using [$C_8NH_3$][Oleate]

Parameters affecting MFT treatment using [$C_8NH_3$][Oleate] were evaluated. 5 mL MFT-Field was placed in a 20 mL vial and 1 g IL were added. The mixture was stirred by hand using a stir rod for 30 sec at room temperature and were centrifuged at 3000 rpm for 20 min to effect a separation of the water from the clay and IL. In the case of the system containing [$C_8NH_3$][Oleate] (FIG. 9), the water recovered from the MFT sample was 60.3 wt % of the total water that resides in the MFT (the MFT-Field contained 54.25 wt % water).

Different amine:fatty acid ratio compositions ([$C_8NH_3$]n[Oleate]m, with n:m ratios from 4:1 to 1:4) were evaluated (FIG. 12). In this case, the ILs with different compositions were prepared and used for this application following the described procedure above. It was observed that with compositions higher than 2:1 (excess of amine) or of 1:2 (excess of acid) an upper phase was observed, composed in its majority by oleate/oleic acid (confirmed by $^1$H-NMR).

Example 4: Characterization of the Water Phase

Figure 13:
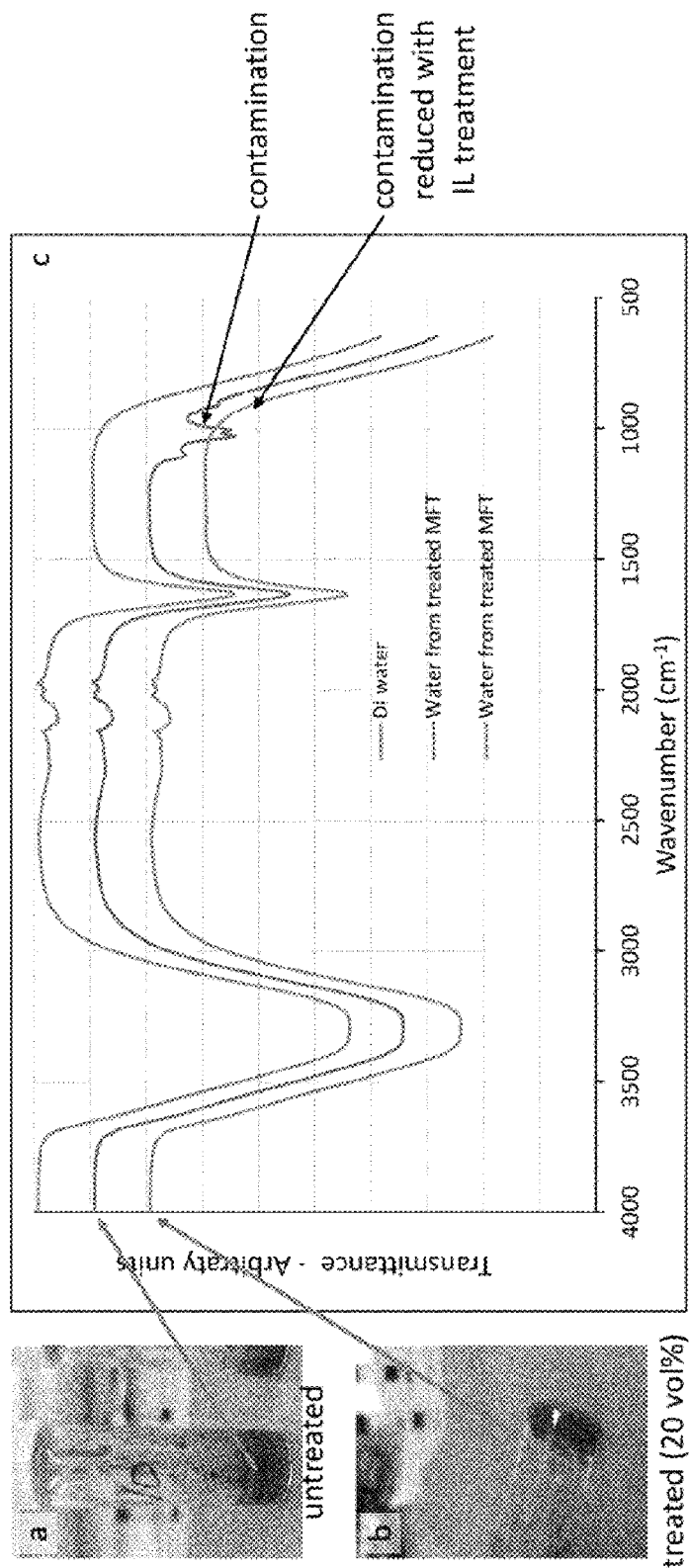
FIG. 13(a,b): Vials with untreated MFT and treated MFT after centrifugation respectively, (c) Graph of FTIR spectra for DI water, and for water from samples in (a) and (b). Contamination reduction in the treated sample is evident.

The [$C_8NH_3$][Oleate] was visually observed to be retained completely in the clay phase and this was further supported by analysis of the separated water. FIG. 13 shows a series of Fourier transform infrared spectroscopy (FTIR) scans of deionized water, water from untreated MFT after centrifugation, and water from treated MFT after centrifugation. Peaks associated with contamination are labelled in the untreated scan, and disappear in the treated scan, indicating that the contaminants that were detected remain in the clay phase and are thus separated by the centrifugation step. Approximately 71 wt % of the water was separated from treated MFT by centrifugation, at a speed of 14,200 rpm which represents a centripetal force of 21,191 g.

Figure 14A:
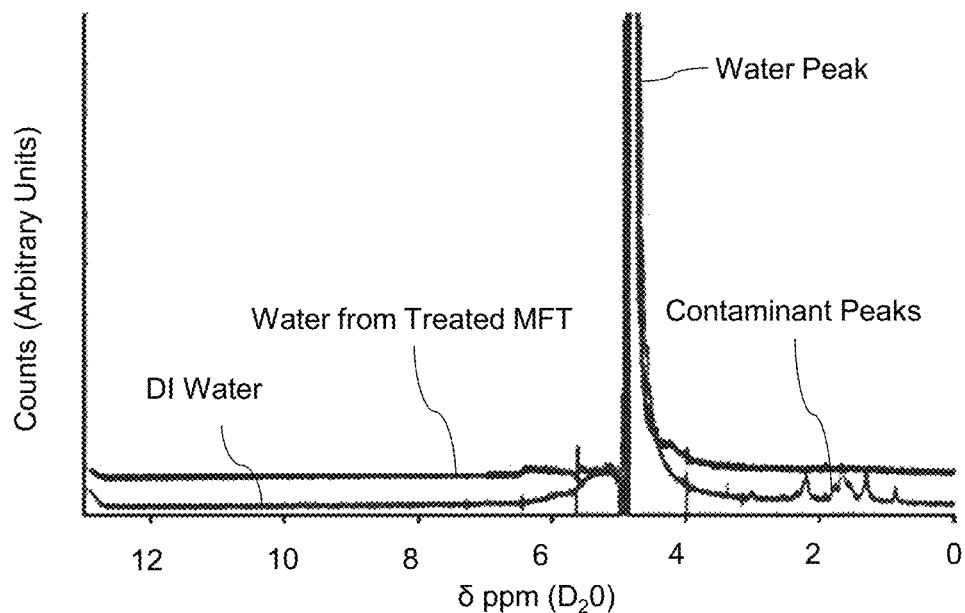
FIG. 14(a,b,c): (a) NMR of D I water and water from treated MFT. (b) A small amount of contamination is seen in the treated sample (peaks at 1-2 ppm) and likely due to the presence of alkali species, (c) Elemental analysis of the recovered water from MFT before and after treatment with the IL [$C_8NH_3$][Oleate] using ICP.

FIG. 14a presents NMR data that was collected for DI water, and for water that was produced from untreated MFT. No peaks around 7-8 ppm are observed on the NMR spectrum of water from treated MFT, which would indicate contamination of the water by the [$C_8NH_3$][Oleate]. There are some small peaks associated with as yet unidentified contamination at lower ppm levels (1-2 ppm) as expected. The water was determined to be basic (pH=8.62) and thus has some residual caustic present in it.

Figure 14B:
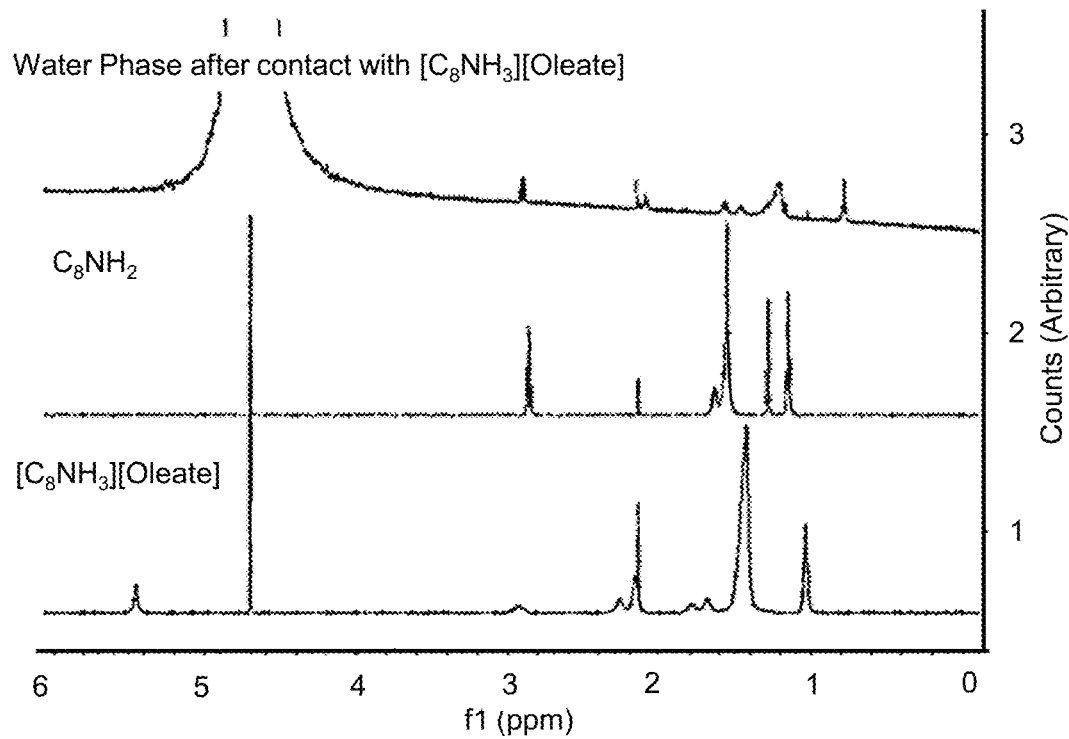
Figure 14C:

To confirm the presence of the IL into the water phase, 0.5 g IL was added to 1.5 g DI water. The system was shaken for 1 h and centrifuged (4000 rpm, 5 min). The 1H NMR spectra was taken from the water phase (using D2O as solvent). Small peaks were detected in the water phase at low ppm, which don't match to those peaks in the IL. FIG. 14b shows the $^1$H NMR spectra of water phase after contact with [$C_8NH_3$][Oleate], of the IL [$C_8NH_3$][Oleate], and of the amine $C_8NH_2$.

Example 5: Gravity as a Separation Force

Figure 1:
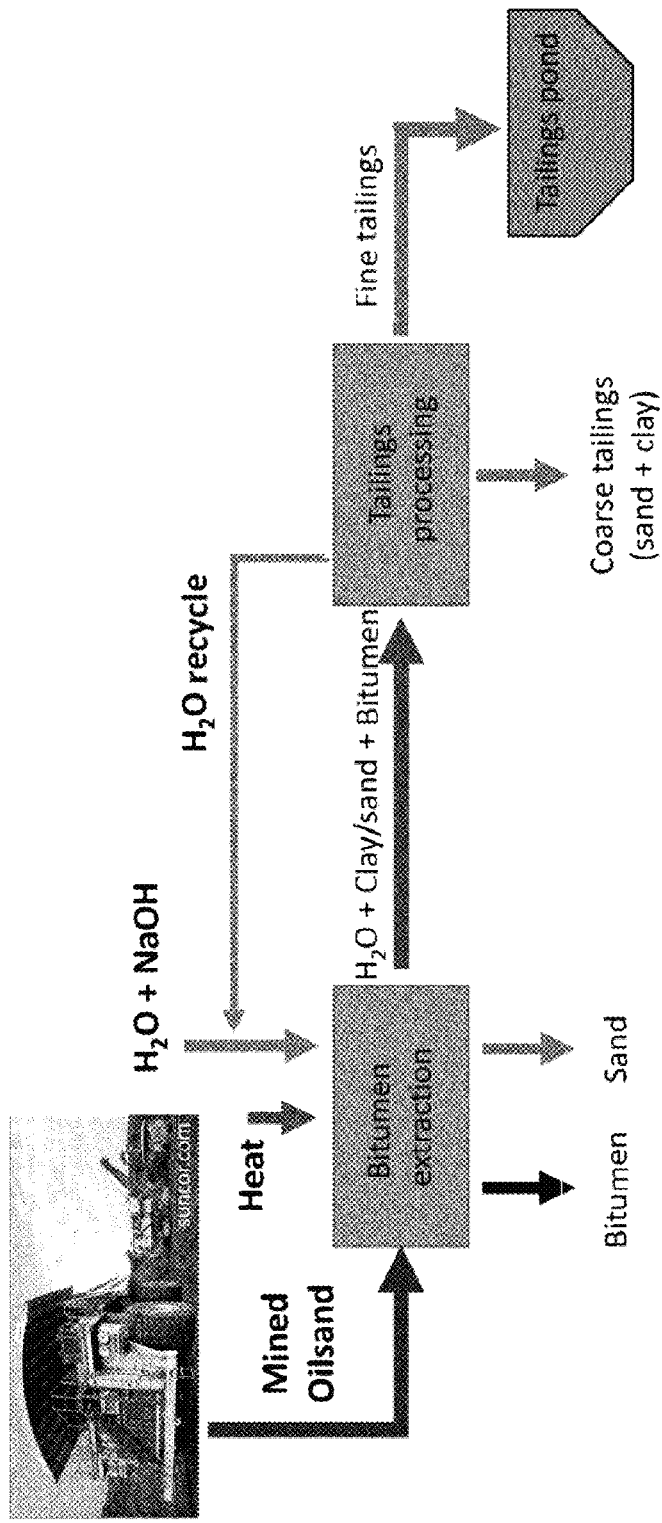
FIG. 1: Simplified schematic of prior art processing operation for mineable oilsands.

In one aspect of the invention, the formation of the waste stream that leads to MFT may be addressed by augmentation of a current tailings processing facility, as shown in FIG. 1, to include a process that involves the treatment of the tailings stream with an IL, such as [$C_8NH_3$][Oleate].

In this Example, dilution of a 50 mL MFT sample, by a factor of up to 3×, was compared using either deionized water or salt water. This Example demonstrates that the clay-water separation was more successful if salt water (1.7 mol/L NaCl) was used for the dilution. This is a better approximation of the composition of typical raw tailings stream from a bitumen processing facility, where the raw tailings stream is more diluted than an MFT sample collected from deep in a tailings pond after settling has occurred. In this Example, diluted MFT was treated with 9 or 17 vol % of the IL and mixed by shaking the vessel by hand for 30 sec. The treated mixture was then left to stand for 24 h, and observed over that period of time for separation of the clay and the water by gravity settling. Once the mixture had been allowed to separate, the approximate volume of water produced was recorded, and the mixture was re-agitated by shaking and sub-sampled into a 50 mL Falcon tube. This sub-sample was subjected to a centrifuge step at 2500 rpm for 5 min and the resulting amount of water separation was recorded.

Figure 15:
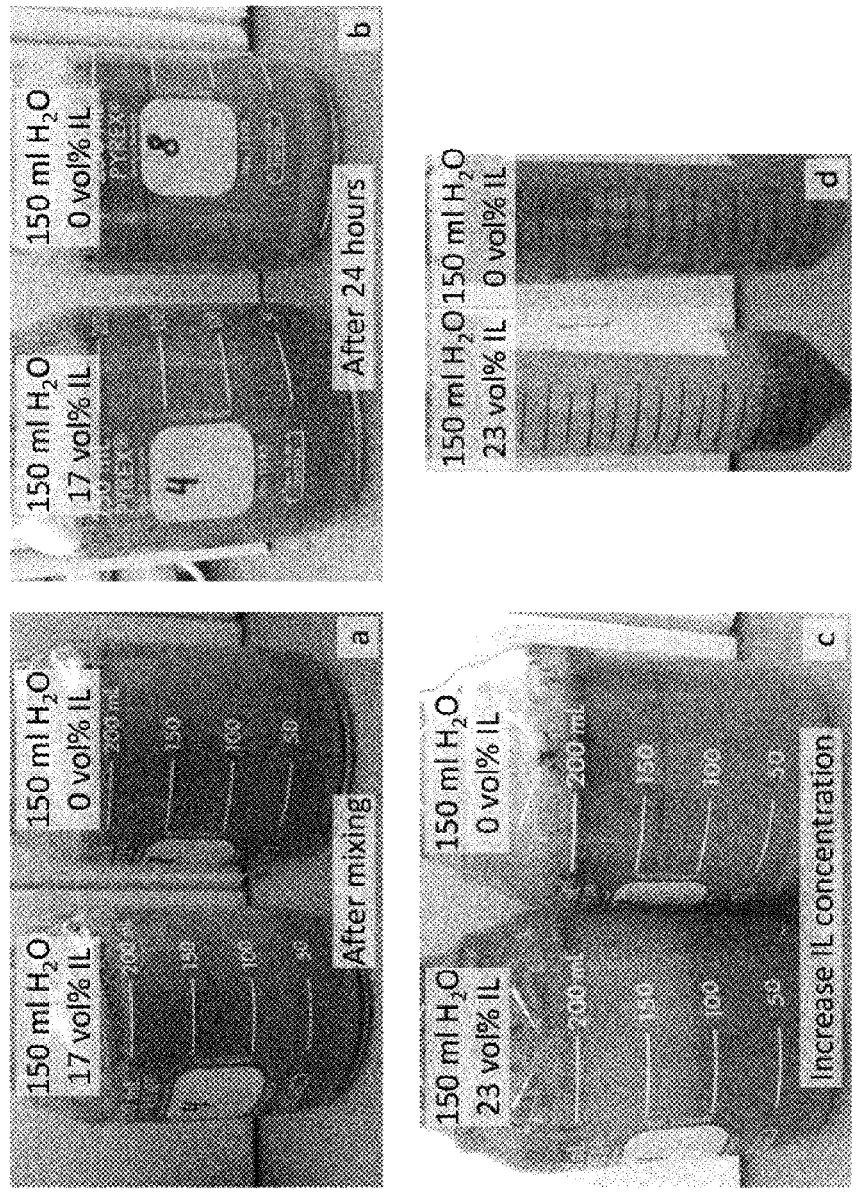
FIG. 15: Pictures showing the treatment of diluted MFT using [$C_8NH_3$][Oleate]. (a) Diluted (3×) samples of MFT immediately after agitation by shaking for 30 sec with and without IL. (b) The same samples after 24 h of gravity settling. The treated mixture had not settled satisfactorily, (c) The same samples after the concentration of IL was increased in the treated bottle, re-shaken, and left to gravity settle for another 24 h. A large water layer is evident on top. (d) Subsamples of the bottles from (c), after centrifugation at 2500 rpm for 5 min.

In some circumstances, the tailings feed stream enters the tailings pond with a solids concentration of 20-40 wt %. To approximate this raw stream, samples of MFT-Field were diluted with DI and salt water (1.7 mol/L NaCl). Table 2 shows a summary of the MFT dilution factors that were used in this Example. Dilutions were completed via a multiple of the original undiluted MFT volume with a suitable amount of DI or salt water, i.e. a 2.0× dilution meant a doubling of the original undiluted volume of MFT with water. This diluted sample was then treated with the [$C_8NH_3$][Oleate] to demonstrate enhanced aggregation and gravity settling, in a process that may be implemented so as to dramatically reduce settling times. FIG. 15 shows a summary of these findings.

Figure 16:
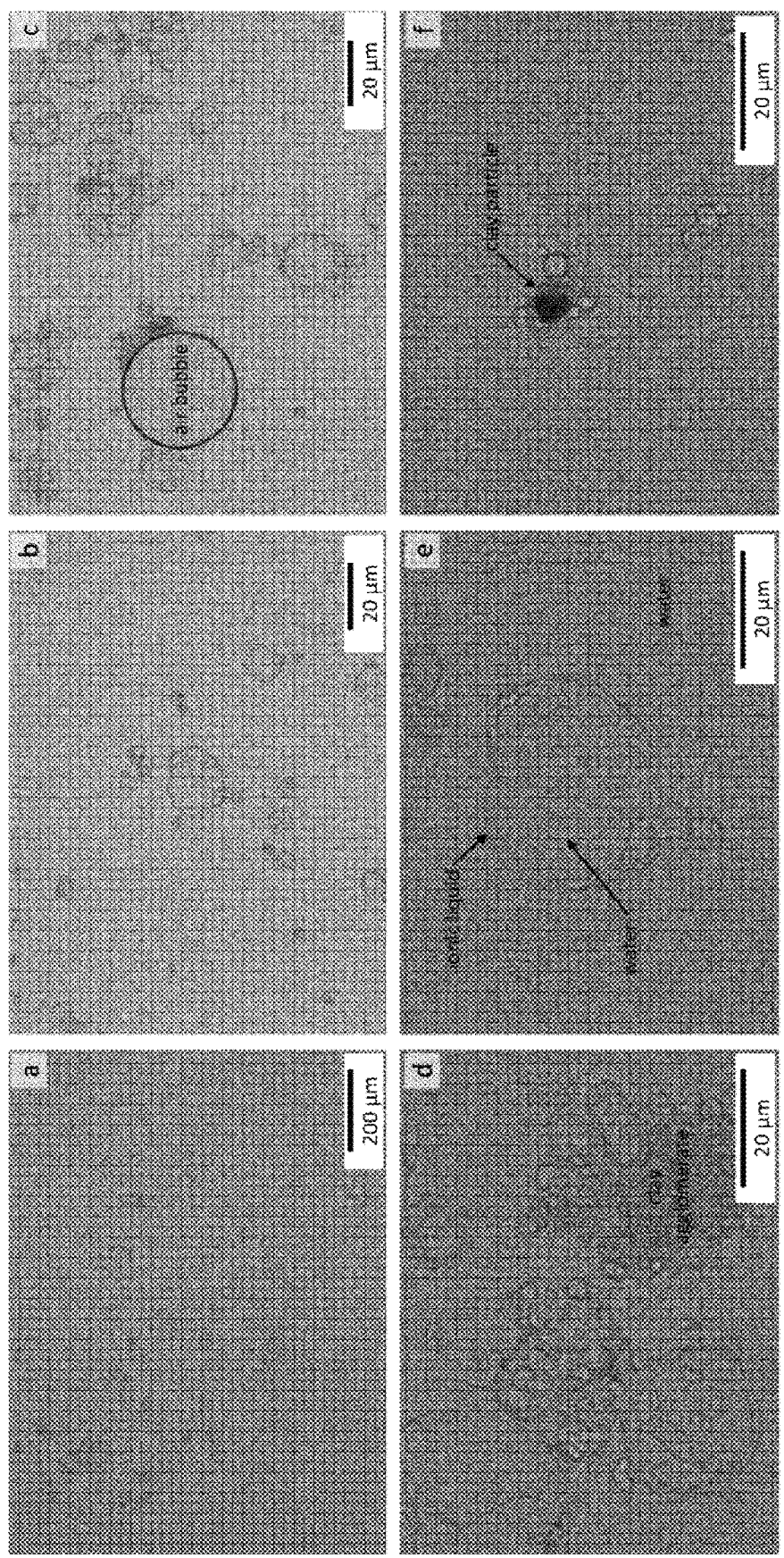
FIG. 16: Optical micrographs of the water phase from the sample in FIG. 15d treated with [$C_8NH_3$][Oleate] at various magnifications. The micrographs reveal the presence of an emulsion which appears to have formed between the IL and the water. The emulsion droplets also appear to have some affinity for clay particles as seen in d and f.

FIG. 15c illustrates that the water layer in the treated sample was not perfectly clear, and did not become entirely clear even after the centrifuge step (FIG. 15d). Optical microscopy was performed on this water sample in order to ascertain the reason for the lack of clarity. FIG. 16 shows some optical micrographs of the water phase taken from the left tube in FIG. 15d. A drop of this water was placed onto a microscope slide and a cover slip was placed on top of it.

An emulsion of fine [$C_8NH_3$][Oleate] droplets in water is revealed by the micrographs. The emulsion droplets appear to be composed of a thin film of [$C_8NH_3$][Oleate] surrounding droplets of water that reside within the ionic liquid film. Also evident from micrographs in FIGS. 16e and 16f are droplets appearing to have some affinity for clay particles and agglomerates that are left in the emulsion. The majority of the clay particles were trapped by [$C_8NH_3$][Oleate] and have been separated from the water by the centrifugation step.

Figure 17:
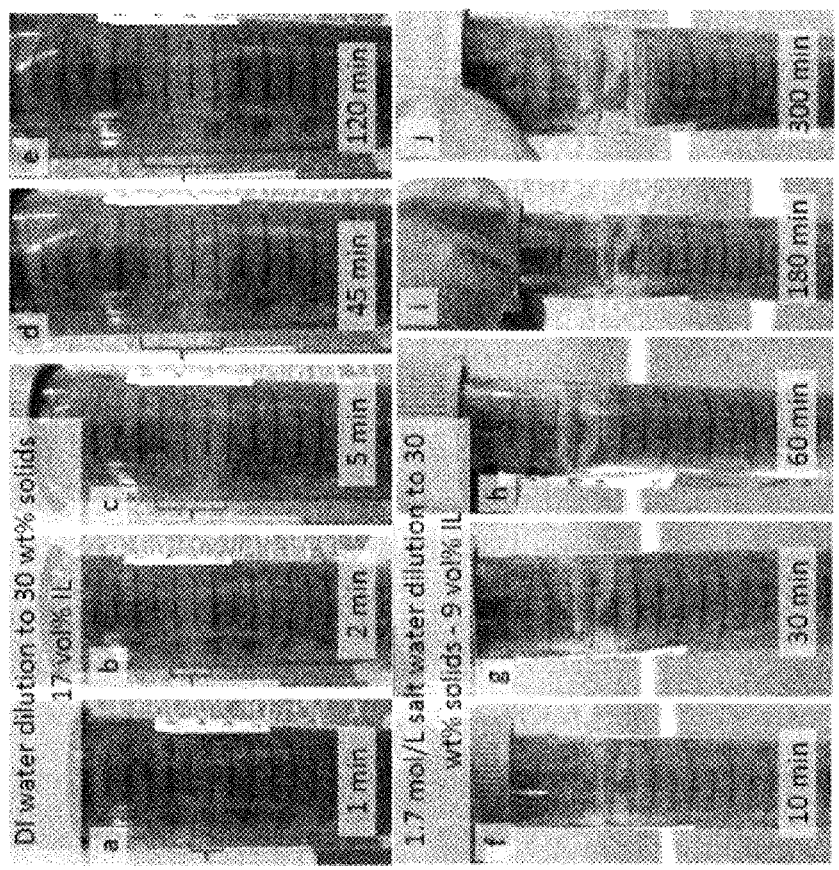
FIG. 17(a): Vials showing gravity settling enhancement of diluted MFT after treatment with [$C_8NH_3$][Oleate]. (a)-(e) Gravity settling enhancement after dilution with DI water. Water layer is cloudy, (f)-(j) Gravity settling enhancement after dilution with 1.7 mol/L salt water. Water layer is clear.

A further demonstration of enhancements to gravity settling behaviour using [$C_8NH_3$][Oleate] is presented in FIG. 17. Here, gravity settling time was tracked for samples of MFT-Field that had been diluted to 30 wt % solids using DI and salt water (1.7 mol/L NaCl). For the DI water diluted samples (FIGS. 17a-e), a cloudy water layer was formed with a gravity settling time on the order of minutes. Comparing these samples to the salt water diluted ones (FIGS. 17f-j), the water layer is much clearer in the latter case. The salt water diluted samples were also observed to gravity settle in a matter of minutes, and the solids concentration of the resulting clay phase after separation was maximum (58 wt % solids). Based on the fact that dilution of MFT using DI water rendered the IL treatment less effective, it is possible to attribute this effect to the reduced salinity of the MFT after dilution. Using salt water in the dilution process is a better approximation of the composition of typical raw tailings stream from a bitumen processing facility, where the raw tailings stream is more diluted than a MFT sample collected from deep in a tailings pond after settling has occurred.

Figure 18:
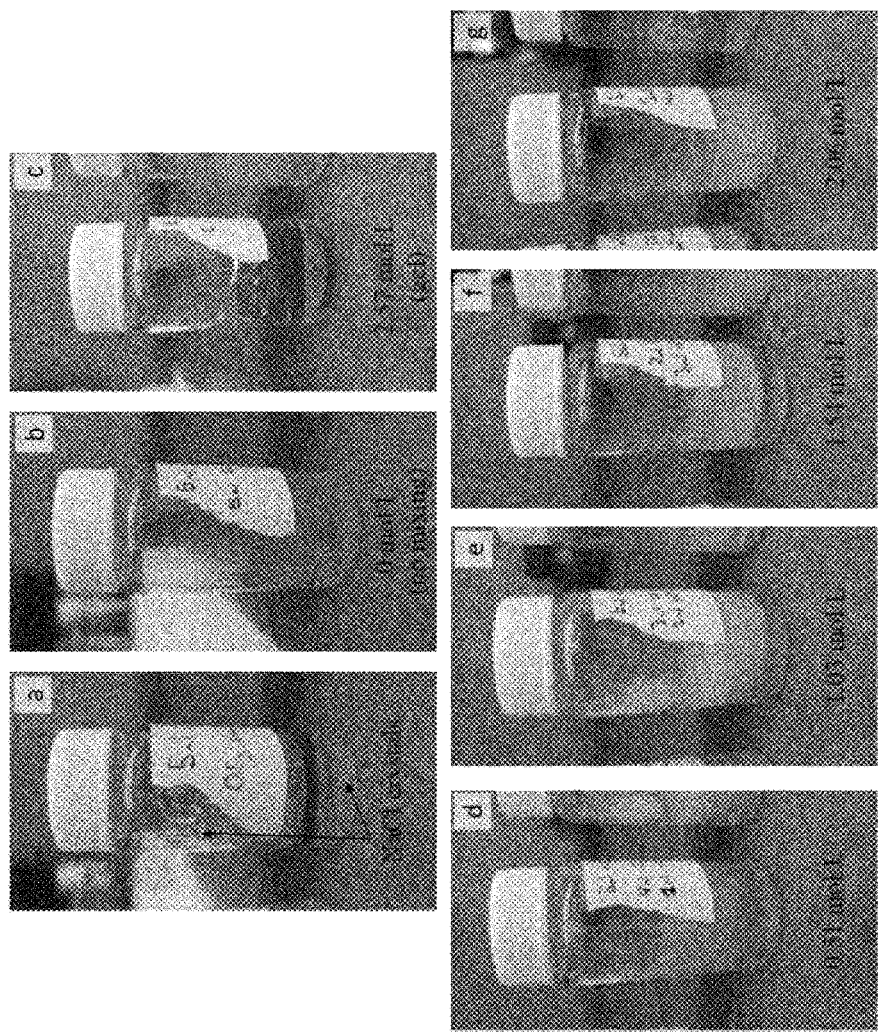
FIG. 18: Vials showing [$C_8NH_3$][Oleate] being mixed with NaCl crystals and various concentrations of NaCl in water. Total volume of all IL+salt water mixtures was 10 mL. (a) NaCl crystals do not dissolve in IL. (b) DI water and IL are immiscible but will form an emulsion if mixed vigorously, (c) 2.57 mol/L salt water with IL forms a gel (equal volumes of each mixed), (d-g) Various concentrations of salt water and IL mixed by stirring which show enhanced miscibility with increasing salt concentration.
Figure 19:
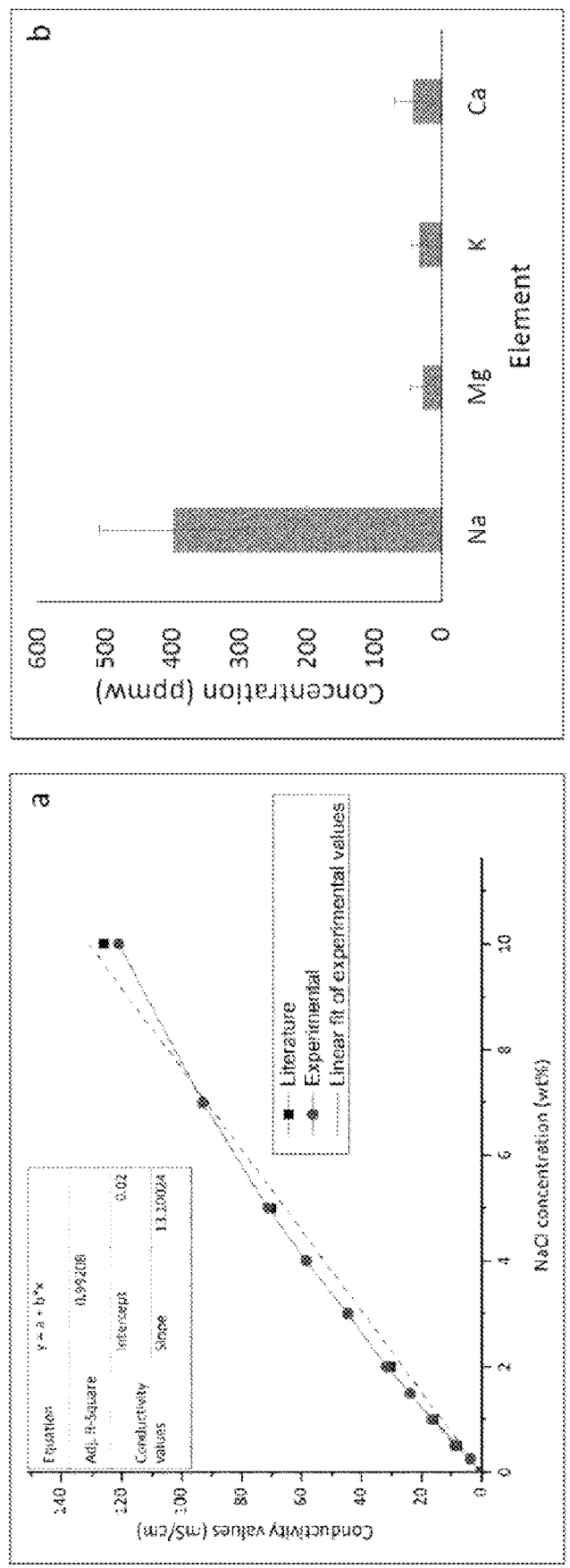
FIG. 19(a): Calibration curve for solution conductivity versus aqueous NaCl concentration. Literature, experimental, and linear fit data are shown, (b) Concentration of various cationic species in water from untreated MFT evaluated by ICP-MS.

In an alternative aspect of the invention, an aqueous NaCl solution may be used as a diluent for MFT so as to improve the clay-water separation efficacy of the IL. While NaCl crystals do not dissolved in the IL, and DI water is immiscible with it, salt water will mix with the IL to form a stiff gel. The vials in FIG. 18 demonstrate this effect. FIG. 18*a* shows dry NaCl crystals in the IL, which have not dissolved in over 3 months of contact. FIG. 18*b* shows that DI water is immiscible with the IL, however this mixture can be vigorously stirred to form an emulsion of water droplets in IL. FIG. 18*c* shows a pale yellow stiff gel which formed after a 2.57 mol/L solution of NaCl in water was mixed in an equal volumetric ratio with the IL and stirred gently with a glass stir rod. FIGS. 18*d-g* show the mixtures that resulted from equal volumetric amounts IL and various concentrations of salt water. These Figures show a progressive amount of emulsification and gelation as the salt concentration increases. This demonstrates that it is the aqueous salt components of the MFT that result in gelation when IL is stirred into it. Accordingly, this interaction is of importance to the separation of fine clay particles. To further illustrate this effect, several 5 mL volumes of undiluted MFT were centrifuged at 14,200 rpm for 30 min to affect a separation of the water from them. This water was subjected to conductivity measurements in an attempt to estimate the salinity. FIG. 19*a* shows a calibration curve that was constructed based on the conductivity measurements of several known concentrations of aqueous NaCl solutions. FIG. 19*b* shows ICP-MS elemental analysis of the undiluted MFT water. While there are likely to be different species of ions contributing to the salinity (and thus conductivity) of MFT water, the concentration of NaCl is shown to be a dominant species.

The conductivity of undiluted MFT water was measured at 1.7 mS/cm which yielded an effective NaCl concentration of 0.02 mol/L (approximately 1297 ppmw). The discrepancy between the expected NaCl concentration that was calculated from the calibration curve (1297 ppmw) and the value that was measured by ICP-MS (~400 ppmw) is attributed to additional ionic species in the solution that were not considered. Nonetheless, based on the fact that dilution of MFT using DI water rendered the IL treatment less effective, it is possible to attribute this effect to the reduced salinity of the MFT after dilution. Indeed, when MFT was diluted with a high salinity water (such as a 1.7 mol/L NaCl solution), the resulting supernatant water remained clear and the solids concentration of the resulting clay phase after separation was at a maximum (58 wt % solids).

To show this effect, samples of MFT were diluted with DI water or using 1.7 mol/L NaCl water (1.25, 1.5, and 2× dilutions). MFT diluted or undiluted were treated with 10 or 17 vol % [$C_8NH_3$][Oleate] and mixed by shaking the vessel by hand for 30 sec. The treated mixture was then left to stand for 24 h, and observed over that period of time for separation of the clay and the water by gravity settling. Once the mixture had been allowed to separate, the approximate volume of water produced was recorded, and the mixture was re-agitated by shaking and sub-sampled into a 50 mL centrifugation tube. This sub-sample was subjected to a centrifuge step at 2500 rpm for 5 min and the resulting amount of water separation was recorded.

Figure 20:
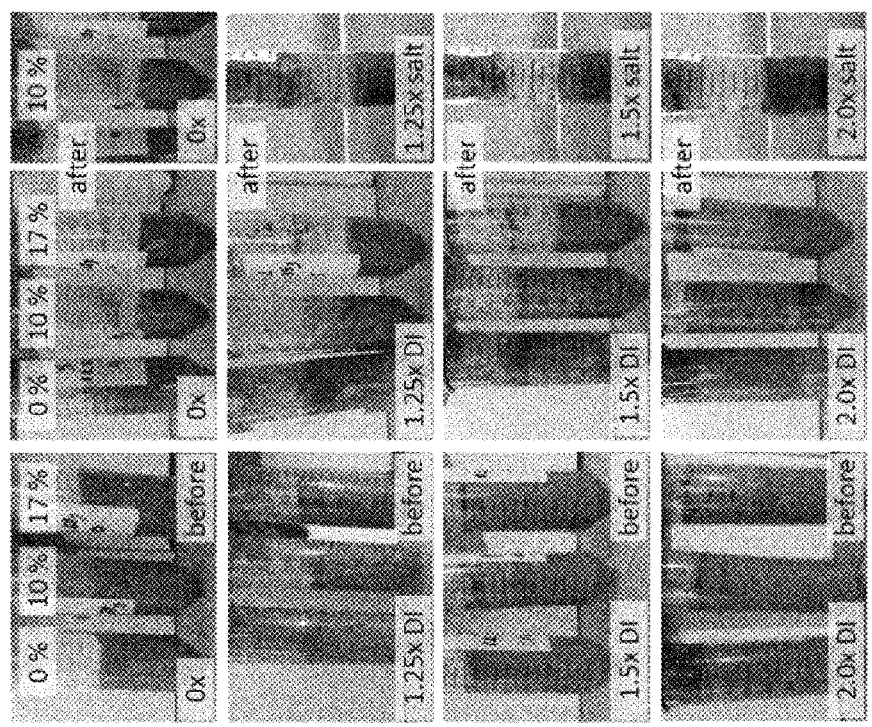
FIG. 20: Pictures of [$C_8NH_3$][Oleate] treated (10 and 17 vol %) and untreated MFT samples, undiluted and diluted to various levels (1.25×, 1.5×, 2. O×) using DI and salt water (1.7 mol/L NaCl) before and after centrifugation. The right most vial in the "after" pictures show the most water removed. The DI diluted samples show the water phase getting more turbid as a function of dilution factor. This is corrected by dilution with the salt water.

Samples of MFT diluted with DI water were prepared and treated with [$C_8NH_3$][Oleate] and then centrifuged at 2500 rpm for 5 min. Further to this, the same dilution levels were prepared using 1.7 mol/L NaCl water and subjected to the same centrifugation treatment. The samples diluted with DI water were treated with 10 and 17 vol % IL, and the samples diluted with salt water were treated with 10 vol % IL. FIG. 20 shows these samples before and after centrifugation (with an untreated, undiluted control).

As with the sample diluted by a factor of 3× with DI water, the 1.5× and 2× DI water dilutions both produced a water phase that contained [$C_8NH_3$][Oleate] as an emulsion.

Figure 21A:
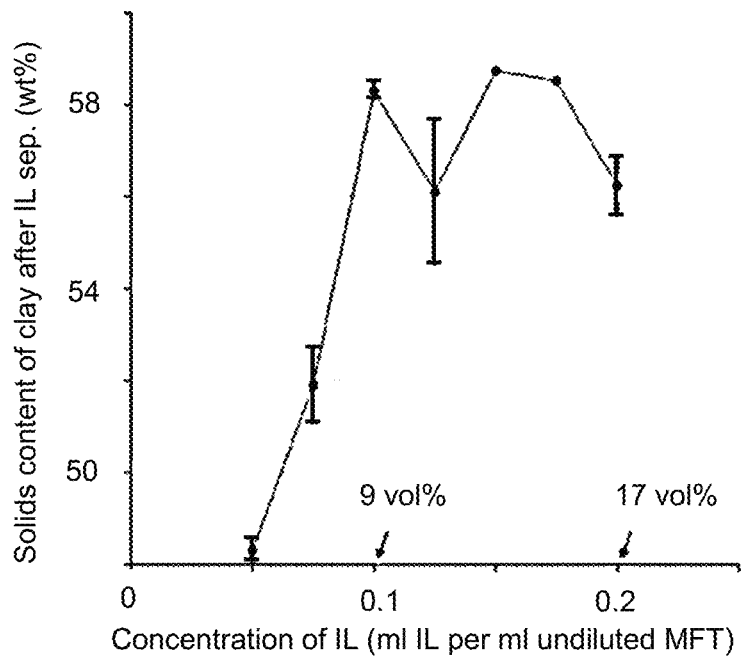
FIG. 21(a,b): (a) Graph showing solids content of resulting clay phase after IL separation versus concentration of [$C_8NH_3$][Oleate] used. Water extraction was optimized at 0.1 mL IL per mL undiluted MFT (~9 vol %). (b) Graph showing solids content of resulting clay phase after IL separation of MFT which was diluted with various concentrations of salt water (NaCl). IL concentration used was 9 vol % based on the undiluted volume of MFT which was kept constant in all tests.
Figure 21B:
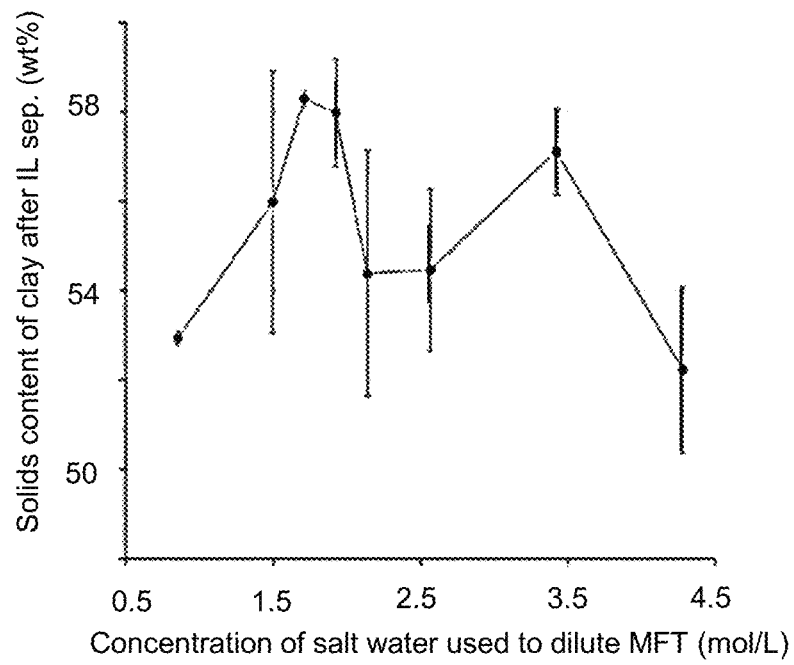

FIG. 21 summarizes exemplary results for the reduction of IL and salt water in the processing. FIG. 21 *a* shows a graph of the solids content of the clay phase after separation using various concentrations of IL. The graph illustrates, for example, that in this embodiment a concentration of 9 vol % IL is the least amount that is still effective at producing a clay phase that is slightly over 58 wt % solids. FIG. 21 *b* shows a similar trend with the concentration of salt water that was used for diluting the MFT. Here, the MFT was diluted to a solids concentration of 30 wt % using various concentrations of salt water, and then treated with 9 vol % IL. This graph illustrates that, in this embodiment, a salt concentration of 1.7 mol/L was the most effective at producing a clay phase that had the highest wt % solids (again slightly over 58 wt %).

Example 6: Effect of Temperature

Figure 22:
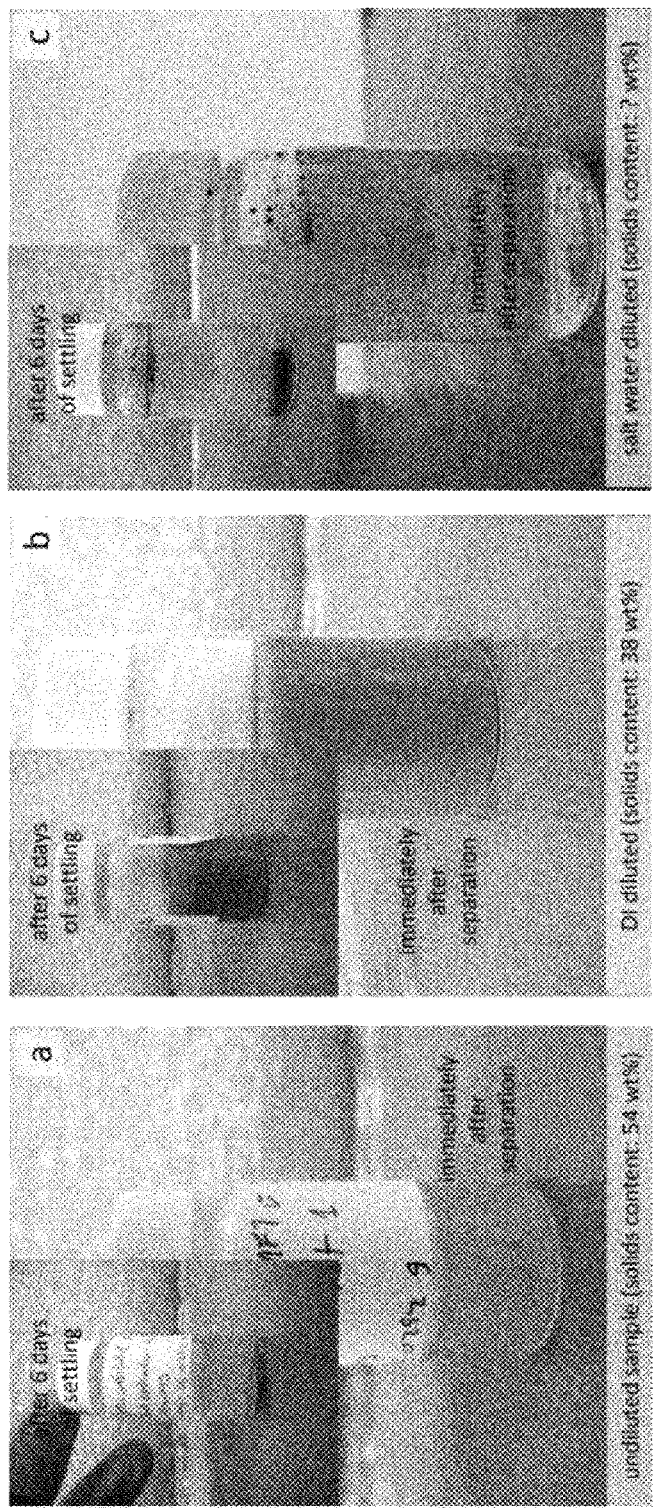
FIG. 22: Vials of the water phase that was separated from MFT using 9 vol % [$C_8NH_3$][Oleate] treatment at 80° C. (centrifugation 2500 rpm, 5 min). (a) Undiluted MFT sample showing a turbid water phase that had settled after 6 days (inset), (b) MFT diluted to 30 wt % solids using DI water. After separation water phase was seen to be very turbid, with only partial settling after 6 days (inset), (c) MFT diluted to 30 wt % solids using 1.7 mol/L salt water. Water phase was observed to be very clear and did not need further settling time.

In some circumstances, the tailings waste stream enters the tailings pond at a temperature of approximately 80° C. Accordingly, aspects of the invention involve the demonstration that MFT can be treated with IL at this temperature. FIG. 22 shows the results of these demonstrations. Undiluted MFT, and samples that were diluted to 30 wt % solids with DI, and salt water (1.7 mol/L NaCl) were treated with 9 vol % IL based on the original volume of undiluted MFT in all cases. The samples and the IL were heated to 80° C. in a vial heater and then mixed. After centrifugation (40000 rpm, 5 min), the samples were cooled to room temperature and the supernatant water was poured into vials. These vials are shown in FIGS. 22*a-c*. FIGS. 22*a* and 22*b* show the water phases from the undiluted, and DI diluted MFT separation at 80° C. The water phases showed significantly reduced levels of solids, however they remained quite turbid after separation. FIG. 22*c* shows the water phase from the sample that was diluted with salt water. While there is still some solids content, the water was seen to be much less turbid than the previous samples, and after 6 days of settling, was completely clear. Compared to the other samples after 6 days of settling, the salt water diluted sample achieved much better aggregation and settling, and this test demonstrates that MFT can be successfully treated at the industrial process effluent temperature of 80° C. In various embodiments, it may be possible to treat the raw tailings at the industrial source and separate this waste stream.

Example 7: Recovery of IL after MFT Treatment

Figure 23:
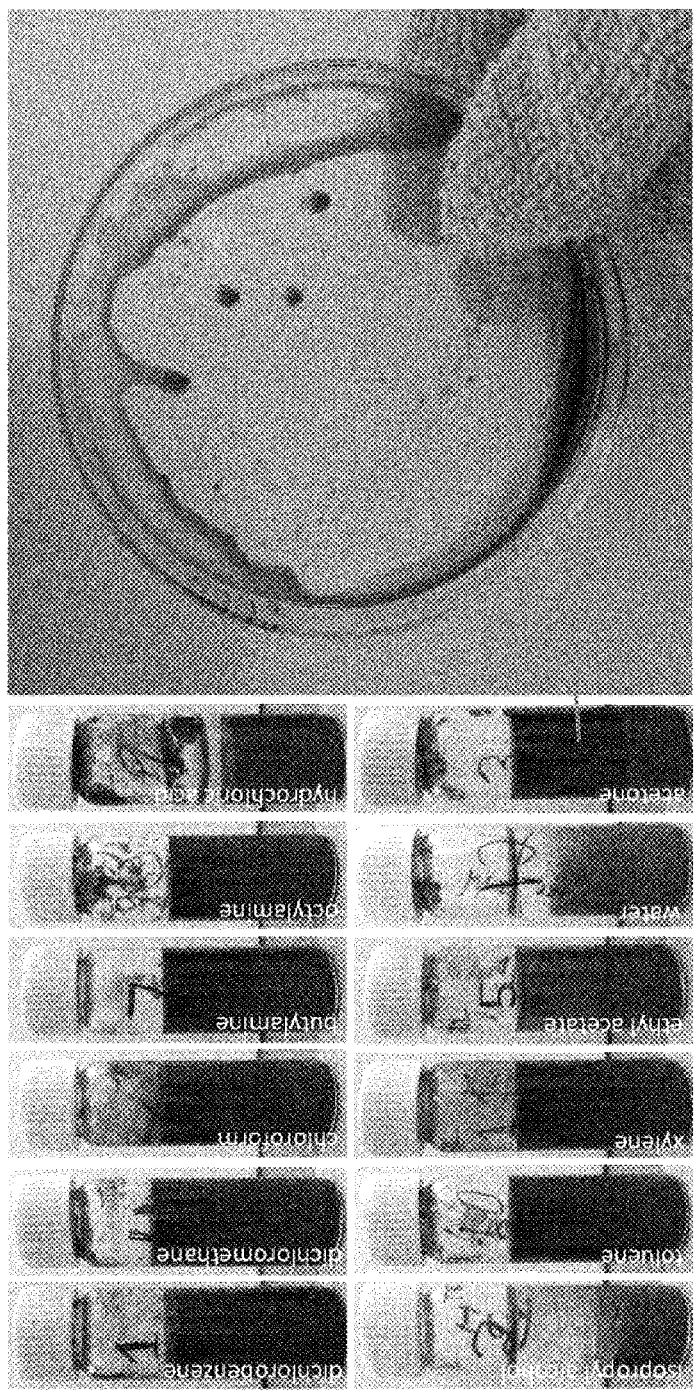
FIG. 23: Samples of clay+[$C_8NH_3$][Oleate] after it had been separated from an undiluted MFT sample (treated with 17 vol % [$C_8NH_3$][Oleate]) and mixed with the indicated solvent. Right, supernatant from the acetone extraction after drying overnight at 60° C. to remove the acetone.

In various embodiments, the IL may be recovered from the resulting clay phase of the treated MFT. For example, solvent extraction was evaluated to remove the ILs from the resulting clay phase of the treated MFT. A 1.5 g sample of the clay+[$C_8NH_3$][Oleate] was collected from an undiluted MFT sample that had been treated with 17 vol % [$C_8NH_3$][Oleate]. This sample was treated with 4 ml of multiple solvents and stirred for 2 min in an attempt to effect a solvent extraction of the ionic liquid from the clay. FIG. 23 shows a summary of the results from this experiment. The resulting mixtures were allowed to stand for 24 h before they were photographed.

Based on the observed colour changes, there are multiple solvents that at least partially separate [$C_8NH_3$][Oleate] and bitumen from the clay sample (all solvents were clear to start with), although toluene and chloroform did not perform as well as the others, since there was coextraction of other components (probably bitumen) also present in the solid phase). Table 3 summarizes a series of solubility tests that were completed using various solvents and the IL [$C_8NH_3$][Oleate].

TABLE 3

Solubility of [$C_8NH_3$][Oleate] in various solvents

| Solvent | [$C_8NH_3$][Oleate] solubility |
| --- | --- |
| DI water | − |
| Methanol | + |
| Acetone | + |
| Isopropyl alcohol | + |
| Acetonitrile | − |
| Ethyl acetate | + |
| Dimethyl sulfoxide | − |
| Chloroform | + |
| Xylene | + |
| Toluene | + |
| Hexane | + |
| Dichlorobenzene | + |
| Dichloromethane | + |
| Butylamine | + |
| Octylamine | + |

+: Soluble (0.2 g in 0.5 mL solvent)
−: Insoluble (0.2 g in 3 mL solvent)

Of these, acetone was used for further demonstrations. Thus, 5 g of the clay+[$C_8NH_3$][Oleate] mixture was treated with 15 mL of acetone by magnetic stirring for 24 h. The sample was centrifuged at 2500 rpm for 5 min and the resulting supernatant was decanted and placed in a drying oven at 60° C. overnight to evaporate the acetone. The resulting liquid is shown in the right-most panel of FIG. 23. It was assumed for the purposes of solvent extraction calculations that the IL was retained totally in the clay phase and did not segregate into the water phase during MFT separation. Thus, 45.8 wt % of the original ionic liquid that was added to the sample was recovered by this solvent extraction step (assuming it was all ionic liquid). This demonstrates that it is possible to recover the ionic liquid from the MFT after the clay separation process.

Figure 24:
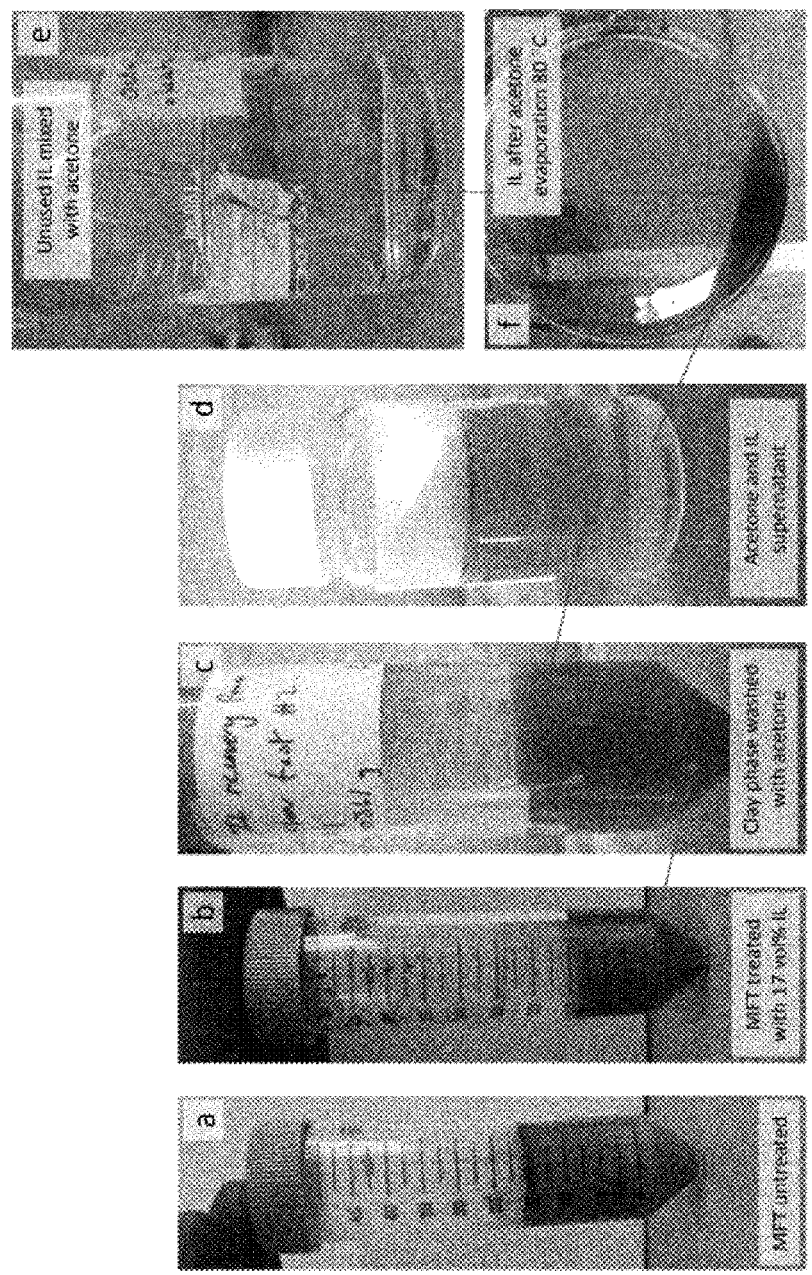
FIG. 24: Vials showing [$C_8NH_3$][Oleate] removal from clay phase of separated MFT (undiluted, or diluted) using acetone washing. Undiluted MFT treatment is shown in the Figure, (a) Undiluted MFT. (b) After treatment with 17 vol % IL and centrifuge at 2500 rpm, 5 min. (c) Clay phase isolated and washed with acetone (~10 ml–3 washes), (d) Supernatant from acetone washing isolated after centrifuge at same conditions, (e) Unused IL and acetone solution showing pale yellow colour. IL is completely miscible with acetone, (f) After acetone evaporation at 80° C. Used and unused IL both turn a brown colour after acetone is evaporated from the solution, possibly indicating a chemical reaction.

FIG. 24 shows a summary of a process for the further characterization of the acetone extraction of [$C_8NH_3$][Oleate] from the separated MFT clay phase. The clay phase from the MFT separation was washed with acetone and the resulting supernatant was collected and had a golden colour (as shown in FIG. 24*d*). After evaporation of the acetone the resulting viscous liquid appears dark brown in colour. Originally this colour change was suspected to be due to the presence of dissolved bitumen, however evaporation of acetone from pure IL yielded the same brown liquid (FIG. 24*f*).

Figure 25:
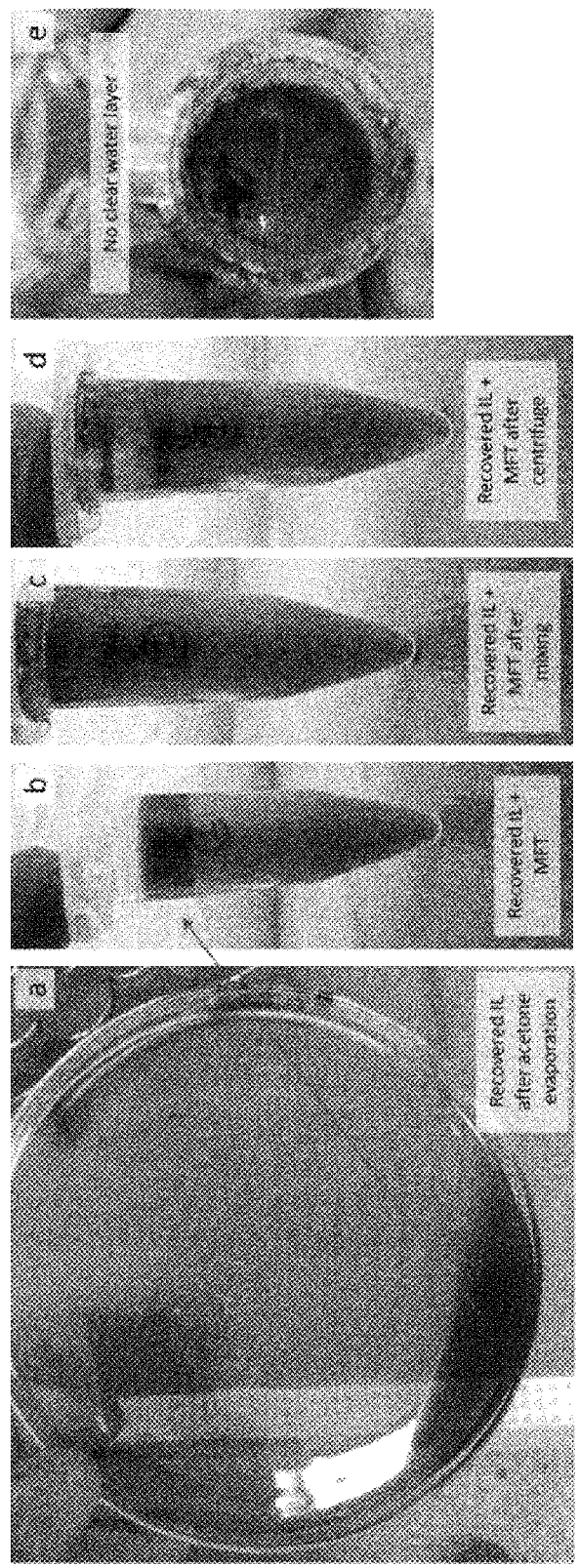
FIG. 25: Vials showing undiluted MFT being treated with [$C_8NH_3$][Oleate] that was recovered from previous MFT separation experiments, (a) Recovered IL after acetone evaporation, (b) Undiluted MFT and recovered IL. (c) Undiluted MFT and recovered IL after mixing. No gelation was observed, (d) Sample after centrifuge at 2500 rpm for 5 min. No clear water phase is evident on top of the vial, (e) No clear water layer was evident.
Figure 26:
FIG. 26: Recovery of [C$_8$NH$_3$][Oleate] with various solvents. After evaporation of the solvent, the wt % of the remaining phase was determined and taken as the recovery of IL. In most cases, the remaining phase appears dark brown, which could be an indication of bitumen extraction or oxidation of the IL during the evaporation step. Wt % extraction of the original amount of IL in place assuming complete segregation into the clay phase is reported for each solvent tested.

FIG. 25 shows the results from examples that involved separating undiluted MFT with the brown liquid (9 vol %) that was collected from the acetone evaporation experiments. As this demonstrates, aspects of the invention involve separating the IL from the clay phase. Further solvent extractions demonstrate that additional solvent species may be used for this purpose. FIG. 26 shows a summary of the results, where various solvents were added to the clay phase of MFT after separation with [$C_8NH_3$][Oleate]. From the Figure, it can be seen that all of the solvents tested are at least partially successful at separating some IL from the clay, however toluene and chloroform did not perform as well as the others.

Figure 27:
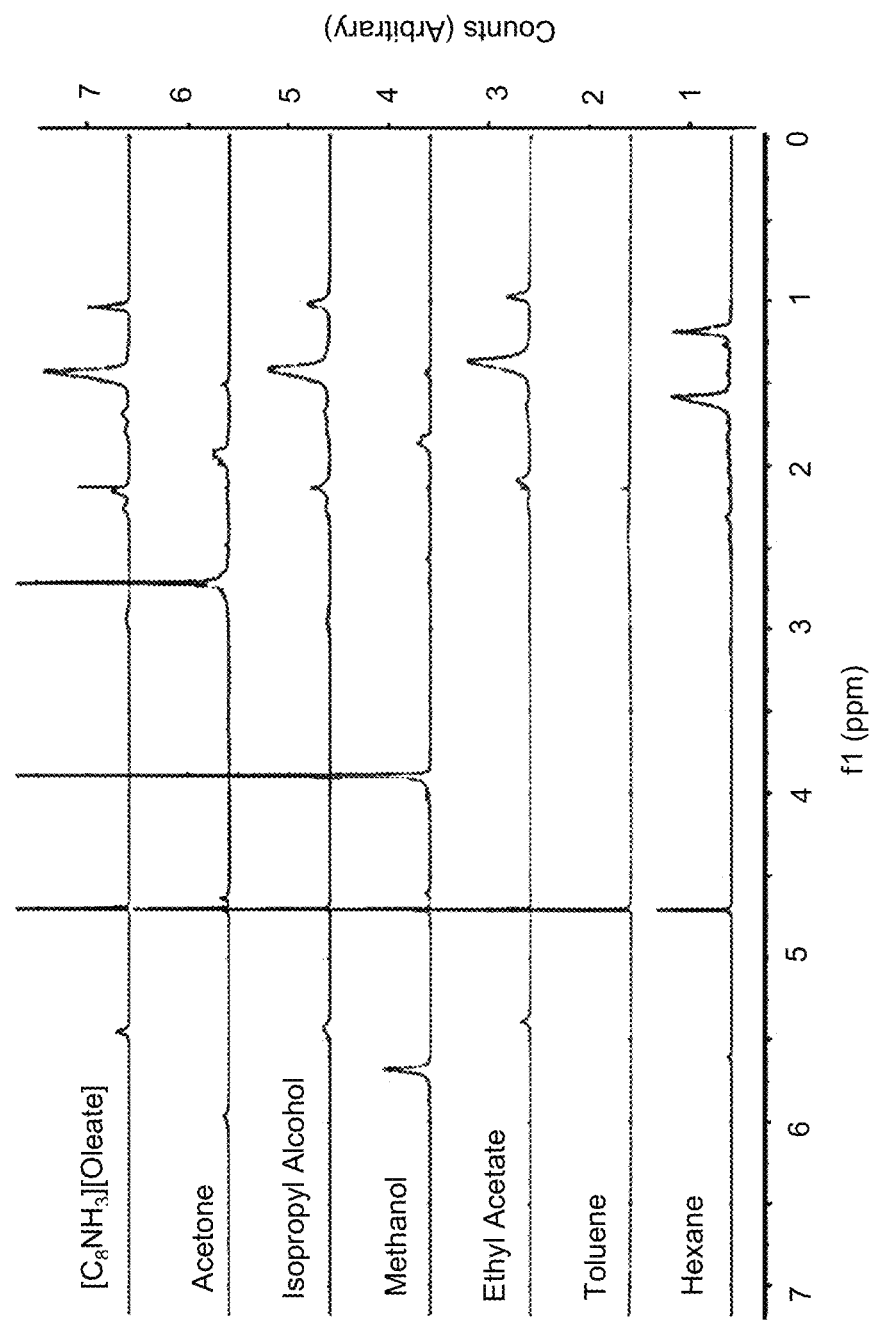
FIG. 27: $^1$H-NMR (360 MHz) data showing recovery of [C$_8$NH$_3$][Oleate] with various solvents from the clay phase of treated MFT. From the graph it is shown that isopropyl alcohol and ethyl acetate were able to recover the IL successfully.

To further evaluate which solvents were more successful in the extraction, $^1$H-NMR was performed on the resulting mixtures after the solvent evaporation step. The 1H-NMR data is presented in FIG. 27. The samples were diluted with $D_2O$ and subjected to nuclear magnetic resonance at 360 MHz. The top scan shows the NMR signature of the [$C_8NH_3$][Oleate] and when compared with the other scans, isopropyl alcohol and ethyl acetate were successful in extracting the ionic liquid from the clay matrix, in this example without the degradation of the IL. An analysis of the IL recovered using $^1$H NMR indicates that the IL can react with some of the solvents (e.g., acetone). On the other hand, isopropyl alcohol and ethyl acetate allow the recovery of the IL.

Figure 28:
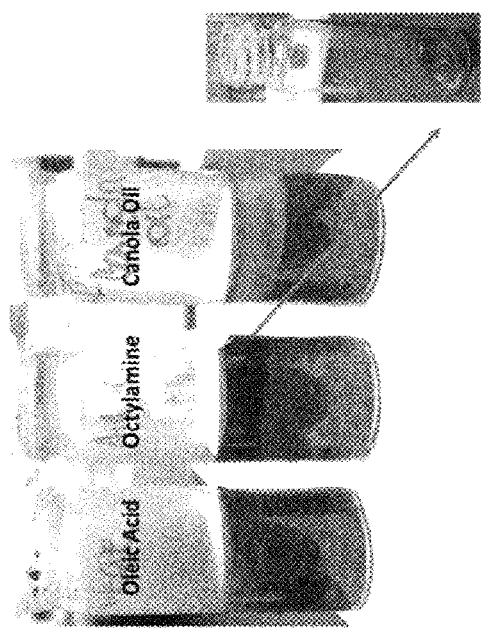
FIG. 28: Bitumen and [C$_8$NH$_3$][Oleate] recovery from treated MFT using oleic acid, octylamine, and canola oil.

Regarding the extraction of bitumen from the clay sample, 5 mL of MFT sample were mixed with 1 mL [$C_8NH_3$][Oleate] for 30 s using a stir rod at room temperature. After mixing, the mixture was centrifuged (3000 rpm, 20 min) and the water was removed from the upper phase. 1 g of oleic acid, octylamine, or canola oil were added to the solid phase left in the vial, and the sample was sonicated for 60 min, after which was centrifuged (3000 rpm, 10 min). Both oleic acid and octylamine phases turned to black, showing the potential of these two solvents to recover the bitumen present in the MFT (FIG. 28). In addition, the octylamine phase turned viscous, indicating extraction of oleic acid on the upper phase (and thus IL recovery).

Example 8: Increasing Rate of MFT-Water Separation after IL Treatment

Figure 29:
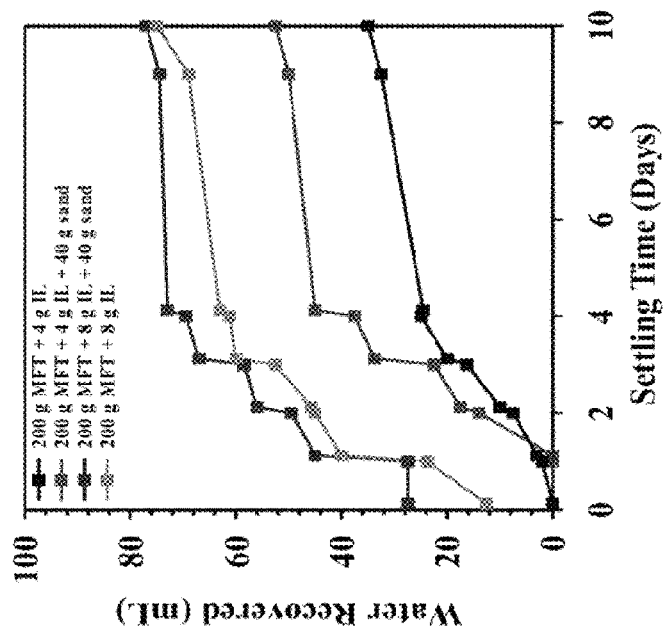
FIG. 29: Effect of sand addition on the amount of water recovered after MFT treated with [C$_8$NH$_3$][Oleate].
Figure 30:
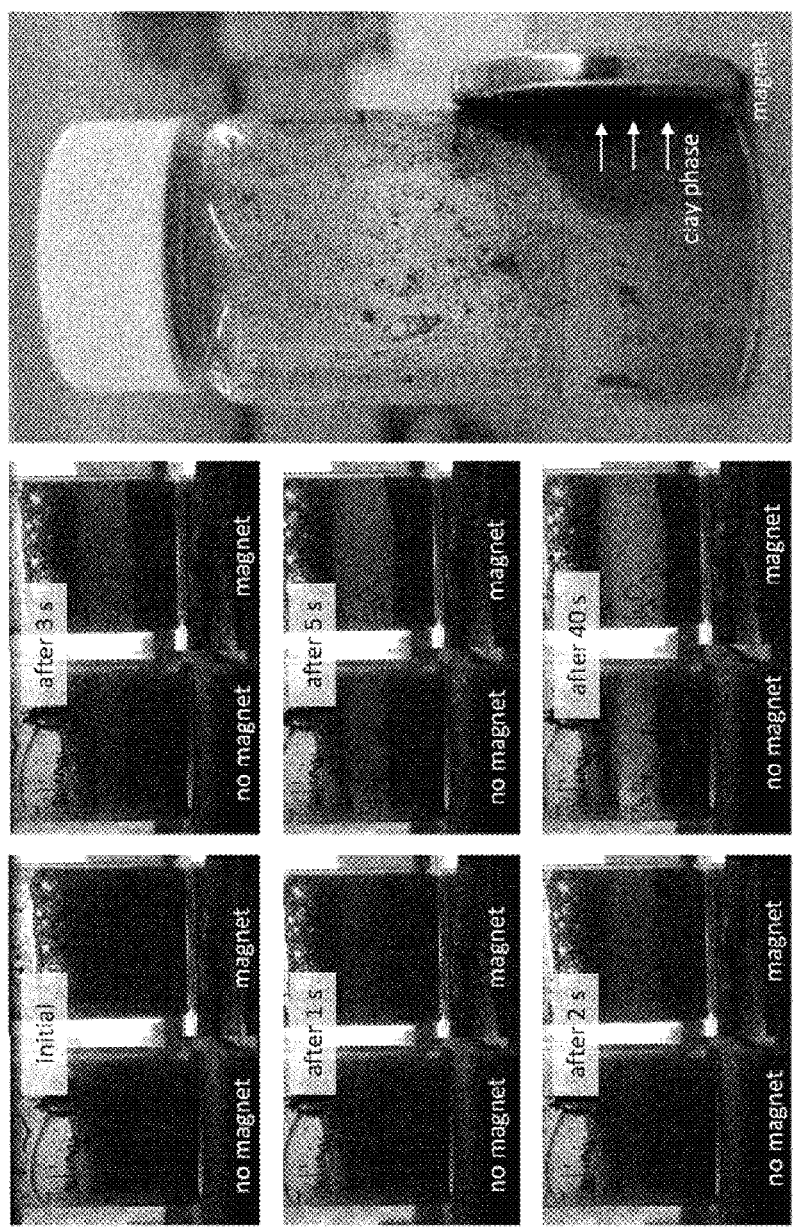
FIG. 30: Time lapse images of diluted samples of MFT (3×) that were treated with [C$_8$NH$_3$][Oleate] that had been premixed with 20 wt % superparamagnetic iron oxide (Fe$_3$O$_4$) nanoparticles (20-30 nm). Right image: showing clay has been magnetized and can be attracted to the side of the vessel using a permanent magnet.

Different strategies to increase the rate of gravity settling were evaluated, namely adding high density particles (for example, barium sulfate), or sand, adding (nano)particles and applying a magnetic field, and applying a high vacuum. Using Sand for MFT Separation 200 g MFT was placed in a beaker and 4 or 8 g [$C_8NH_3$][Oleate] were added. The mixtures were stirred for 12 min, at 500 rpm using an overhead stirrer. 40 g of wet sand (contain 10 g DI water) were added and the mixture was stirred (5 min, 500 rpm) using an overhead stirrer. The water recovered was recorded over 10 days, and all the samples were stirred daily (FIG. 29). In various embodiments, sand may increase the water recovered from MFT. Using (Nano) Particles and Magnetic Fields for MFT Separation In various embodiments, superparamagnetic iron oxide ($Fe_3O_4$) nanoparticles (SPIONs) with a particle size of 20-30 nm were added to the IL [$C_8NH_3$][Oleate] at a concentration of 20 wt %. The particles formed a suspension with the IL, and did not gel. A 2 mL sample of MFT-Field and MFT-Field diluted with 6 mL of DI water (3× dilution factor). To this diluted MFT, 0.4 mL of the [$C_8NH_3$][Oleate]+nanoparticle mixture was added and the vial was agitated by shaking for 30 s. The result was the rapid aggregation and settling of the clay in the sample. Upon placing the vial near a strong permanent magnet, the clay aggregates were observed to travel towards the magnet. Fast magnetic separation of the clay aggregates was observed. By intimately mixing the clay+IL+SPIONs, the resulting phase was rendered superparamagnetic and could thus be separated using a magnetic field. FIG. 30 summarizes this process, showing a sample with and without a magnetic field present. The samples were shaken by hand for 30 sec and then photographed as they settled. Magnetic manipulation of the clay aggregates is clearly evident.

FIG. 30 illustrates that the settling time was enhanced by the application of a magnetic field, with the magnetized sample settling to completion after only 5 sec. Furthermore, the clay phase in the magnetized sample appears more compacted at the bottom of the vial owing to the larger portion of clear water above it. The right panel of this Figure shows the sample with the magnet placed along the side of the vial. The clay+[$C_8NH_3$][Oleate]+SPION phase is attracted to the side of the vial by the magnetic field. Additionally, the water that was produced by this method appears to be clearer than other samples of water that were produced from diluted MFT. Accordingly, addition of SPIONs to the IL [$C_8NH_3$][Oleate] may be used to reduce the tendency to form an emulsion with water, in a process in which the IL is pre-mixed with the "claylike" magnetic nanoparticles prior to its contact with water. This is congruent with the previous results in which MFT that was first treated with IL prior to its dilution with DI water produced a much clearer water phase even after it was diluted. In addition, FIG. 30 illustrates that gravity settling without a magnetic field is greatly enhanced via the treatment of diluted MFT with IL and nanoparticles. Tests to determine the gravity settling time of untreated MFT shows that it will not gravity settle at any time scale, however from FIG. 30, even without the application of a magnetic field, the treated sample settles adequately in as little as 40 sec and as further discussed below.

Figure 31:
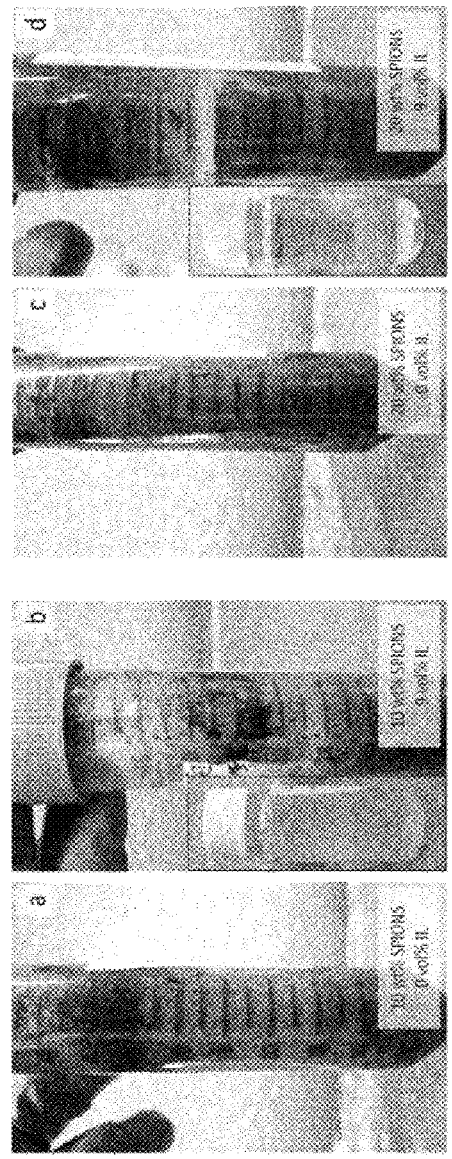
FIG. 31: Vials showing the effect of SPIONS and [C$_8$NH$_3$][Oleate] on the separation of water from MFT which was diluted to 30 wt % solids using DI water after centrifugation at 2500 rpm for 5 min. (a) 10 wt % SPIONS without IL (no separation), (b) 10 wt % SPIONS with 9 vol % IL. Separation is enhanced and supernatant water clarity is shown in the inset, (c) 20 wt % SPIONS with no IL (no separation), (d) 20 wt % SPIONS with 9 vol % IL. Separation is enhanced and supernatant water clarity is shown in the inset. Comparing the insets of (b) and (d), an enhancement in water clarity with the higher concentration of SPIONS is shown.

FIG. 31 illustrates the further characterization of the effect of treating MFT with SPIONs, showing results from demonstrations in which samples of MFT which were diluted with DI water to a solids concentration of 30 wt % were treated with 10 and 20 wt % SPIONS (FIGS. 31*a* and 31*c*). The application of SPIONs by themselves did not allow for MFT separation after centrifugation at 2500 rpm for 5 min. However, when the SPIONs are added to the MFT, and then that mixture is treated with 9 vol % [$C_8NH_3$][Oleate] (based on the volume of undiluted MFT), the samples are observed to separate with clear upper phases of water (FIGS. 31 *b* and 31 *d*). This demonstrates that SPIONs can be added to MFT, or to the IL [$C_8NH_3$][Oleate], prior to MFT treatment and remain effective. When adding SPIONs to the IL [$C_8NH_3$][Oleate], the mixture becomes a flowable slurry which can be separated using a magnetic bed or by dissolution of the IL in acetone and then magnetic separation. The inset Figures in 31 *b* and 31 *d* show the water phase of the separation which was decanted. It is worth noting that the water phase in 31 *d* appears much clearer compared to the one from FIG. 31 *b*, and that these MFT samples were diluted with DI water. This result illustrates that MFT diluted with DI water can be treated with IL and SPIONs and still produce a relatively clear water phase. When compared to the diluted vials from FIG. 20, SPIONs can be used to separate clear water from DI diluted MFT.

Figure 32:
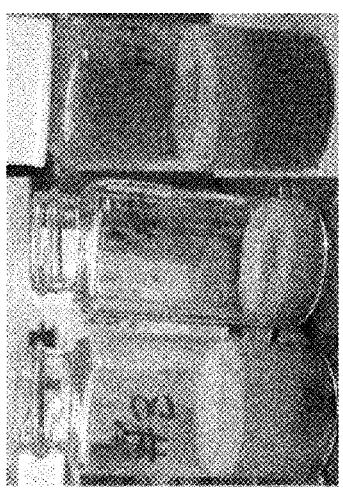
FIG. 32: Diluted samples of MFT (3×) treated with [C$_8$NH$_3$][Oleate]-Fe$_3$O$_4$ nanoparticles (20 wt % nanoparticles of 20-30 nm). Left image: samples exposed to magnetic field. Right image: sample not exposed to magnetic field.

[$C_8NH_3$][Oleate] was mixed with 20 wt % superparamagnetic iron oxide ($Fe_3O_4$) nanoparticles (20-30 nm). The particles formed a suspension with the IL, and did not gel. 33 g sample of MFT were diluted with DI water to a final volume of 100 g. To this diluted MFT, 3 g of the [$C_8NH_3$][Oleate]+nanoparticle mixture was added and the beaker and was stirred using a overhead stirrer (500 rpm, 12 min). After stirring, the mixtures were separated into different 20 mL glass vials. Two vials, containing 5 and 10 g of the mixture, were placed onto a magnetic bead. A third vial containing 10 g of the mixture was used as control (not exposed to the magnetic field). Fast magnetic separation of the clay aggregates was observed (FIG. 32). To note is that the treated sample settles adequately in as little as 40 sec even without the application of a magnetic field.

Figure 33:
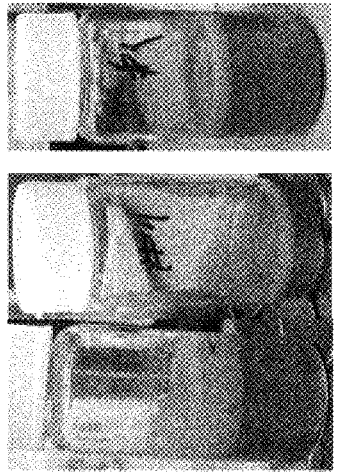
FIG. 33: MFT samples treated with [C$_8$NH$_3$][Oleate]-Fe$_3$O$_4$ nanoparticles (20 wt % nanoparticles of 20-30 nm). Left image: samples exposed to magnetic field. Right image: sample not exposed to magnetic field.

[$C_8NH_3$][Oleate] was mixed with 20 wt % superparamagnetic iron oxide ($Fe_3O_4$) nanoparticles (20-30 nm). The particles formed a suspension with the IL, and did not gel. 100 g sample of MFT were mixed with 3 g [$C_8NH_3$][Oleate]+nanoparticle mixture in a beaker and stirred using an overhead stirrer (500 rpm, 12 min). After stirring, the mixtures were separated into different 20 mL glass vials. Two vials, containing 5 and 10 g of the mixture, were placed onto a magnetic bead. A third vial containing 10 g of the mixtures was used as control (not exposed to the magnetic field). The magnetic separation was faster than without the magnetic field, although slower in comparison to the previous example (using diluted MFT) (FIG. 33).

Figure 34:
FIG. 34: MFT samples treated with [C$_8$NH$_3$][Oleate]-Fe$_3$O$_4$ particles (20 wt %). (a) Undiluted MFT samples, (b) Diluted MFT samples.
Figure 34:

[$C_8NH_3$][Oleate] was mixed with 20 wt % iron oxide ($Fe_3O_4$). The particles formed a suspension with the IL. 100 g of MFT (diluted ×3 with DI water and not diluted) were mixed with 3 g [$C_8NH_3$][Oleate]+iron particle mixture in a beaker and stirred using an overhead stirrer (500 rpm, 12 min). After stirring, the mixtures were separated into 20 mL glass vials. Two vials, containing 5 and 10 g of the mixture, were placed onto a magnetic bead. A third vial containing 10 g of the mixtures was used as control (not exposed to the magnetic field). In the undiluted sample, the no separation was observed after 2 h under magnetic field. However, with the diluted sample, the magnetic separation occurred within 5 sec of exposure to the magnetic field. The magnetic separation was faster than without the magnetic field (FIG. 34).

Figures 35, 36:
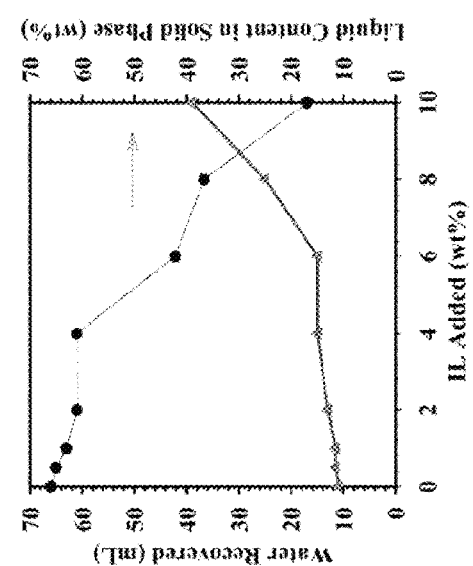
FIG. 35: Effect of [C$_8$NH$_3$][Oleate] amount on the amount of water recovered and on the liquid content in the solid phase after MFT treatment and vacuum filtration.
FIG. 36: Effect of [C$_8$NH$_3$][Oleate] amount on the solid obtained after MFT treatment and vacuum filtration.

Using Vacuum Filtration 100 g MFT were poured into a 250 mL beaker (with a baffle inserted). A certain amount of [$C_8NH_3$][Oleate] was added to the beaker (concentration calculated based on solid content of the sample) and the beaker was placed below an overhead impeller for stirring (speed and time varied from experiment to experiment). After mixing for 500 rpm, 15 min, the mixture was transferred to a funnel containing a paper filter (2.5 m pore size) and placed on the top of a filtration flask. Vacuum was applied overnight and water was recovered on the filtration flask. The recovered water (FIG. 35) increased with the amount of IL, and so did the solid percentage in the solid phase. A minimum of IL is required to obtain a solid phase "trafficable" (not leaking, FIG. 36).

Example 9: Treatment of Different Tailings

Figures 37A, 37B:
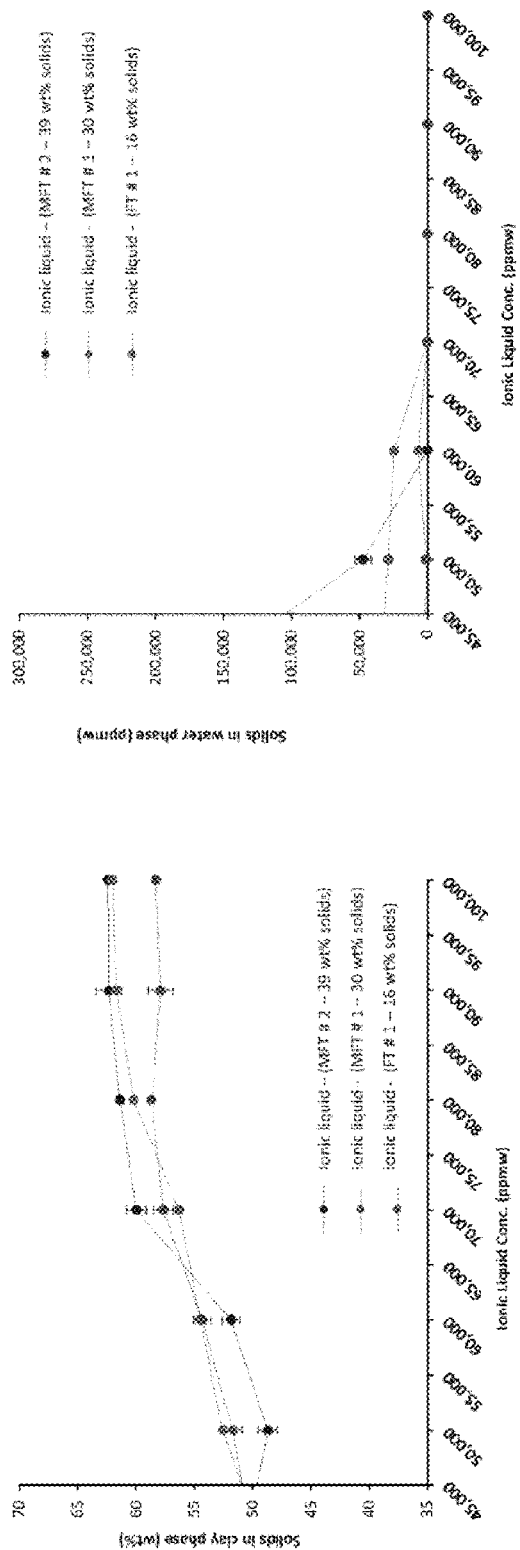
FIG. 37($a$): Solid content in the clay phase after centrifugation. (b) Solid content in the water phase after centrifugation. (c) Bitumen content in the water phase after centrifugation.

The treatment of different tailings (with different compositions, Table below) using [$C_8NH_3$][Oleate] was evaluated. 50 g of the tailing were placed into a 250 ml beaker (with a baffle inserted) and a certain amount of the IL (calculated by solid weight content, present in the tailing) was added. The mixture was then stirred using an overhead stirrer for 2 m in at 2000 rpm. After stirring, the mixtures were centrifuged (4000 rpm, 5 min) and water phase was separated. After weighing the water phase, the water was evaporated in an oven overnight and solid content present in water was quantified (FIGS. 37*a-b*).

| Sample | Solids (wt %) | Water (wt %) | Bitumen (wt %) | Clay content (wt % solids) |
|---|---|---|---|---|
| FT # 1 | 16.2 ± 0.1 | 82.1 ± 0.3 | 1.7 ± 0.1 | 61.6 ± 0.6 |
| MFT # 1 | 30.2 ± 0.2 | 68.1 ± 0.3 | 1.7 ± 0.1 | 65.2 ± 0.8 |
| MFT # 2 | 39.0 ± 0.2 | 60.4 ± 0.2 | 0.6 ± 0.1 | 73.5 ± 1.7 |

Figure 38:
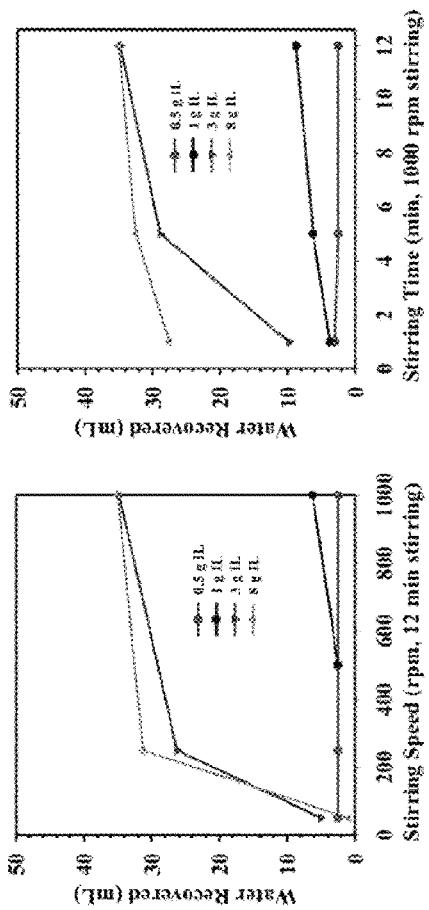
FIG. 38: Water recovered after centrifugation when the mixture was (left) stirred at differed speeds, and (right) when the mixture was stirred at different times.

* Clay content determined by the methylene blue test 100 g MFT was poured into a 250 ml beaker (with a baffle inserted). A certain amount of [$C_8NH_3$][Oleate] was added to the beaker and the beaker was placed below an overhead impeller for stirring (speed and time varied from experiment to experiment). After mixing time, the mixture was transferred to 50 ml centrifugation tubes and the tubes were centrifuged at different speeds, every time for 5 min. After each centrifugation, the volume of water in the upper phase was recorded (FIG. 38).

Example 10: Decreasing the Dosage of IL Using Salts as Additives

In various embodiments, the amount of IL can be decreased by adding one or more various salts to the mixture.

Figure 39:
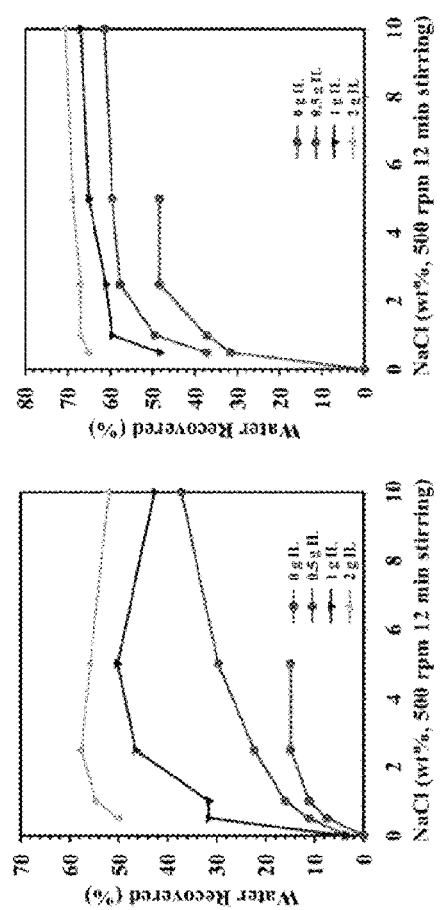
FIG. 39: Effect of MFT treatment using [C$_8$NH$_3$][Oleate] with the addition of NaCl in the water recovered (%) after centrifugation at (left) 2000 rpm, 5 min, and (right) 4000 rpm, 5 min.

NaCl addition: 100 g MFT were poured into a 250 mL beaker (with a baffle inserted). A certain amount of NaCl was added (solid salt) and the mixture was stirred for 1 min at 500 rpm using an overhead impeller. Then, certain amount of [$C_8NH_3$][Oleate] was added to the beaker and the mixture was stir using the overhead (speed and time varied from experiment to experiment). After mixing time, the mixture was transferred to 50 mL centrifugation tubes and the tubes were centrifuged at different speeds, for 5 min. After each centrifugation, the volume of water in the upper phase was recorded (FIG. 39).

Figure 40:
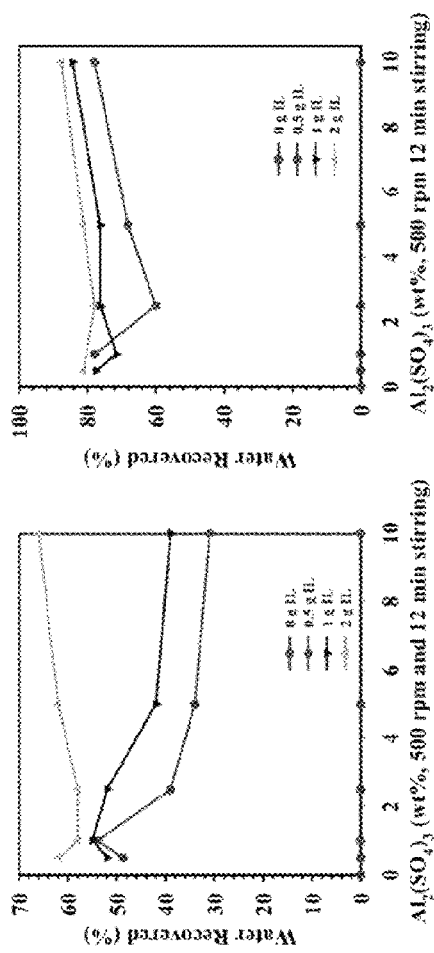
FIG. 40: Effect of MFT treatment using [C$_8$NH$_3$][Oleate] with the addition of Al$_2$(SO$_4$)$_3$ in the water recovered (%) after centrifugation at (left) 2000 rpm, 5 min, and (right) 4000 rpm, 5 min.

$Al_2(SO_4)_3$ addition: 100 g MFT were poured into a 250 mL beaker (with a baffle inserted). A certain amount of Al2(SO4)3 was added (solid salt, hydrated) and the mixture was stirred for 1 min at 500 rpm using an overhead impeller. Then, certain amount of [$C_8NH_3$][Oleate] was added to the beaker and the mixture was stir using the overhead (speed and time varied from experiment to experiment). After mixing time, the mixture was transferred to 50 mL centrifugation tubes and the tubes were centrifuged at different speeds, for 5 min. After each centrifugation, the volume of water in the upper phase was recorded (FIG. 40).

Figure 41:
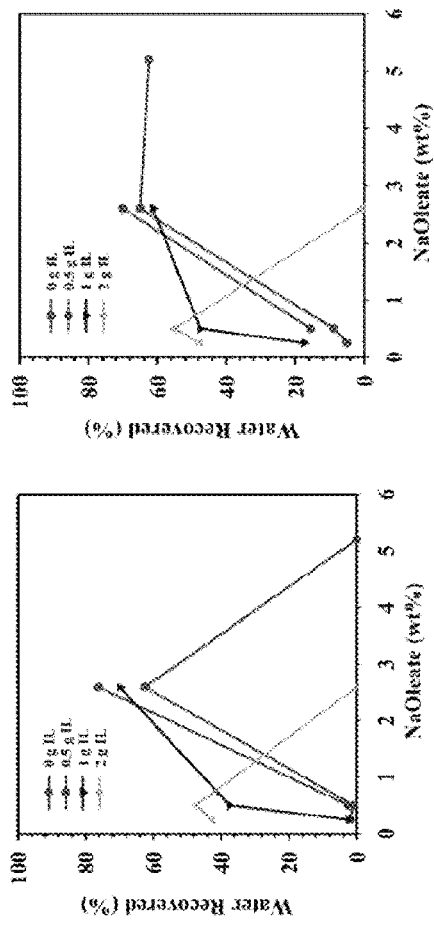
FIG. 41: Effect of MFT treatment using [C$_8$NH$_3$][Oleate] with the addition of NaOleate in the water recovered (%) after centrifugation at (left) 2000 rpm for 5 min, and (right) 4000 rpm for 5 min.

100 g MFT were poured into a 250 mL beaker (with a baffle inserted). A certain amount of NaOleate or AlOleate was added (solid salt) and the mixture was stirred (500 rpm, 1 min) using an overhead impeller. Then, certain amount of [$C_8NH_3$][Oleate] (0-2 g IL) was added to the beaker and the mixture was stirred using the overhead (500 rpm, 12 min). After mixing time, the mixture was transferred to 50 mL centrifugation tubes and the tubes were centrifuged (2000 or 4000 rpm for 5 min). After centrifugation, the volume of water in the upper phase was recorded (FIG. 41).

Figure 42:
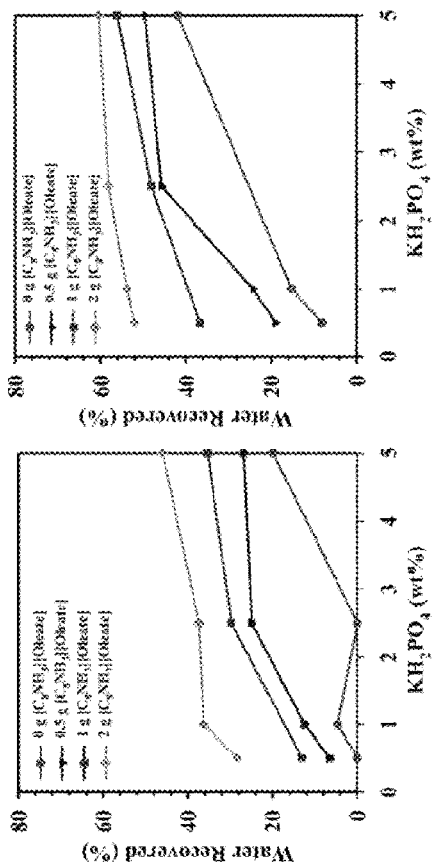
FIG. 42: Effect of MFT treatment using [C$_8$NH$_3$][Oleate] with the addition of KH$_2$PO$_4$ in the water recovered (%) after centrifugation at (left) 1600 rpm for 5 min, and (right) 4000 rpm for 5 min.

100 g MFT were poured into a 250 mL beaker (with a baffle inserted). A certain amount of $KH_2PO_4$ was added (solid salt) and the mixture was stirred (500 rpm, 1 min) using an overhead impeller. Then, certain amount of [$C_8NH_3$][Oleate] (0-2 g IL) was added to the beaker and the mixture was stirred using the overhead (500 rpm, 12 min). After mixing time, the mixture was transferred to 50 mL centrifugation tubes and the tubes were centrifuged (1600 or 4000 rpm for 5 min). After centrifugation, the volume of water in the upper phase was recorded (FIG. 42).

Figure 43:
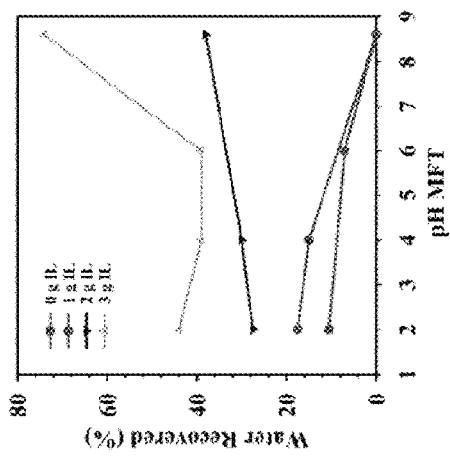
FIG. 43: Effect of MFT treatment using [C$_8$NH$_3$][Oleate] with the pH in the water recovered (%) after centrifugation at 1600 rpm for 5 min.

100 g MFT were poured into a 250 mL beaker (with a baffle inserted). The pH of MFT was adjusted to pH 2 and 4 using diluted solutions of HCl. Then, certain amount of [$C_8NH_3$][Oleate] (0-3 g IL) was added to the beaker and the mixture was stirred using the overhead (500 rpm, 12 min). After mixing time, the mixture was transferred to 50 mL centrifugation tubes and the tubes were centrifuged (1600 rpm, 5 min). After centrifugation, the volume of water in the upper phase was recorded (FIG. 43). The pH of the recovered water was 5 for those MFT samples at pH 2 treated with the IL, and ca. 6.5 for those MFT samples at pH 4.

Example 11: Bitumen Extraction from Mineable Oilsand

In a further aspect, the invention provides methods of extracting bitumen from oilsand in which caustic water is not the primary vehicle for the separation.

Samples of oil sand were mixed with an ionic liquid ([$C_8NH_3$][Oleate]) in a 1:2 oil sand: IL ratio in a 20 mL glass vial. The mixtures were mixed using a magnetic stir bar on a stir plate (300 rpm, 24 h) at room temperature. After stirring, the samples were centrifuged (2500 rpm, 5 min). Bitumen extraction was considered to be positive if the supernatant liquid phase was observed to be discolored (black, FIG. 44, Exp. #1-10). All the ILs evaluated showed partial discoloration of the liquid phase after extraction.

Figure 44:
FIG. 44: Ionic liquids evaluated for bitumen extraction from oil sands.
Figure 44:
Figure 44:
Figure 44:
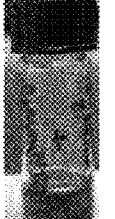
Figure 44:
Figure 44:
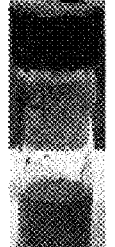
Figure 44:
Figure 44:
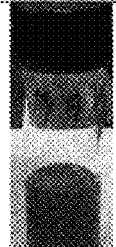
Figure 44:
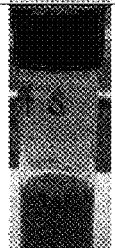
Figure 44:
Figure 44:
Figure 44:
Figure 44:
Figure 44:
Figure 44:
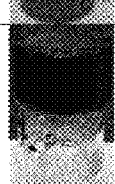
Figure 44:

DI water was added to the mixtures, then further mixed by magnetic stirring (300 rpm, 1 h), and centrifuged 2500 rpm, 5 min. Due to its low density, the bitumen-enriched phase of [$P_{66614}$][Cl] (FIG. 44, Exp #7) was observed in the upper part (above the aqueous phase), while the aqueous phase was clear. However, the [$P_{66614}$][$NTf_2$] (FIG. 44, Exp #8) resulted in the deposit of the bitumen-enriched IL phase on the sand. When the alkylammonium-based oleate ILs ([$C_nNH_3$][Oleate]) were evaluated (FIG. 44, Exp #4-6), it was observed that bitumen was separated from the oil sand in all cases. However, after addition of water and centrifugation at 2500 rpm, 5 min, the phases were easily separated only in the system containing [$C_8NH_3$][Oleate] (FIG. 44, Exp #6). On the other hand, a stronger centrifugation (3000 rpm, 30 min) was needed to see some phase separation for [$C_6NH_3$][Oleate]-containing system (FIG. 44, Exp #5). Here the bituminous phase contained clays (visually observed), and part of the IL remained in the aqueous phase. No separation of phases was observed in the system containing [$C_4NH_3$][Oleate] (FIG. 44, Exp #4).

Samples of oil sand were mixed with an ionic liquid ([$C_8NH_3$][Oleate]) in a 1:2 oil sand: IL ratio in a 20 mL glass vial. The mixtures were mixed using a magnetic stir bar on a stir plate (300 rpm, 24 h) at 80° C. The samples were then centrifuged (2500 rpm, 5 min). Bitumen extraction was considered to be positive if the liquid phase was observed to be discolored (black, FIG. 44, Exp. #11-21).

Figure 45:
FIG. 45: Resulting phases after filtration using a 70 m filter and centrifuged.

After 24 h stirring (80° C.) the mixtures were filtered using a 70 Mm filter and centrifuged (3500 rpm, 5 min) to accelerate filtration (while the solution is still warm). After filtration, the tubes with the filter were placed in the oven at 80° C. for 1 h, and centrifuged again (FIG. 45). In most of the cases, the bitumen was at least partially extracted in the IL, and sand was observed to be dispersed. In the case of [Cho][OAc], [Cho][Formate], and [$C_8NH_3$][Octanoate], bitumen was not observed to be dispersed in the liquid phase. Instead, three phases were observed.

Figure 46:
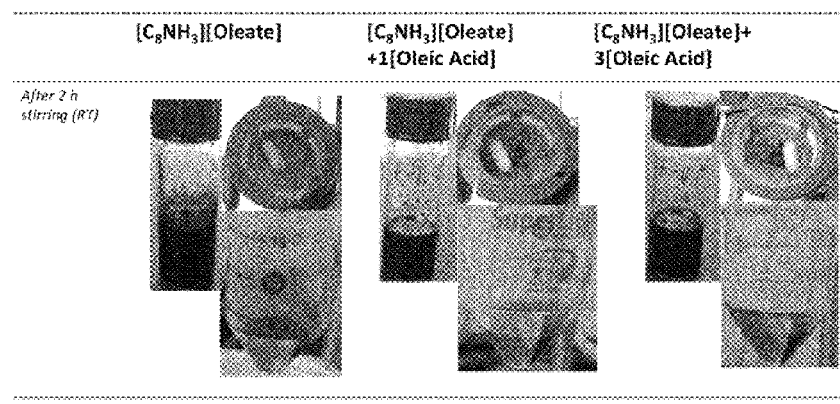
FIG. 46: Resulting phases after filtration using a 70 m filter and centrifuged.

Ionic liquids were prepared by adding oleic acid to [$C_8NH_3$][Oleate] in different ratios and mixing. After mixing, samples of oil sand were mixed with the mixtures in a 1:2 oil sand: IL ratio in 20 mL glass vials. The mixtures were mixed using a magnetic stir bar on a stir plate (300 rpm, 2 h) at room temperature. All the ILs evaluated showed partial discoloration of the liquid phase after extraction, indicating bitumen extraction. After 2 h stirring, the mixtures were filtered using a 70 m filter and centrifuged (3500 rpm, 5 min) to accelerate filtration (FIG. 46). In most of the cases, the bitumen was at least partially extracted in the IL, and sand was observed to be dispersed.

Figure 47:
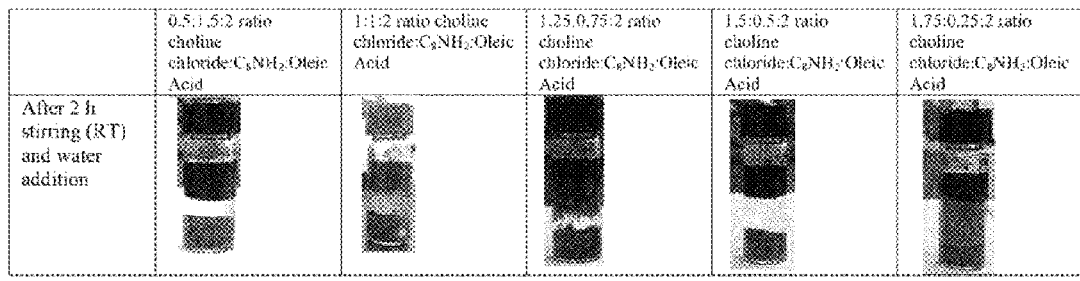
FIG. 47: Resulting phases after bitumen extraction and DI water addition. Upper phase contains extracted bitumen.

Choline chloride was added to the ionic liquid formed with different ratios of n-butylamine and oleic acid. After mixing, samples of oil sand were mixed with the mixtures in a 1:2 oil sand: IL ratio in a 20 mL glass vial. The mixtures were mixed using a magnetic stir bar on a stir plate (300 rpm, 2 h) at room temperature. All the ILs evaluated showed partial discoloration of the liquid phase after extraction, indicating bitumen extraction (FIG. 47). DI water was added to the mixtures and then further mixed by magnetic stirring (300 rpm, 1 h). The samples were then centrifuged (2500 rpm, 5 min).

Figure 48:
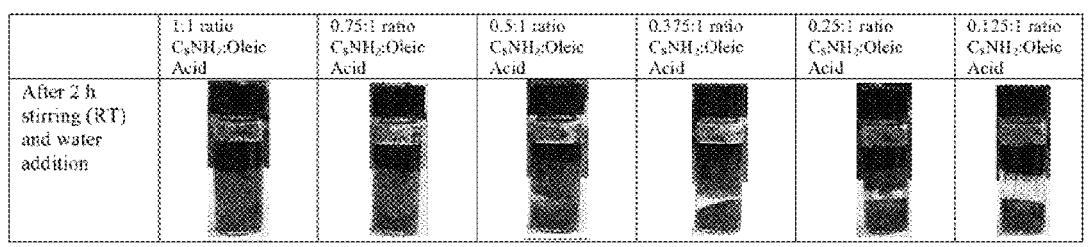
FIG. 48: Resulting phases after bitumen extraction and DI water addition. Upper phase (black) contains extracted bitumen.

Ionic liquids were prepared by mixing different ratios of n-butylamine and oleic acid. After mixing, samples of oil sand were mixed with the mixtures in a 1:2 oil sand:IL ratio in 20 ml glass vials. The mixtures were mixed using a magnetic stir bar on a stir plate (300 rpm, 2 h) at room temperature. All the ILs evaluated showed partial discoloration of the liquid phase after extraction, indicating bitumen extraction (FIG. 48). DI water was added to the mixtures and then further mixed by magnetic stirring (300 rpm, 1 h). The samples were then centrifuged (2500 rpm, 5 min).

Figure 49:
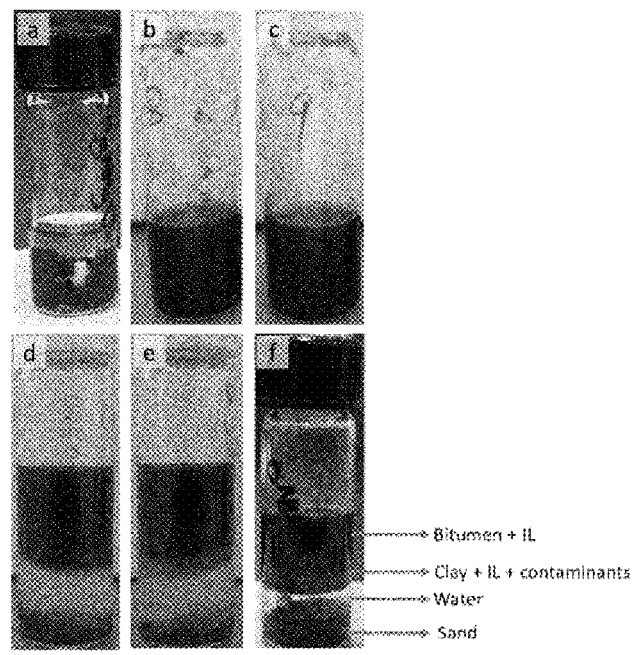
FIG. 49: Images of the bitumen extraction process using [C$_8$NH$_3$][Oleate]. (a) Addition of IL to oilsand. (b,c) Repeat samples after magnetic stirring for 24 h. (d,e,f) After addition of water and centrifuge. Four distinct phases are clearly evident after phase separation using water.

Samples of oil sand were mixed with $[C_8NH_3][Oleate]$ in a 1:2 oil sand: IL ratio in a 20 mL glass vial. The mixtures were mixed using a magnetic stir bar on a stir plate (300 rpm, 24 h) at room temperature. All the ILs evaluated showed partial discoloration of the liquid phase after extraction, indicating bitumen extraction. After 24 h stirring DI water was added to the mixtures and then further mixed by magnetic stirring (300 rpm, 1 h). The samples were then centrifuged (2500 rpm, 5 min). In the case of $[C_8NH_3][Oleate]$, 84 wt % of the total bitumen in the sample was extracted at room temperature. The separation of the phases in the sample is shown in FIGS. 49d, e, and f. Here, the extracted sand resides at the bottom under a layer of clear water. Immediately above this there is a light brown layer (labelled "clay+IL+contaminants" in 49f) that was analyzed and determined to be a mixture of very fine clay/sand particles mixed with the ionic liquid and some bitumen.

Figure 50:
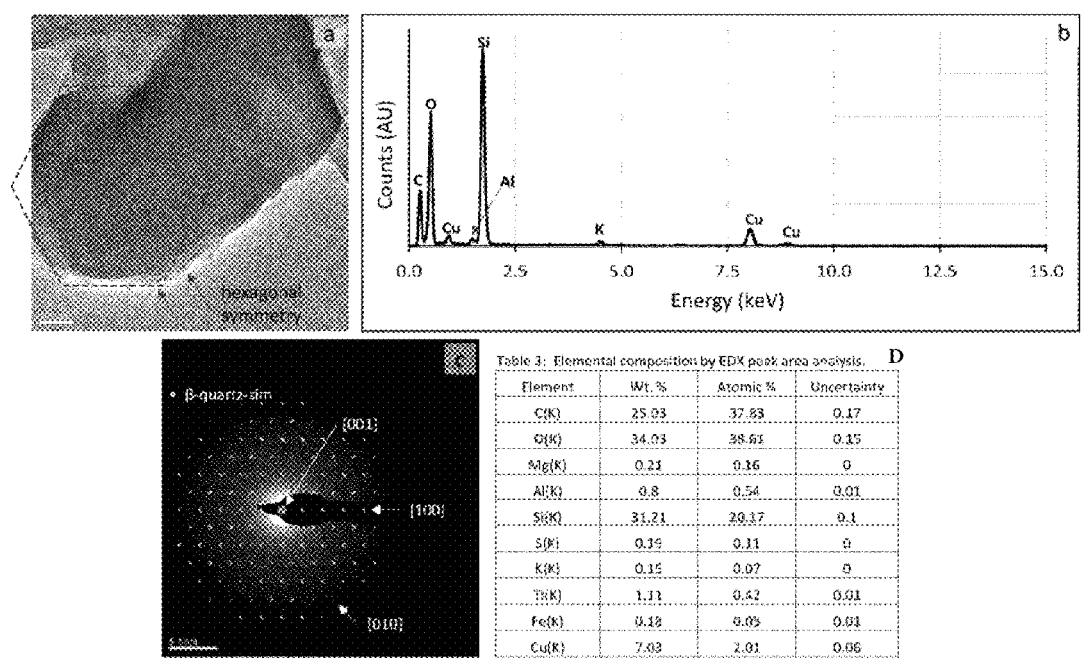
FIG. 50: (a) Bright field TEM micrograph of silica particle, (b) EDX spectrum of sample showing elemental composition as Si and O rich, (c) Selected area diffraction pattern of sample showing 3-fold hexagonal symmetry (d) Diffraction pattern overlaid with a β-quartz single crystal simulation (grey dots) with the center spot as the [001] direction, (perpendicular to the basal plane). Table shows elemental composition by EDX peak area analysis.
Figure 51:
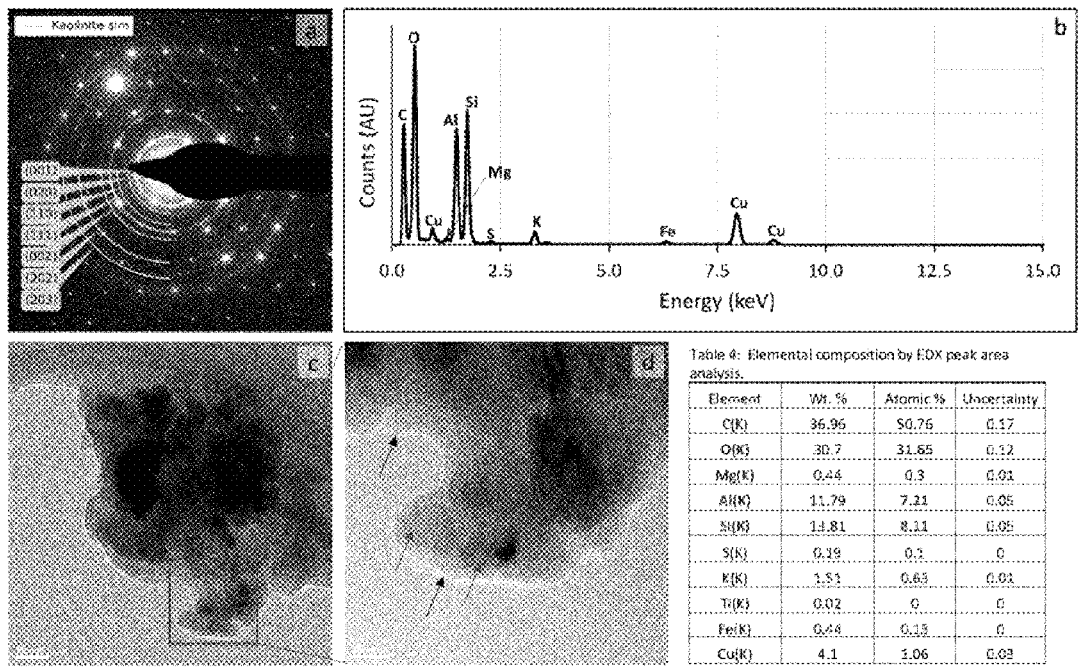
FIG. 51 ($a$): Selected area diffraction pattern of sample in (c), semicircles represent a simulation for a common clay crystal structure (kaolinite). (b) EDX spectrum of sample showing elemental composition rich in Al, Si, and O. (c-d) Bright field TEM micrographs at increasing magnification. Individual particles (grey arrows) below 100 nm (ultrafines). Black arrows highlight a buildup of an organic layer (probably carbon) that is an artifact from the TEM sample holder. Table shows elemental composition of the sample by EDX peak area analysis.

FIGS. 50 and 51 show a series of bright field TEM images together with corresponding EDX spectra and selected area electron diffraction patterns (SAED) obtained for samples of the solids in the light brown layer of FIG. 49f. Tables indicate the relative amounts of various elements present in the particles that were analyzed respectively, by EDX peak area analysis. From FIG. 50 the particles that were analyzed appear to be silica. The carbon and copper signals in the EDX spectrum (52b) are an artifact of the sample holder, and from this data it can be observed that this particular particle is predominantly silicon and oxygen. The indexed SAED pattern is consistent with a material exhibiting hexagonal symmetry and this is consistent with the bright field micrograph in FIG. 50a. The elemental analysis is consistent with a composition of $SiO_2$. FIG. 51a shows an SAED pattern for the particle in FIGS. 51c and 51d that has been indexed to a kaolinite simulation (semicircles). Ultrafine particles are evident in the bright field TEM image of FIG. 51d (grey arrows), as well as some buildup of carbon from the sample holder (black arrows). The elemental analysis from the EDX spectra indicates a composition of $Al_2Si_2O_8$ which is consistent with a kaolinite phase of clay $(Al_2Si_2O_5(OH)_4)$.

Figure 52:
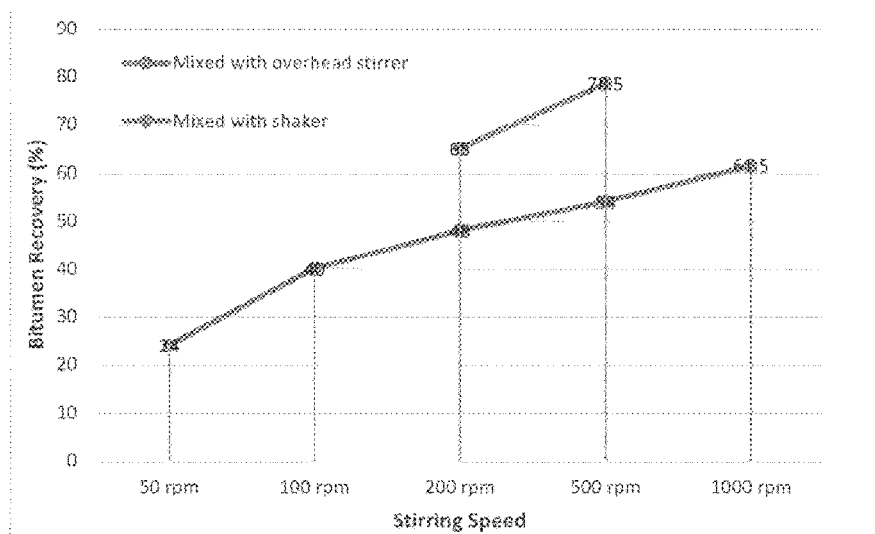
FIG. 52: Effect of stirring type and speed on the bitumen extraction using [C$_8$NH$_3$][Oleate].

Oil sand was placed in a beaker and $[C_8NH_3][Oleate]$ was added in a 2:1 ratio. The mixture was mixed for 30 min at different speeds (50 to 1000 rpm) at room temperature using either an overhead stirrer or a shaker. All the ionic liquids evaluated showed partial discoloration of the liquid phase after extraction, indicating bitumen extraction. The quantification of the bitumen extracted indicated that the stirring mode has a high influence on the bitumen recovered (FIG. 52).

Figure 53:
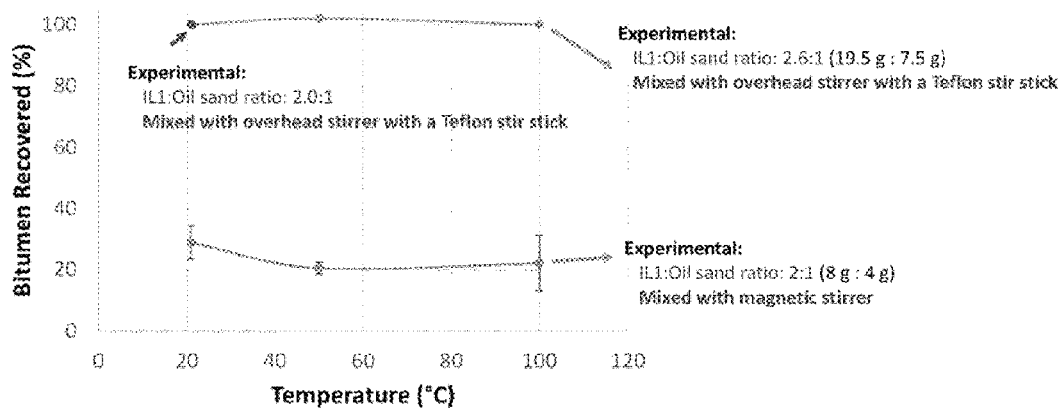
FIG. 53: Effect of temperature and stirring type on the bitumen extraction using [C$_8$NH$_3$][Oleate].

Oil sand was placed in a beaker and $[C_8NH_3][Oleate]$ was added in a 2:1 or 2.6:1 ratios. The mixtures were stirred for 24 h at different temperatures (from 25 to 100° C.) using either an overhead stirrer or a magnetic stirrer. In all the experiments, the IL was observed to be discolored after extraction, indicating bitumen extraction (FIG. 53).

Figure 54:
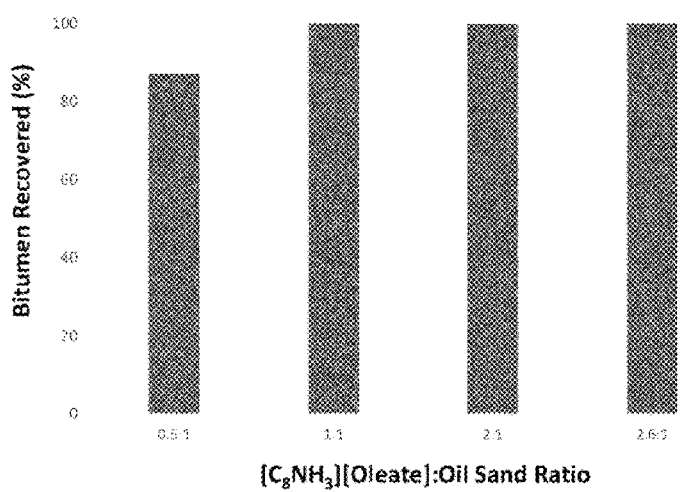
FIG. 54: Effect of [C$_8$NH$_3$][Oleate]:oil sand ratio on the bitumen extraction using [C$_8$NH$_3$][Oleate].

Oil sand was placed in a beaker and $[C_8NH_3][Oleate]$ was added at different ratios (from 0.5:1 to 2.6:1 ratios). The mixtures were stirred for 24 h at room temperature using an overhead stirrer. In all the experiments, the IL was observed to be discolored after extraction, indicating bitumen extraction (FIG. 54).

15 g oil sand was placed in a beaker and different amounts of $[C_8NH_3][Oleate]$ (from 5 to 15 g). The mixtures were stirred for 30 min at room temperature using an overhead stirrer. In all the experiments, the IL was observed to be discolored after extraction, indicating bitumen extraction.

Figure 55:
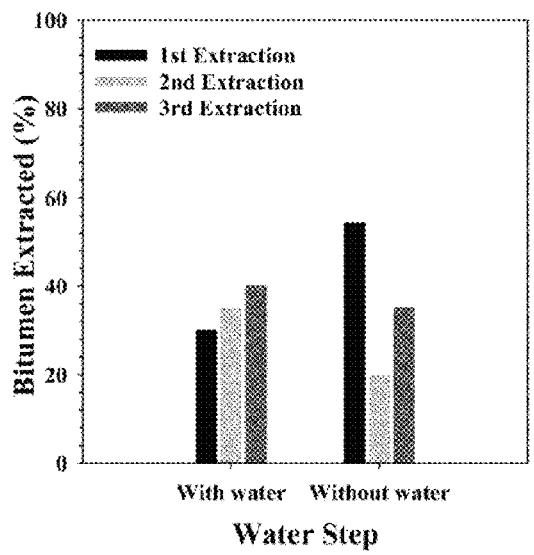
FIG. 55: Effect of successive extractions using [C$_8$NH$_3$][Oleate] on the bitumen extraction.

Two beakers containing 15 g oil sand and 15 g $[C_8NH_3][Oleate]$ were prepared. The mixtures were stirred for 5 min at room temperature using an overhead stirrer. Both liquid phases showed discoloration after extraction, indicating bitumen extraction. DI water was added to one of the beakers, and both mixtures were centrifuged at 4000 rpm, 5 min. The upper phase was separated and bitumen was quantified. 15 g $[C_8NH_3][Oleate]$ were added to the separated sand and the extraction process was repeated twice. FIG. 55 shows the bitumen extracted from each iteration as a fraction of the bitumen present in the sand at the beginning of each iteration.

5 or 15 g $[HN_{222}][Oleate]$ were added to 15 g oil sand. The mixtures were stirred for 30 min at room temperature using an overhead stirrer. Both liquid phases showed discoloration after extraction, indicating bitumen extraction. DI water was added to one of the beakers, and both mixtures were centrifuged at 4000 rpm, 5 min. The upper phase was separated and bitumen was quantified, indicating 53 and 30% bitumen extraction using 5 g and 15 g $[HN_{222}][Oleate]$, respectively.

5 g $[HN_{222}][Oleate]$ were added to 15 g oil sand. The mixtures were stirred for 60 and 120 min at room temperature using an overhead stirrer. Both liquid phases showed discoloration after extraction, indicating bitumen extraction. DI water was added to one of the beakers, and both mixtures were centrifuged at 4000 rpm, 5 min. The upper phase was separated and bitumen was quantified, indicating 60 and 72% bitumen extraction at 60 and 120 min extraction, respectively.

Example 12: ILs as Diluent for Bitumen

From the previous bitumen extraction examples, it has been demonstrated that the bitumen+IL layer had a noticeably lower viscosity than pure bitumen, evidencing the fact that the ionic liquid may be used as a diluent for bitumen. Bitumen that is extracted using hot caustic water must be transported to a refinery via pipeline and for that to happen it must be first diluted into "dil-bit". Common diluents include naphtha and sweet synthetic crude oils. Typically, the target pipeline specification for the dil-bit is a density not exceeding 940 kg/m$^3$ and a kinematic viscosity not exceeding 350 cSt at 15° C. A common dil-bit concentration is 30 vol % naphtha and 70 vol % bitumen. Current diluents such as naphtha do not have zero vapour pressure, which can lead to safety hazards and environmental fallout during a spill. Accordingly, in one aspect of the invention, an ionic liquid may be used both as the extraction vehicle and as a diluent.

In various embodiments, mechanical mixing was sufficient to demonstrate that [C$_8$NH$_3$][Oleate] can be used as an effective diluent for bitumen.

Bitumen+[C$_8$NH$_3$][Oleate] that was produced from bitumen extraction was collected as described above and subjected to viscosity and density measurements. The viscosity was measured across a temperature range of 21-75° C. It was determined that the bitumen+[C$_8$NH$_3$][Oleate] mixture extracted at room temperature had the highest viscosity, and this sample was subjected to a series of dilutions with heptane and toluene to ascertain how much diluent would be needed to reduce its viscosity to the pipeline specification of 350 cSt. Dilutions up to 14 vol % were made using heptane and toluene and viscosity was measured at 15° C.

Figure 56:
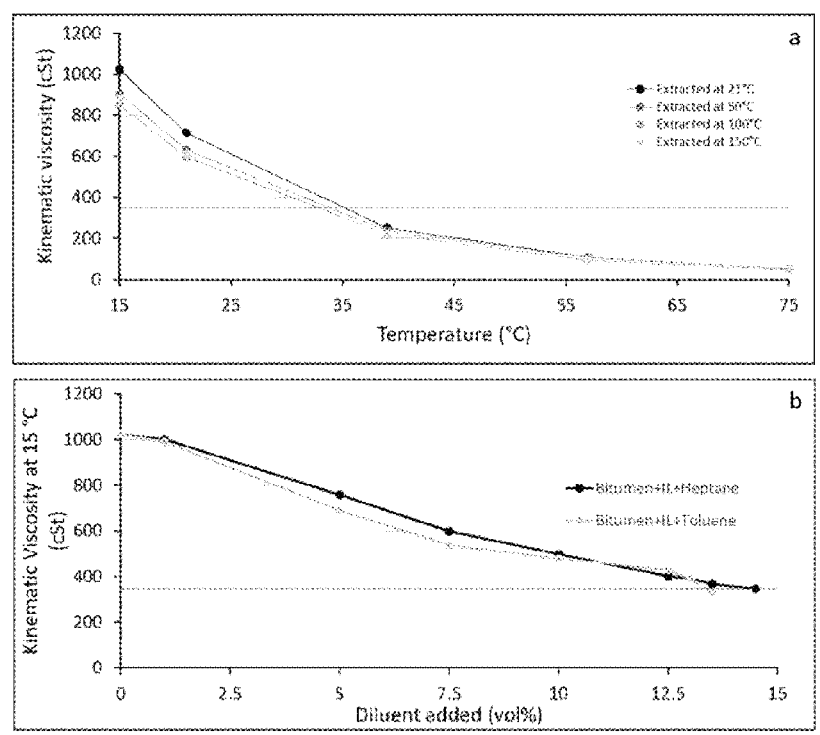
FIG. 56($a$): Graph of viscosity versus temperature for bitumen+[C$_8$NH$_3$][Oleate] mixtures extracted at different temperatures, (b) Viscosity versus diluent added for the bitumen+IL mixture extracted at 21° C. IL used was [C$_8$NH$_3$][Oleate]. Grey lines on the plots represent the pipeline specification of 350 cSt.

FIG. 56a shows graphs of viscosity versus temperature for bitumen+IL mixtures that were extracted at different temperatures (21, 50, 100, and 150° C.) and FIG. 56b shows viscosity versus diluent added for the sample extracted at 21° C. FIG. 56a shows that the viscosity of all samples was well below that for bitumen (commonly >10,000 cSt) at all temperatures, however at 15° C. the mixtures still do not meet the pipeline specifications for viscosity. The graph clearly shows that the specification is met at a temperature of approximately 35° C. for all extraction temperatures. To show that a small amount of common diluent could be successful at producing an on-specification mixture without the need for heating, the sample that was extracted at room temperature was diluted with various amounts of heptane and toluene. Toluene was found to be slightly more effective than heptane as a diluent. FIG. 56b shows the viscosity versus temperature plot of the sample that was diluted with 13.5 vol % toluene to produce a diluted bitumen+IL mixture that had a viscosity of 331 cSt and a density of 890 kg/m3 at 15° C.

Figure 57:
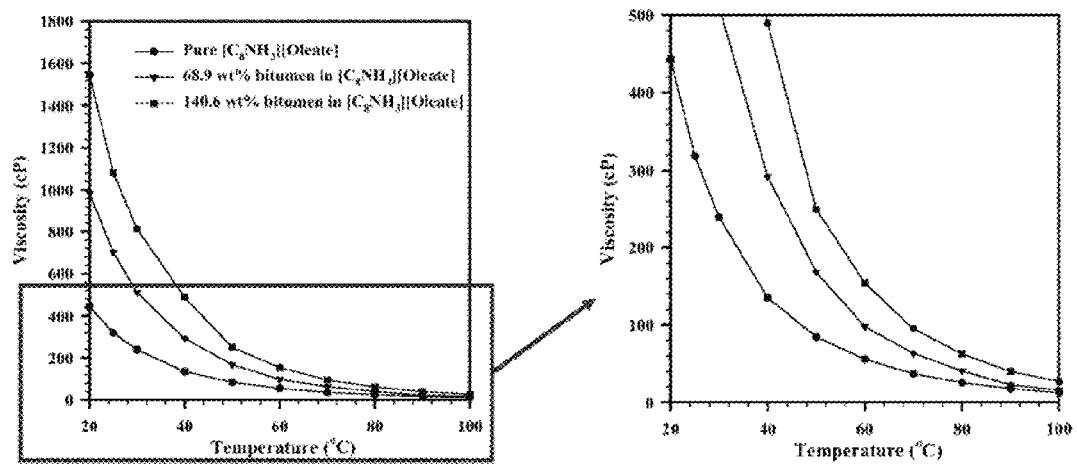
FIG. 57: Graph of viscosity versus temperature for bitumen+[C$_8$NH$_3$][Oleate] mixtures extracted at different temperatures.

Bitumen+[C$_8$NH$_3$][Oleate] mixtures containing 68.9 wt % and 140.6 wt % bitumen were prepared and subjected to viscosity measurements across a temperature range of 20-100° C. (FIG. 57).

Figure 58:
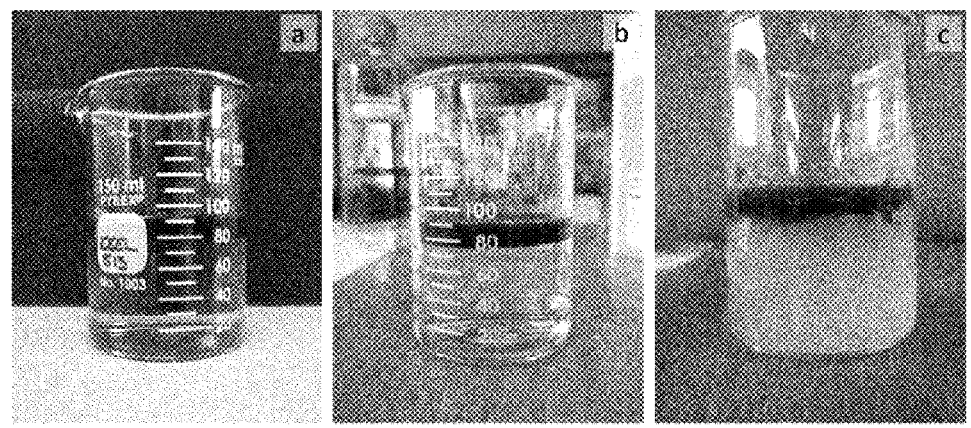
FIG. 58(a): Image showing bitumen+[$C_8NH_3$][Oleate] floating on DI water, (b) After heating at 60° C. for 24 h, no evaporation is evident and top layer is still floating on water, (c) After sample was vigorously stirred using a glass rod and then sonicated for 1 min. Bitumen+IL layer quickly separated from the water and floated back to the surface. Some emulsification of the IL with the water was evident (turbid water).

Another problem with the current dil-bit is what is faced during a pipeline spill. Dil-bit that is ejected into a waterway suffers from the evaporation of the diluent which can result in subsequent sinking of the bitumen in the water. This complicates remediation efforts. FIG. 58 shows pictures of a bitumen+IL mixture that was extracted at room temperature (bitumen concentration approximately 6 wt %) floating on a water phase.

FIG. 58a shows the mixture floating on water, and FIG. 58b shows the beaker after it was left uncovered in a drying oven at 60° C. overnight to see if the bitumen+IL phase would evaporate. As illustrated, the mixture was still stable after the attempted evaporation process and negligible evaporation was observed. FIG. 58c shows the mixture separating from, and again floating on water immediately after the mixture was vigorously stirred for 1 min with a glass rod, and then sonicated for 1 min. Accordingly, an aspect of the invention involves the use of an IL as a bitumen diluent, to provide a stable IL-dilbit having very low vapour pressure and a density below that of water.

An alternative aspect of the invention involves the separation of bitumen from the IL after it had been solubilized.

Figure 59:
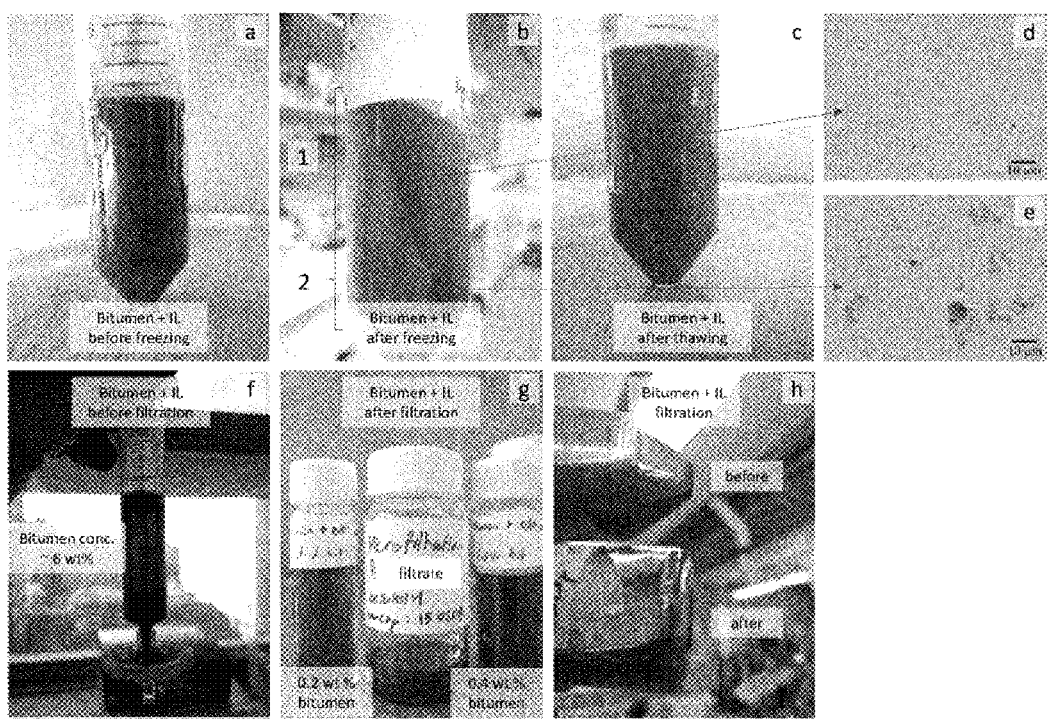
FIG. 59: Samples demonstrating bitumen and ionic liquid separation by (a-c) freezing, and (d-h) filtration, (a) Sample of bitumen and IL where the bitumen concentration is approximately 6 wt %. (b) Sample after freezing overnight at −6° C. Two phases are evident and phase 2 appears to have a higher bitumen concentration by visual colour distinction, (c) Sample after thawing to room temperature. Sample appears homogenous again, (d) 6 wt % bitumen sample in a syringe undergoing microfiltration. Some settling of the bitumen globules in the solution has occurred, (e) Filtrate being compared to two known concentrations of bitumen. Filtrate concentration appears to be between 0.2 and 0.4 wt % bitumen, (f) Filtrate compared to original sample. Filtrate appears lighter in colour.
Figure 60:
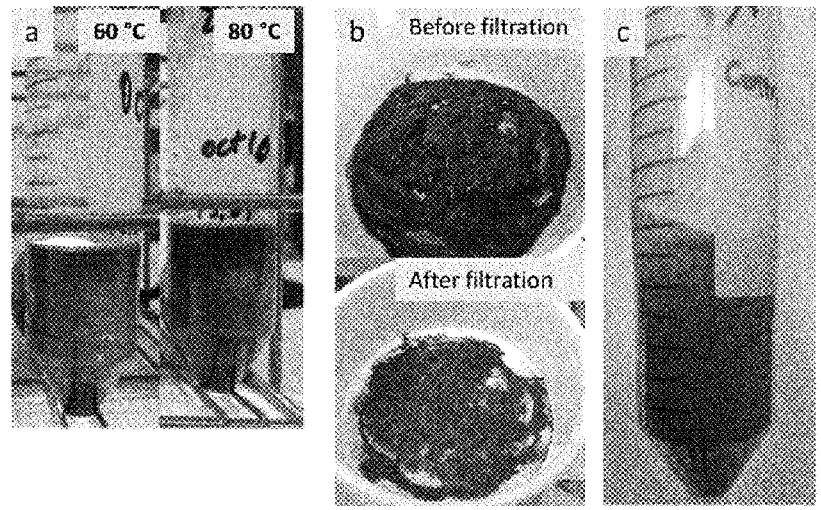
FIG. 60: Samples demonstrating bitumen and [$C_8NH_3$][Oleate] separation by (a) heating overnight at 60 or 80° C. (b) Sample before and after vacuum filtration using a 2.5 urn pore size filter paper, (c) Sample after centrifugation at 4500 rpm, 90 min.

FIGS. 59 and 60 show summaries of different methods to separate bitumen from [C$_8$NH$_3$][Oleate]. FIGS. 59a-e show samples of bitumen-[C$_8$NH$_3$][Oleate] that have been treated by heating and then freezing. FIG. 60a shows the bitumen-[C$_8$NH$_3$][Oleate] mixture after it has been heated to 80° C. This sample was then placed in a freezer and rapidly cooled to −4° C. and left overnight. After freezing, the phase separation that is shown in FIG. 59b occurred, with a visual distinction between a light brown upper phase and a black lower phase labeled 1 and 2 respectively in the Figure. FIGS. 59d and 59e show optical micrographs of sub-samples from the resultant phases. Comparing the two Figures, there are far fewer dark particles in the upper phase. The vial in FIG. 59c shows that the sample has re-homogenized after it was allowed to thaw to room temperature.

The droplet morphology of the bitumen-[C$_8$NH$_3$][Oleate] mixture facilitates separation of the two phases by filtration. To demonstrate this, the mixture was loaded into a syringe and pushed through a microfiltration capsule shown in FIG. 59f. The sample in the syringe was observed to visibly separate when left for 24 h. Gentle pressure was applied to the syringe and the filtrate was collected. This phase was compared on a visual basis to some known concentrations of bitumen-IL and was judged to contain bitumen at a concentration between 0.2 and 0.4 wt %. This comparison is shown in FIG. 59g. FIG. 59h shows the filtrate being compared to the parent mixture before and after filtration. A visible colour change was evident after filtration, indicating that bitumen had been successfully removed by this step.

FIG. 60 shows samples of bitumen-[C$_8$NH$_3$][Oleate] that have been separated by heating (at 60 or 80° C. overnight), centrifuged under high speed (4500 rpm, 90 min), and filtrated using filter paper (2.5 m pore size). FIG. 60a shows the bitumen-[C$_8$NH$_3$][Oleate] mixture after it has been heated to 60 or 80° C. overnight, showing a clear separation between the upper, clear phase containing the IL, and bitumen deposited at the bottom. FIG. 60b demonstrates the separation of bitumen and ionic liquid by vacuum filtration using filter paper (2.5 m pore size). The centrifugation tube in FIG. 60c shows the separation of an upper clear phase (IL) and a lower phase (bitumen).

Other techniques, including the use of an anti-solvent such as methanol, can be used to separate the bitumen-IL phase. Also, the techniques above described can be combined to increase the separation.

Example 13: In-Situ Extraction of Bitumen from Oilsand

Distinct from mining operations, in-situ bitumen recovery methods typically involve the injection of steam into the formation in thermal recovery processes. These thermal techniques, such as cyclic steam stimulation and steam assisted gravity drainage, can leave large residual oil saturations in place, for example from 5% to 30% of the oil in place. Furthermore, they produce oil-water emulsions at the production well that may be difficult to separate at surface. In various embodiments, ionic liquids may be used for the in-situ extraction of bitumen from oilsand.

Figure 61:
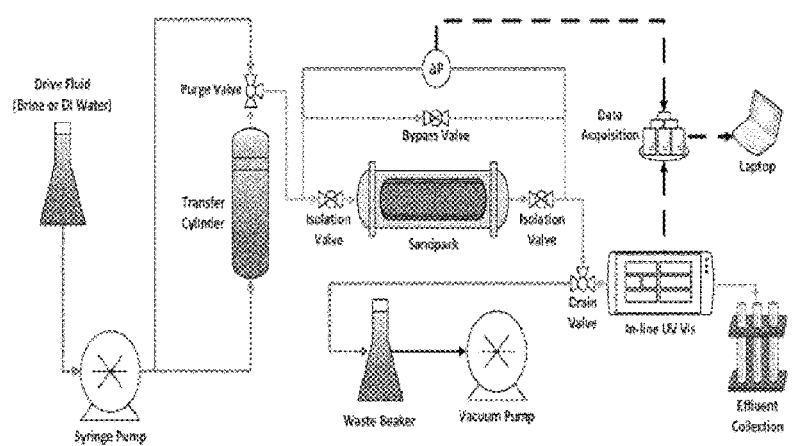
FIG. 61: Process flow diagram of flooding apparatus.
Figure 62:
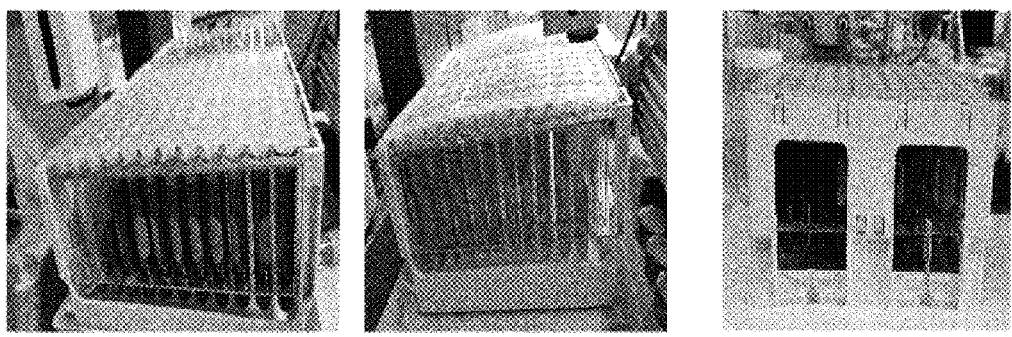
FIG. 62: Fluid samples recovered during the first 2.5 h (left), after 26 h (middle), and the side view for 2 h intervals (right).

100 g dry oil sand was packed into a steel tube (1.5×30 cm). The packed steel tube then was mounted into apparatus to allow injection of desired fluid through the oil sand while collecting the effluent for subsequent analysis (FIG. 61). The injection of [C$_8$NH$_3$][Oleate] was continuous for 26 h at an injection rate of 0.5 mL/min, and the injection pressure was stabilized in the range 1940-2000 kPa. The breakthrough time was around 35 min. This indicates the pore volume was around 17.5 ml. The total amount of [C$_8$NH$_3$][Oleate] injected was around 783 ml. FIG. 62 shows the fluid samples recovered during the first 2.5 h (left), after 26 h (middle), and the side view for 2 h intervals (right). At the first 2.5 h of injection, the bitumen recovery is significant, and the fluid recovered is black. However, with continuing injection the black intensity decreases gradually till the effluent is clear [C$_8$NH$_3$][Oleate] after 26 h.

Figure 63:
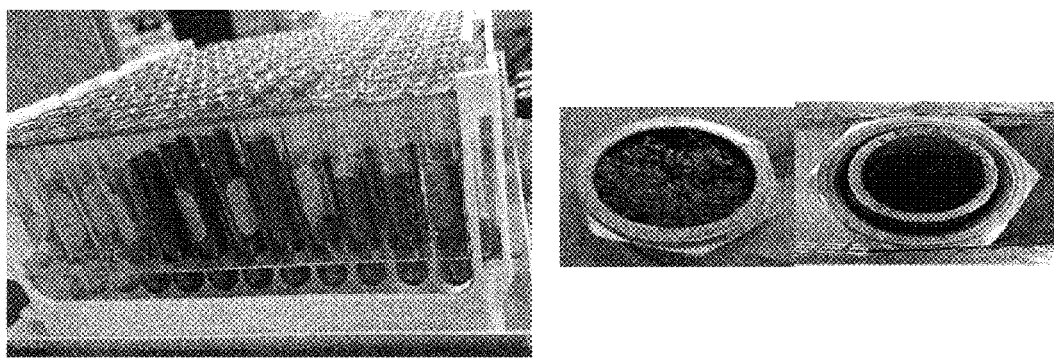
FIG. 63: Left: fluid samples recovered during the first 2 h of injection post-soaking. Right: the inlet (left) and the outlet (right) of the packed tube after finishing the experiments.

After 26 h of injection, the pump was stopped and the [C$_8$NH$_3$][Oleate]/Oil sand system in the steel column was left to soak for 24 h. Then injection was re-started with the same injection rate (0.5 mL/min) and the pressure stabilized at around 1850 kPa (similar level before soaking). The blackness of the fluid samples recovered during 2 h of injection post-soaking is not as intense as that during the same time for [C$_8$NH$_3$][Oleate] injection into the fresh oil sand. After 2 h of injection, there was no more bitumen recovery. FIG. 63 shows the inlet (left) and the outlet (right) after finishing the experiments. After terminating the experiment, the oil sand was removed from the steel tube and used for Dean Stark extraction to determine remaining bitumen. The amount of bitumen recovery from this extraction was 47.34% of the initial amount of bitumen. Accordingly, the effluent samples should contain 52.7% of the initial bitumen in place, meaning the injected ionic liquid recovered 52.7% of the bitumen from the oil sand.

95.5 g of oil sand was packed in a steel column of 1.5 cm diameter and 30.48 cm length. The column was mounted into the column-flooding apparatus (FIG. 61). Vacuum pump was first applied to remove the air form the system. Then [C$_8$NH$_3$][Oleate] was injected at constant injection rate of 1.5 mL/min for 270 min, then stopped for 120 min, and then the [C$_8$NH$_3$][Oleate] was injected at 2.5 mL/min. The effluent samples were collected every 3 min. The maximum recovery of bitumen is during the first pore volume of injection. Then the recovery decreases exponentially.

After terminating the experiment, the bitumen still in the oil sand was quantified using Dean Stark. The bitumen recovered by ionic liquid flowing through the column is 54.3% of the amount of bitumen originally in the column.

Methanol was mixed with [C$_8$NH$_3$][Oleate] in a 20:80 methanol:[C$_8$NH$_3$][Oleate] ratio and the homogeneous mixture was injected into a column packed with oil sand. Initial injection was done at 1.5 mL/min, but the pressure was really low and the breakthrough fluid only didn't contain bitumen. The flow was then increased to 10 mL/min, and the liquid recovered was discolored, similar recovery to that of pure [C$_8$NH$_3$][Oleate]. Last, the flow rate was increased to 20 mL/min and additional recovery was observed, although not as intense as the initial recovery.

Triethylammonium oleate ([HN$_{222}$][Oleate], synthesized following the procedure reported by McCrary et al.) was injected into a column packed with oil sand at an injection rate of 1.5 mL/min. The recovered fluid is extremely black compared to the one recovered using with [C$_8$NH$_3$][Oleate]. Samples collected after breakthrough were highly discoloured (black), indicating bitumen recovery.

Figure 65:
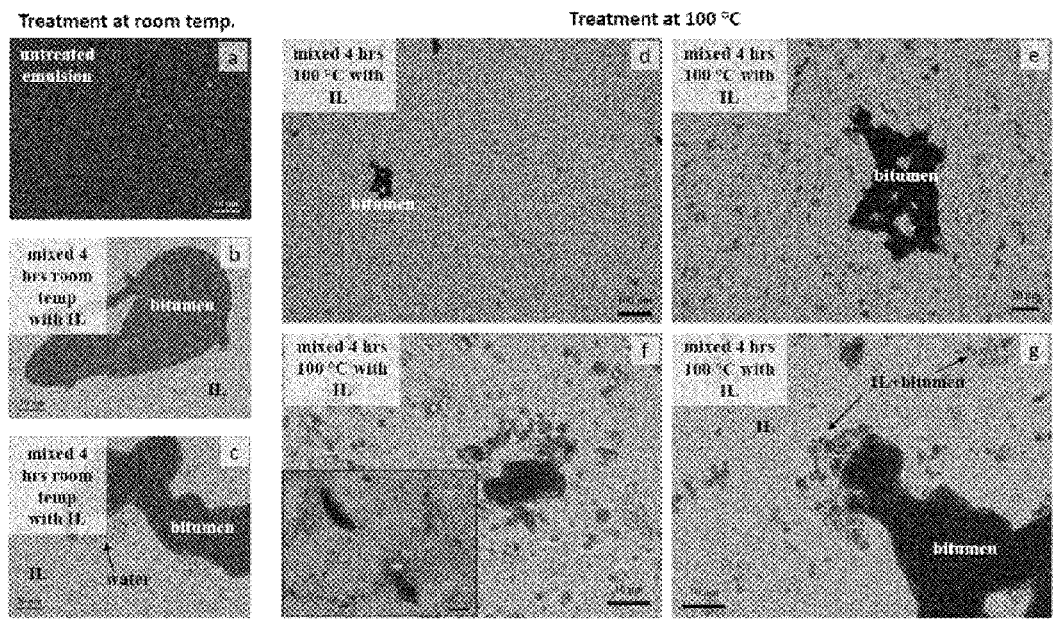
FIG. 65(a-c): Optical micrographs at various magnifications showing SAGD emulsion treated with IL at 21° C. after 4 h of mixing, (d-g) Optical micrographs of the SAGD emulsion at 100° C. after 4 h of mechanical mixing. A 3-phase system is evident where droplets of IL+bitumen and undissolved bitumen are floating in the IL phase that appears as a grey background. Inset of (f): A similar microstructure is observed from bitumen extracted from oilsand using the IL.

The core was packed with dry oil sand and clean sand as follows: A channel of clean sand that was 0.32 cm in thickness was created down the center of the core (diameter 3.35 cm), with oil sand on both sides (FIG. 65). This facilitated a "flow past" scenario in which the majority of the [P$_{66614}$][NTf$_2$] used in the in-situ oil recovery simulation flowed down the clean sand channel, and was able to contact oil sand on both sides as it flowed. The clean sand was composed of pure silica with a mesh size of 16. The pack was comprised of approximately 340 g oil sand and 53 g clean sand. The pack was filled with DI water to determine the approximate ambient pore volume (110 mL), drained, and then loaded into the core flooding apparatus where a 6.89 MPa overburden pressure was applied. The pack was then evacuated using a roughing pump with a vacuum of 4 mTorr for 18 h at room temperature. The flow lines were then filled with aqueous brine and pressured up to 3.45 MPa. (The composition of the brine used in core flood: 1 L Milli-Q water, 24 g NaCl, 1.467 g CaCl·H$_2$O, 1.467 g MgCl$_2$·6H$_2$O, 3.9163 g Na$_2$SO$_4$, 0.0382 g NaHCO$_3$). All flooding was done using a 0.5 m mL/min injection flowrate.

Figure 64:
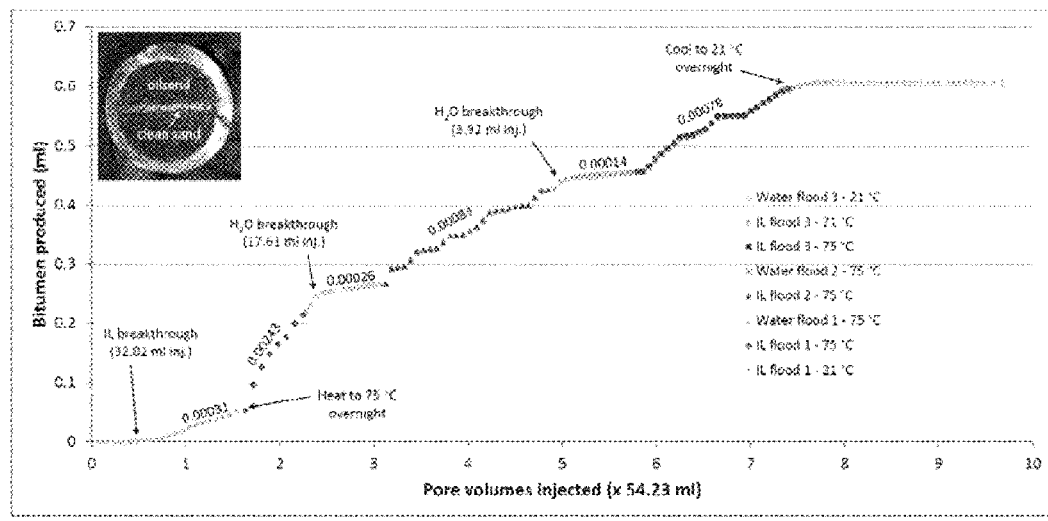
FIG. 64: Graph of bitumen produced versus pore volumes of fluid injected during a core flood using IL [$P_{66614}$][$NTf_2$]. Alternate injections of IL and brine were used and completed at room temperature and 75° C. Numbers above the plots refer to bitumen production rates in mL/min. Inset: Cross section near the center of the core showing the clean sand flow channel where the majority of the flow and dissolution of bitumen took place. Core ID was 3.35 cm.

The inset of FIG. 64 and FIG. 4 shows a cross section of the core after the flood, and highlights the morphology of the channel of clean sand that extended through the entire length.

The first water flood and [P$_{66614}$][NTf$_2$] flood were completed at ambient temperature, and the remainder of the floods were done at 75° C. Brine was initially injected to determine the pore volume at pressure (54.23 mL). FIG. 64 shows a graph of bitumen produced versus pore volumes of fluid injected during a core flooding experiment.

Initially the core was flooded with brine for a pressure test that resulted in no leakage. Due to the large grain size and hence high permeability of the clean sand flow channel through the center of the core, the ΔP across the core was very low (−2 kPa and −16 kPa for [P$_{66614}$][NTf$_2$] floods). Once the first IL flood was underway at room temperature, breakthrough occurred at 32.02 mL of [P$_{66614}$][NTf$_2$] injected, and bitumen was produced by [P$_{66614}$][NTf$_2$] immediately (0.31 µL/min). The [P$_{66614}$][NTf$_2$] showed discolouration and was a visual indicator of bitumen production. Approximately two pore volumes of [P$_{66614}$][NTf$_2$] were injected, and then the core was shut in while the temperature was increased to 75° C. The core was allowed 12 h to thermally equilibrate before the [P$_{66614}$][NTf$_2$] flood was continued at temperature. Immediately upon starting the high temperature [P$_{66614}$][NTf$_2$] flood, the effluent was black and the amount of bitumen produced increased sharply. Without wishing to be bound by any specific theory, it may have been that the core was filled with [P$_{66614}$][NTf$_2$] upon the application of heat, and had 12 h to soak up bitumen from the oil sand during the heat up and equilibration time. Bitumen production rate was the highest for this [P$_{66614}$][NTf$_2$] flood (2.43 µL/min), as the subsequent ones were not allowed any soak time.

The first 75° C. [P$_{66614}$][NTf$_2$] flood was followed by a water flood in which breakthrough occurred at 17.61 mL of water injected. The production of water and [P$_{66614}$][NTf$_2$]+ bitumen resulted in a sharp decrease in bitumen production rate (0.26 µL/min). Upon switching back to [P$_{66614}$][NTf$_2$], the overall bitumen production rate increased from 0.26 µL/min to 0.83 µL/min and was fairly stable throughout this portion of the flood. Switching back to water meant a decrease in bitumen production after breakthrough, down to 0.14 µL/min. This rate was again increased by switching back to [P$_{66614}$][NTf$_2$] at 75° C. resulting in a recovery to an overall rate of 0.78 L/min. This bitumen production rate was reduced after the core was allowed to cool to room temperature as expected.

A subsequent water flood produced only a negligible amount of bitumen+[P$_{66614}$][NTf$_2$] after the core had been cooled as breakthrough of water occurred almost immediately. It was estimated that the core contained approximately 55.52 mL of bitumen, and the total amount produced was 0.61 mL (1.1 vol %). The lack of total production over the course of the core flood was attributed to the design of the Example in which a "flow past" scenario was created. Here, a channel of clean sand was created down the center of the core (cross section shown in the inset of FIG. 64) where the majority of the flow and dissolution of bitumen took place. This was done to show that even with only a small amount of IL-oil sand contact, bitumen could still be effectively solubilized and removed from the formation.

Example 14: Extraction of Oil from Mineral Reservoirs

Displacement of oil from porous media is typically done with aqueous phases in which the displacement front is immiscible. In alternative aspects, a miscible displacement front comprising an IL may be introduced into the oil formation, allowed to soak there for some time, and then produced from the formation after it has solubilized the oil.

A core sample of Berea sandstone was soaked with dead oil from the Bakken reservoir for 24 h (until stabilized mass). The external surface of the cylindrical core was sealed with paraffin wax (FIG. 5). To elicit a residual pressure on the core, a circular portion of the wax was removed from the flat side of the core, and the entire device was inserted into an acrylic tube and then sealed in place with wax. This arrangement was oriented vertically, and the wax from the bottom face of the core was removed and placed in contact with water to prevent the evaporation of any Bakken oil that was produced from the core (which is light and has a high vapour pressure). Prior to the addition of [$C_8NH_3$][Oleate], it was observed that no oil was being produced from the core when it was exposed to air under isostatic pressure conditions. [$C_8NH_3$][Oleate] was then added in the vertical tube to a height of 9.15 cm, resulting in a pressure of approximately 794 Pa above ambient at the core face which was exposed to [$C_8NH_3$][Oleate]. Upon the addition of [$C_8NH_3$][Oleate], oil began to immediately flow out of the bottom core face that was placed in contact with the surface of water in a beaker. The oil that was displaced from the core was logged with time by periodically weighing the beaker which was sealed with parafilm to minimize evaporation. During the experiment the level of [$C_8NH_3$][Oleate] was observed to decrease in the tube.

The Bakken oil was observed to be fully miscible with [$C_8NH_3$][Oleate], forming a homogeneous phase. After 24 h extraction, 0.33 g Bakken oil were recovered from the core (considering that the core was loaded with 12.07 g oil, the recovery was calculated as 2.7%. During this time, the level of [$C_8NH_3$][Oleate] in the column was observed to decrease as it flowed into the core, resulting in an approximate volume of 3.45 ml [$C_8NH_3$][Oleate] imbibed into the core. An additional 2.36 g oil was produced from the core after further 48 h of exposure time to [$C_8NH_3$][Oleate]. The total oil produced was therefore 2.69 g (22.3%) in 72 h. The total amount of IL that flowed into the core was 7.35 ml. After a 72 h period, [$C_8NH_3$][Oleate] was observed to have broken through the core and was being produced in the water that the bottom face of the core was exposed to. This demonstration shows that [$C_8NH_3$][Oleate] may be able to penetrate a porous media and displace oil via a miscible displacement front that travels downwards through the core.

Example 15: Treatment of Produced SAGD Emulsion

In various embodiments, ILs may be used for the breakage of SAGD emulsions. For example, this Example illustrates the use of an IL, [$C_8NH_3$][Oleate], for the breakage of oil-water emulsions.

A sample of SAGD emulsion was obtained, which contained 31 wt % water with the balance bitumen. Optical microscopy was conducted to ascertain the nature of the water in oil emulsion and the approximate droplet size. 5 ml of the emulsion was mixed with varying quantities of the ionic liquid [$C_8NH_3$][Oleate]. Here, [$C_8NH_3$][Oleate] was added to the emulsion and stirred with an overhead stirrer using a Teflon coated double paddle stir bar at 300 rpm. The mixtures where then allowed to stand undisturbed for an additional 24 h. Two phases were observed to form and these were sampled and subjected to optical microscopy for observation.

The mixture appeared to be relatively homogeneous, however microscopic observation revealed some interesting results. FIG. 65*a-c* shows optical micrographs of the SAGD emulsion before and after it had been mixed with 50 vol % IL. FIG. 65*a* shows the morphology and dispersion of water droplets in the untreated emulsion (as received). Small water droplets (~1-5 μm) are interspersed throughout the oil and large macro-scale vacuoles of water were observed throughout the emulsion in the pail that was sub-sampled. FIGS. 65*b* and 65*c* show optical micrographs after treatment with 50 vol % IL. There were globules of oil in the treated sample that appeared completely devoid of water droplets at this magnification. Furthermore, there was evidence that the water was being emulsified by the IL and displaced from the oil (FIG. 66*c*).

Figure 66:
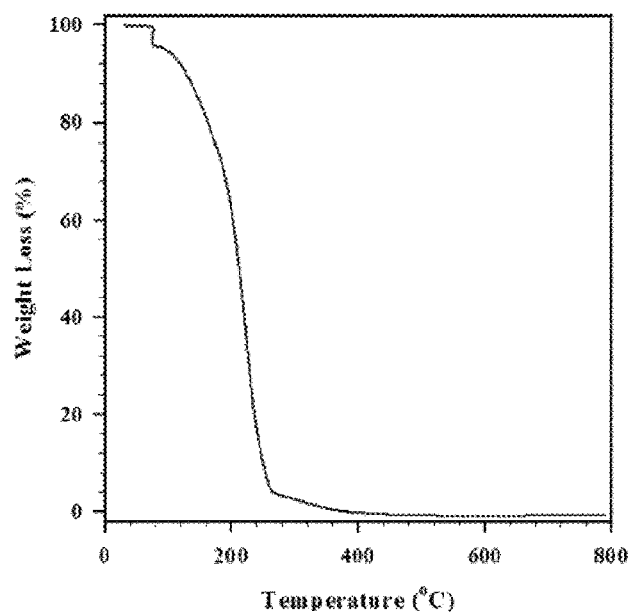
FIG. 66: Thermogravimetric analysis (TGA) of [$C_8NH_3$][Oleate] IL.

The industrial process for the treatment of SAGD emulsions occurs at 175° C. FIG. 66 shows the results of thermogravimetric analysis (TGA) of the IL [$C_8NH_3$][Oleate] and reveals that this substance thermally decomposes at 129° C. Accordingly, to illustrate the effect of temperature on the separation, the emulsion-IL mixture was heated to a temperature of 100° C. and stirred for 4 h. Water was observed to boil out of the emulsion, and an asphaltenic solid phase precipitated from the solution and collected on the bottom of the vessel and around the stir paddles. FIGS. 65*d-g* illustrate these results. The optical micrographs reveal a similar droplet morphology to the sample that was analyzed in FIGS. 65*d* and 65*e*. It appears that a three-phase system has developed consisting of globules of undissolved bitumen, small (1-5 μm) droplets of what were assumed to be a bitumen-IL phase, and the parent phase of IL, which appears as the grey background in all micrographs. No attempt was made to process at an elevated pressure, and thus all the water that was in the emulsion boiled away during the experiment. The inset of FIG. 65*f* shows a similar three-phase morphology, however this micrograph was taken of a sample of bitumen-IL after extraction from oilsand. The inset shows large dark bodies of undissolved bitumen, small droplets (bitumen-IL) and pure IL (grey background). Taken together, the micrographs in FIGS. 65*d*, 65*e*, and 65*a-g* provide evidence that bitumen dissolves into [$C_8NH_3$][Oleate] as an emulsion of droplets. These results illustrate that [$C_8NH_3$][Oleate] may be effective at breaking oil-water emulsions.

Example 16: Ionic Liquids as Production Well Chemicals

This Example illustrates that octylammonium oleate and other ionic liquids may be used as efficacious production well chemicals for the prevention of carbon steel corrosion and perhaps the dissolution of sulphate scales, waxes, and asphaltenes. For example, the alkylammonium-based oleate ILs ([$C_n NH_3$][Oleate]) which include cations based on an amine, and oleaginous anions, both of which can reduce corrosion by filming on carbon steel and displacing water respectively.

To illustrate corrosion inhibition of ILs, a synthetic brine was made using NaCl at a concentration of 150 g/L. Carbon steel (A80) coupons which measured 0.3175×2.54×1.27 cm (thickness×height×width) were immersed in 20 mL of the following fluids: air, [$C_8NH_3$][Oleate], [$C_8NH_3$][Oleate]+20 vol % brine (30 g/L NaCl), [$C_8NH_3$][Oleate]+50 vol % brine (75 g/L NaCl), and straight brine (150 g/L NaCl). The coupons were periodically removed and brushed using a brass cleaning brush to remove corrosion products and then weighed.

Figure 67:
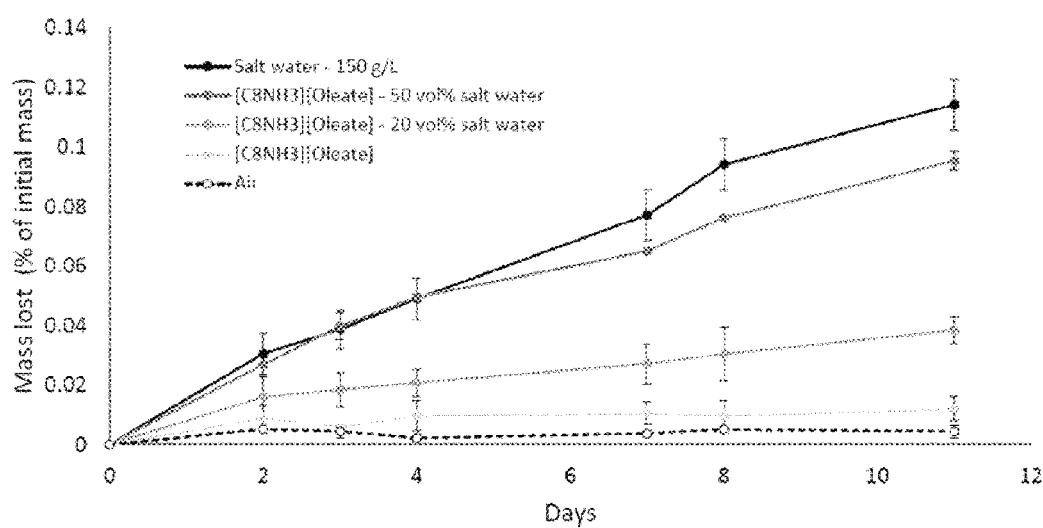
FIG. 67: Graph of mass loss as a function of time for carbon steel corrosion coupons subjected to various treatments of ILs and corrosive media (NaCl brine).

FIG. 67 shows a graph of mass reduction of several carbon steel coupons with time. Here, control coupons exposed to air and to [$C_8NH_3$][Oleate] lose negligible mass over a period of 11 days. Coupons exposed to a 150 g/L NaCl brine were observed to lose mass quite quickly, and those that were exposed to a mixture of the brine and the IL are seen to lose mass at an intermediate rate. This graph provides evidence that [$C_8NH_3$][Oleate] may be an effective corrosion inhibitor, and may provide a modicum of protection when combined with a highly corrosive brine.

Example 17: Ionic Liquids in $CO_2$ Capture and Distribution

This Example illustrates that an ionic liquid that is suited to treating various liquids associated with the processing of heavy oils, is also capable of storing and transporting $CO_2$. To illustrate the propensity of [$C_8NH_3$][Oleate] to store $CO_2$, 140 mL of IL was poured into a 1.9 cm ID acrylic column which was 2 m in length. The column was sealed on both ends and fittings were installed in either end to allow for the addition of gas into the bottom and its subsequent collection out the top of the column. A known gas mixture of 10 wt % $CO_2$ in nitrogen was introduced into the bottom of the column and bubbled through the IL. The flow rate of the gas was approximately 0.5 mL/min and the bubble residence time in the IL was 27 sec. After it had travelled through the IL column the gas was collected into 1 L Tedlar bags. These bags were subjected to GC-MS measurements to evaluate the $CO_2$ concentration in them. Any reduction of $CO_2$ concentration from the initial 10 wt % was a metric of the amount dissolved in the IL. Gas was flowed continuously through the IL and Tedlar bags were changed as necessary. In total, 13 bags were collected from the column which yielded a total of approximately 13 L of gas introduced and exposed to the IL.

Figure 68:
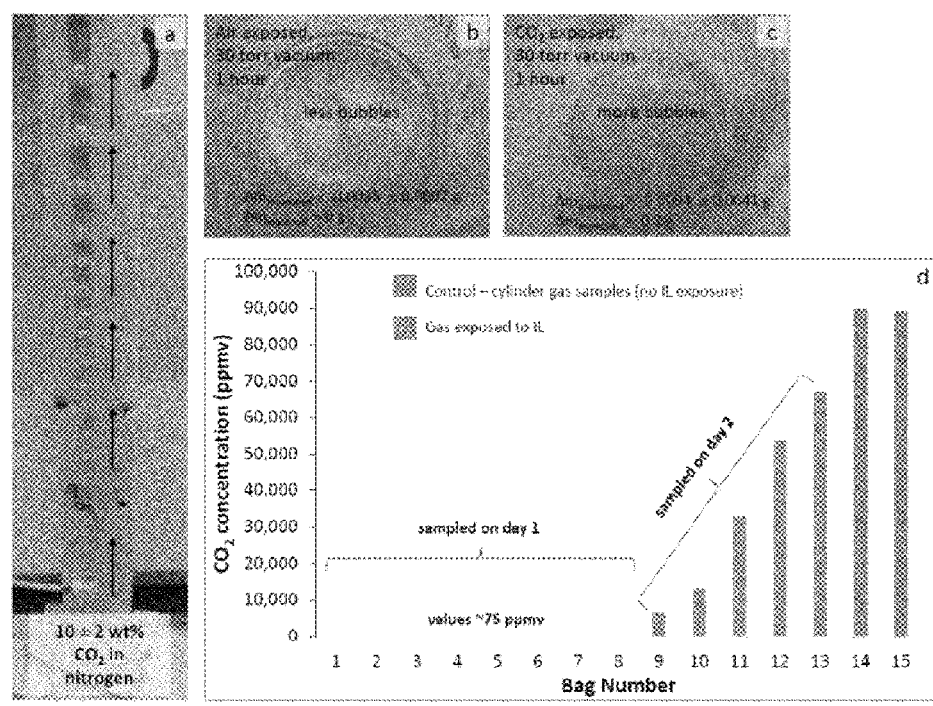
FIG. 68: (a) Picture of $CO_2$ extraction column showing bubbles of 10 wt % $CO_2$ in N2 rising up the column through octylammonium oleate. (b) Sample of IL after ~13 L of gas had bubbled through it under a 30 torr vacuum showing gas evolution, (c) IL which was not exposed to the $CO_2$ gas treatment under the same vacuum showing less gaseous evolution, (d) Graph of $CO_2$ concentration versus gas bag number that was collected.

FIG. 68 shows a portion of the experimental setup along with a summary of the results. FIG. 68a shows the column that was filled with 140 mL of [$C_8NH_3$][Oleate] with the 10 wt % $CO_2$ balance nitrogen gas mixture bubbling through it. The bubbles spent approximately 27 sec travelling through the ionic liquid and were collected in 1 L Tedlar gas bags at the top of the column (not shown). FIG. 68d shows the GC-MS results of the analysis of the gas bags that were collected. The grey bars represent the $CO_2$ concentration of each bag of gas that was collected from the column, and the blue bars show the control samples. The controls were simply pulled directly from the gas cylinder and analyzed to confirm the baseline $CO_2$ concentration that was being introduced to the bottom of the column.

The experiments were carried out over two days, and the column was sealed in between these sampling events. Any reduction of $CO_2$ concentration from the initial 10 wt % was a metric of the amount dissolved in [$C_8NH_3$][Oleate]. From the data we can see that the first 8 bags that were bubbled through the column (representing approximately 8 L of gas) had very little $CO_2$ detected in them, evidencing the storage of $CO_2$ in the ionic liquid. The $CO_2$ concentration is observed to increase in the gas bags from sample 9 through 13. This indicates that the $CO_2$ saturation limit of the ionic liquid was being reached and more $CO_2$ was making it through the column to be collected in the bags. A summation of all of the $CO_2$ stored in the ionic liquid in this experiment yielded a storage of 0.13 moles of $CO_2$ per mole of IL.

FIGS. 68b and 68c show pictures of [$C_8NH_3$][Oleate] under a vacuum of 30 torr in a vacuum desiccator. 20 g of [$C_8NH_3$][Oleate] were measured out for these tests, and this was done in an attempt to remove some of the dissolved $CO_2$ from the IL. FIG. 68b shows IL which had not been exposed to any $CO_2$, with a small amount of gas bubbles evolving from it during the vacuum exposure. These samples were gently agitated by shaking the desiccator to promote the release of gas.

The air exposed samples decreased by a mass of 0.0035±0.0007 g. The $CO_2$ exposed samples (FIG. 68c) produced more gas bubbles compared to the air exposed ones, and after vacuum exposure their mass decrease was 0.0094±0.0041 g. This example accordingly illustrates that octylammonium oleate can be used to reversibly store $CO_2$ in the liquid phase.

In one aspect the invention, an IL may be used to capture $CO_2$ generated in the context of a heavy oil recovery system, for example by scrubbing exhaust gasses to capture $CO_2$. The captured $CO_2$ may in turn be transported as a dissolved gas in the IL, for example for use in another aspect of a heavy oil recovery process. For example, $CO_2$ may be used to treat a tailings stream to reduce alkalinity (see Canadian Patent 2,522,031). The IL used to sequester and/or transport $CO_2$ may in turn be used in other aspects of a heavy oil treatment process, for example as described above in the extraction of bitumen or the treatment MFT at the same facility.

REFERENCES

2016 CAPP Oil Forecast, Markets & Transportation—Production & Supply Data, Canadian Association of Petroleum Producers, 2016-0007.

Armand, M.; Endres, F.; MacFarlane, D. R.; Ohno, H.; Scrosati, B. *Nat. Mater.* 2009, 8, 621-629.

Bai, L; Nie, Y.; Huang, J.; Li, Y.; Dong H.; Zhang, X. *Fuel,* 2013, 112, 289-294.

Bai, L; Nie, Y.; Li, Y.; Dong, H.; Zhang, X. Fuel P roc. *Technol.* 2013, 108, 94-100.

Berton, P.; Bica, K; Rogers, R. D. *Fluid Phase Equilib.* 2017, 450, 51-56.

Bhattacharyya, S.; Shah, F. U. *ACS Sustainable Chem. Eng.* 2016, 4, 5441-5449.

Boukherissa, M.; Mutelet, F.; Modarressi, A.; Dicko, A.; Dafri, D.; Rogalski, M. *Energy Fuels,* 2009, 23, 2557-2564.

Clark, K. A.; Pastemack, D. S. *Ind. Eng. Chem.* 1932, 24(12), 1410-1416.

COSIA—Mining and Extraction: High Grade—Paraffinic Froth Treatment—Energy Flow. 2016.

Dahbag, M. B.; Alquraishi, A.; Benzagouta, M. J. Petrol. Prod. Technol. 2015, 5, 353-361.

Gao, S.; Yu, G.; Abro, R.; Abdeltawab, A. A.; AI-Deyab, S. S.; Chen, X. *Fuel,* 2016, 173, 164-171.

Harji, A. N.; Koppel, P. E.; Mazurek, W. L; Meysami, P. J. *Petrol. Soc.* 2003, 140, 1-11.

Holland, A.; Wechsler, D.; Patel, A.; Molloy, B. M.; Boyd, A. R.; Jessop, P. G. *Can. J. Chem.* 2012, 90, 805-810.

Houlihan, R.; Williams, K. H. *J. Can. Petrol. Technol.* 1987, 91-96.

Jiang, B.; Yang, H.; Zhang, L; Zhang, R.; Sun, Y.; Huang, Y. *Chem. Eng. J.* 2016, 283, 89-96.

Lemos, R. C. B.; da Silva, E. B.; dos Santos, A.; Guimaraes, R. C. L; Ferreira, B. M. S.; Guarnieri, R. A.; Dariva, C; Franceschi, E.; Santos, A. F.; Fortuny, M. *Energy Fuels*, 2010, 24, 4439-4444.

Li, X.; He, L; Wu, G.; Sun, W.; Li, H.; Sui, H. *Energy Fuels*, 2012, 26, 3553-3563.

Lunn, S. *SPE Economics and Management*, 2013, 156676, 17-27.

Martinez-Palou, R.; Luque, R. *Energy Environ. Sci.* 2014, 7, 2414-2447.

McCrary, P. D.; Beasley, P. A.; Gurau, G.: Narita, A.; Barber, P. S.; Cojocaru, O. A.; Rogers, R. D. *New J. Chem.* 2013, 37, 2196-2202.

Ogunlaja, A. S.; Hosten, E.; Tshentu, Z. *Ind. Eng. Chem. Res.* 2014, 53, 18390-18401.

Pansu, M.; Gautheyrou, J. (Eds.) Handbook of Soil Analysis: Mineralogical, Organic and Inorganic Methods, 1 st Ed., Springer, 2007, Chapter 26, pp. 709-754.

Properties, Composition and marine Spill Behaviour, Fate, and Transport of Two Diluted Bitumen Products from the Canadian Oil Sands. *Environment Canada*, Federal Government Technical Report, 2013, 1-87.

Shah, S. N.; Chellappan, L. K.; Gonfa, G.; Mutalib, M. I. A.; Pilus, R. B. M.; Bustam, M. A. *Chem. Eng. J.* 2016, 284, 487-493.

Subramanian, D.; Wu, K.; Firoozabadi, A. *Fuel*, 2015, 143, 519-526.

Swapnil, D. Res. *J. Chem. Sci.* 2012, 2(8), 80-85.

Velusamy, S.; Sakthivel, S.; Gardas, R. L; Sangwai, J. S. *Ind. Eng. Chem. Res.* 2015, 54, 7999-8009.

CONCLUSION

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification are incorporated herein by reference as if each individual publication were specifically and individually indicated to be incorporated by reference herein and as though fully set forth herein. The invention includes all embodiments and variations substantially as hereinbefore described and with reference to the examples and drawings.

The invention claimed is:

1. A process for treating liquid slurry from industrial processes, the process comprising:
processing a liquid slurry to form an IL-slurry mixture, wherein the liquid slurry comprises a slurry of water, particles, and hydrocarbons including one or more of bitumen and heavy oil, and wherein the processing comprises a combination of:
gravity settling the liquid slurry in a tailings pond to increase the proportion of solids in the liquid slurry, wherein the gravity settling increases the solids content of the liquid slurry to greater than 40 wt. % to form a first mixture comprising mature fine tailings (MFT); and
adding an ionic liquid (IL) to the first mixture to form the IL-slurry mixture, and
separating the IL-slurry mixture into multiple phases including a first phase comprising the particles, the hydrocarbons and the ionic liquid, and a second aqueous phase comprising water.

2. The process of claim 1, wherein said particles have a particle size of 44 µm or less, and, after gravity settling, said liquid slurry is comprised of 15-50 wt. % solids, and 0-2 wt. % bitumen, with the balance being water.

3. The process of claim 1, wherein the ionic liquid is a surface-active ionic liquid.

4. The process of claim 1, wherein the process comprises diluting the liquid slurry with a saline solution prior to the addition of the ionic liquid to form the IL-slurry mixture.

5. The process of claim 1, wherein said separating the IL-slurry mixture into multiple phases comprises one or more of gravity settling, centrifuging the IL-slurry mixture at between 0-14,000 rpm, and filtration.

6. The process of claim 1, wherein the process comprises mixing the ionic liquid with nanoparticles to form a nanoparticle-ionic liquid dispersion prior to adding the ionic liquid to the liquid slurry.

7. The process of claim 6, wherein the nanoparticles are magnetic and/or superparamagnetic.

8. The process of claim 6, wherein the nanoparticles are a phase of iron oxide, a magnetite ($Fe_3O_4$), or a maghemite ($\gamma$-$Fe_2O_3$), and have a particle size between 1-100 nm.

9. The process of claim 6, wherein the first phase comprises clay particles, ionic liquid, hydrocarbons, and nanoparticles which renders the first phase magnetic, and wherein the process comprises using a magnetic field from a permanent magnet or electromagnet to separate said first phase.

10. The process of claim 1, wherein the process comprises recovering the ionic liquid after separation by solvent extraction to form a solvent loaded with ionic liquid.

11. The process of claim 10, wherein said solvent is a volatile organic solvent or a fatty acid.

12. The process of claim 10, wherein said solvent is acetone, isopropyl alcohol, ethyl acetate, octylamine, or oleic acid.

13. The process of claim 1, wherein the process comprises recovering the ionic liquid after separation by a thin film treatment or pervaporation.

14. The process of claim 1, wherein the process comprises adjusting the pH of the liquid slurry.

15. The process of claim 14, wherein the process comprises treating the liquid slurry with $CO_2$ so as to lower pH, wherein the $CO_2$ is transported as a dissolved gas in the ionic liquid.

16. The process of claim 1, wherein the ionic liquid has a melting point below 200° C.

17. The process of claim 1, wherein the ionic liquid comprises one or more cations and one or more anions and wherein the cations comprise one or more secondary, tertiary, quaternary amine, or cyclic amines.

18. The process of claim 1, wherein the ionic liquid comprises one or more cations and one or more anions and wherein the anions comprise one or more primary saturated or unsaturated carboxylic acid.

19. The process of claim 1, wherein the process is carried out at 0-100° C. and at atmospheric pressure.

20. The process of claim 1, wherein the one of the separated multiple phases includes particles comprising heavy metal.

21. A process for treating liquid slurry in the form of slurries from industrial processes, the process comprising:
  mixing an ionic liquid with nanoparticles to form a nanoparticle-ionic liquid dispersion;
  adding the nanoparticle-ionic liquid dispersion to a liquid slurry to form a dispersion-slurry mixture, wherein the liquid slurry comprises tailings consisting of a slurry of water; particles; and hydrocarbons comprising one or more of bitumen and heavy oil, and
  separating the dispersion-slurry mixture into multiple phases including a first phase comprising the hydrocarbons and the ionic liquid, and a second aqueous phase comprising water.

22. The process of claim 21, wherein the first phase comprises clay particles, and the nanoparticles which renders the first phase magnetic, and wherein the process comprises using a magnetic field from a permanent magnet or electromagnet to separate components of said first phase from each other.

23. A process for treating liquid slurry from industrial processes, the process comprising:
  processing a liquid slurry to form an IL-slurry mixture, wherein the liquid slurry comprises a slurry of water, particles, and hydrocarbons including one or more of bitumen and heavy oil, and wherein the processing comprises a combination of:
   adding an ionic liquid (IL) to the liquid slurry to form the IL-slurry mixture;
   gravity settling the IL-slurry mixture in a tailings pond to increase the proportion of solids in the IL-slurry mixture, wherein the gravity settling increases the solids content of the IL-slurry mixture to greater than 40 wt. % to form mature fine tailings (MFT); and
  separating the IL-slurry mixture into multiple phases including a first phase comprising the particles, the hydrocarbons and the ionic liquid, and a second aqueous phase comprising water.

\* \* \* \* \*